(12) United States Patent
Kim et al.

(10) Patent No.: US 12,143,856 B2
(45) Date of Patent: *Nov. 12, 2024

(54) METHOD AND APPARATUS FOR WIRELESS COMMUNICATION IN WIRELESS COMMUNICATION SYSTEM

(71) Applicant: Samsung Electronics Co., Ltd., Gyeonggi-do (KR)

(72) Inventors: Sang Bum Kim, Gyeonggi-do (KR); Soeng Hun Kim, Gyeonggi-do (KR); Dong Gun Kim, Gyeonggi-do (KR); Jae Hyuk Jang, Gyeonggi-do (KR); Alexander Sayenko, Gyeonggi-do (KR); Seung Ri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,647

(22) Filed: Nov. 14, 2023

(65) Prior Publication Data
US 2024/0080713 A1     Mar. 7, 2024

Related U.S. Application Data

(63) Continuation of application No. 16/185,812, filed on Nov. 9, 2018, now Pat. No. 11,825,346.

(30) Foreign Application Priority Data

| Nov. 9, 2017 | (KR) | ......................... 10-2017-0148985 |
| Nov. 28, 2017 | (KR) | ......................... 10-2017-0161013 |
| Dec. 26, 2017 | (KR) | ......................... 10-2017-0180135 |

(51) Int. Cl.
*H04W 28/06* (2009.01)
*H04L 1/00* (2006.01)
(Continued)

(52) U.S. Cl.
CPC ............ *H04W 28/065* (2013.01); *H04L 1/00* (2013.01); *H04L 69/04* (2013.01);
(Continued)

(58) Field of Classification Search
None
See application file for complete search history.

(56) References Cited

U.S. PATENT DOCUMENTS 11,265,760 B2    3/2022  Quan et al.
11,825,346 B2 *  11/2023 Kim .................. H04W 74/0833
(Continued)

FOREIGN PATENT DOCUMENTS

CN          107094142          8/2017

OTHER PUBLICATIONS

CATT, "Consideration on UDC Header Content", R2-1710720, 3GPP TSG-RAN WG2 #99bis, Oct. 9-13, 2017, 3 pages.
(Continued)

*Primary Examiner* — Jutai Kao
(74) *Attorney, Agent, or Firm* — The Farrell Law Firm, P.C.

(57) ABSTRACT

Methods and apparatuses are provided in a wireless communication system. Packet data convergence protocol (PDCP) configuration information that configures a PDCP entity of the terminal to use an uplink data compression (UDC) is received from a base station. The PDCP entity generates a UDC header and a UDC data block, based on the PDCP configuration information. The PDCP entity ciphers the UDC header and the UDC data block. The PDCP entity generates PDCP data including a PDCP header, the ciphered UDC header and the ciphered UDC data block. The generated PDCP data is transmitted to the base station. A header compression is not configured in case that the UDC is configured.

20 Claims, 40 Drawing Sheets

(51) Int. Cl.
  *H04L 69/04* (2022.01)
  *H04W 28/02* (2009.01)
  *H04W 28/04* (2009.01)
  *H04W 72/21* (2023.01)
  *H04W 74/0833* (2024.01)
(52) U.S. Cl.
  CPC ....... *H04W 28/0278* (2013.01); *H04W 28/04* (2013.01); *H04W 72/21* (2023.01); *H04W 74/0833* (2013.01)

(56) References Cited

U.S. PATENT DOCUMENTS

| | | | |
|---|---|---|---|
| 2015/0085835 | A1 | 3/2015 | Eravelli et al. |
| 2016/0142518 | A1* | 5/2016 | Raina ............... H04L 69/04 370/230 |
| 2016/0142934 | A1 | 5/2016 | Ahmadzadeh et al. |
| 2016/0309364 | A1 | 10/2016 | Maheshwari et al. |
| 2017/0257796 | A1 | 9/2017 | Hsu |
| 2019/0141567 | A1* | 5/2019 | Liu ................. H04L 69/04 |
| 2020/0107220 | A1 | 4/2020 | Shreovastay |
| 2020/0396640 | A1* | 12/2020 | Quan ............... H04L 67/565 |

OTHER PUBLICATIONS

3GPP, 3rd Generation Partnership Project; Technical Specification Group Radio Access Network; Evolved Universal Terrestrial Radio Access (E-UTRA); Study on.
UL Data Compression for E-UTRA (Release 15), 3GPP TR 36.754 V15.1.0, Sep. 2017, 33 pages.
International Search Report dated Feb. 12, 2019 issued in counterpart application No. PCT/KR2018/013669, 11 pages.
CATT, "More Details and Simulation Results of Deflate with 1 Byte UDC Header", R2-1708358, 3GPP TSG-RAN WG2 #99, Aug. 21-25, 2017, 7 pages.
European Search Report dated Apr. 29, 2020 Issued in counterpart application No. 18876969.9-1213, 9 pages.
CMCC, "Way Forward on the Support of Supplementary Uplink in NR", R1-1709587, 3GPP TSG RAN WG1 Meeting #89, May 15-19, 2017, 2 pages.
CMCC, "Way Forward on the Support of Supplementary Uplink in NR", R1-1709732, 3GPP TSG RAN WG1 Meeting #89, May 15-19, 2017, 2 pages.
Huawei, HiSilicon, "Consideration on PHR Triggering and Cancellation in NR", R2-1709268, 3GPP TSG-RAN WG2 Meeting #99, Aug. 21-25, 2017, 2 pages.
Indian Examination Report dated Jul. 31, 2021 issued in counterpart application No. 202037023587, 5 pages.
Korean Office Action dated Sep. 9, 2021 issued in counterpart application No. 10-2017-0180135, 7 pages.
3GPP TR 36.754 V1.0.0, 3GPP, 3rd Generation Partnership Project; Technical Specification Group Radio Access Network; Evolved Universal Terrestrial.
Radio Access (E-UTRA); Study on UL Data Compression for E-UTRA (Release 15), May 2017, 37 pages.
Chinese Office Action dated Nov. 2, 2022 issued in counterpart application No. 201880072755.9, 22 pages.
P. Deutsch et al., RF1950 ZLIB Compressed Data Format Specification version 3.3, May 1996 (Year: 1996).

* cited by examiner

FIG. 3

| | C₇ | C₆ | C₅ | C₄ | C₃ | C₂ | C₁ | R |
|---|---|---|---|---|---|---|---|---|
| 1c-05 | | | | | | | | |
| 1c-10 | P | V | \multicolumn{6}{c}{PH (Type 2, PCell)} | |
| 1c-15 | R | R | \multicolumn{6}{c}{P$_{CMAX, c}$ 1} | |
| 1c-20 | P | V | \multicolumn{6}{c}{PH (Type 1, PCell)} | |
| 1c-25 | R | R | \multicolumn{6}{c}{P$_{CMAX, c}$ 2} | |
| 1c-30 | P | V | \multicolumn{6}{c}{PH (Type x, SCell 1)} | |
| 1c-35 | R | R | \multicolumn{6}{c}{P$_{CMAX, c}$ 3} | |

⋮

| | | | | | | | | |
|---|---|---|---|---|---|---|---|---|
| P | V | \multicolumn{6}{c}{PH (Type x, SCell n)} | |
| R | R | \multicolumn{6}{c}{P$_{CMAX, c}$ m} | |

FIG. 4A

| | | |
|---|---|---|
| 1d-05 — P | V | PH (Type 1, PCell or SUL) |
| 1d-10 — R | R | $P_{CMAX, c}$ 1 |

FIG. 4B

| | | |
|---|---|---|
| 1d-15 — P | V | PH (Type 2, PCell or SUL) |
| 1d-20 — R | R | $P_{CMAX, c}$ 1 |
| 1d-25 — P | V | PH (Type 1, PCell or SUL) |
| 1d-30 — R | R | $P_{CMAX, c}$ 2 |

FIG. 4C

| | | |
|---|---|---|
| 1d-35 — P | V | PH (Type 2, PCell or SUL) |
| 1d-40 — R | R | $P_{CMAX, c}$ 1 |
| 1d-45 — P | V | PH (Type 1, PCell) |
| 1d-50 — R | R | $P_{CMAX, c}$ 2 |
| 1d-55 — P | V | PH (Type 1, SUL) |
| 1d-60 — R | R | $P_{CMAX, c}$ 3 |

FIG. 4D

| | | |
|---|---|---|
| 1d-65 — P | V | PH (Type 1, PCell) |
| 1d-70 — R | R | $P_{CMAX, c}$ 1 |
| 1d-75 — P | V | PH (Type 1, SUL) |
| 1d-80 — R | R | $P_{CMAX, c}$ 2 |

FIG. 18
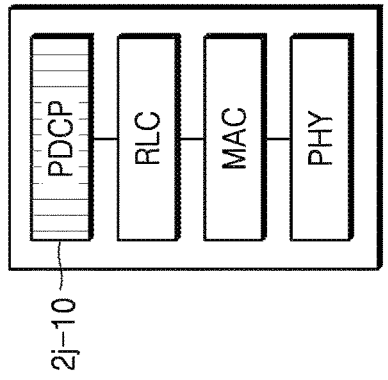
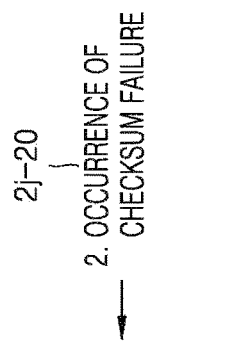
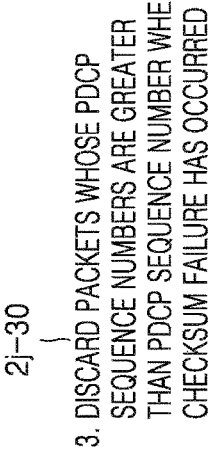
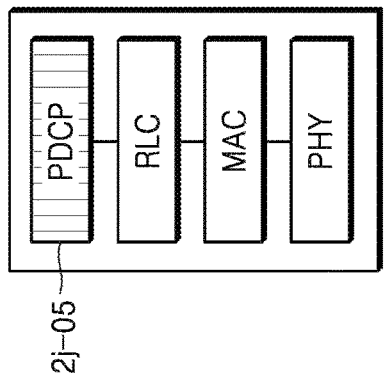
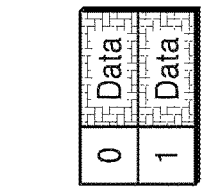
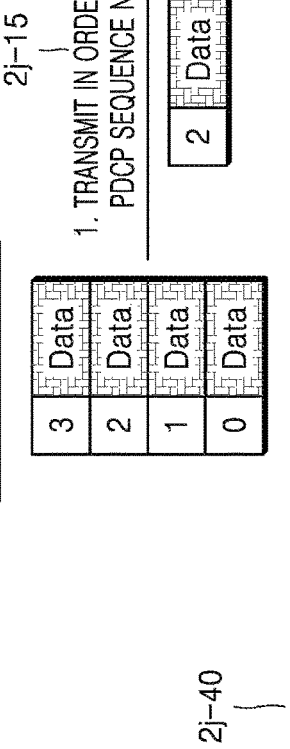
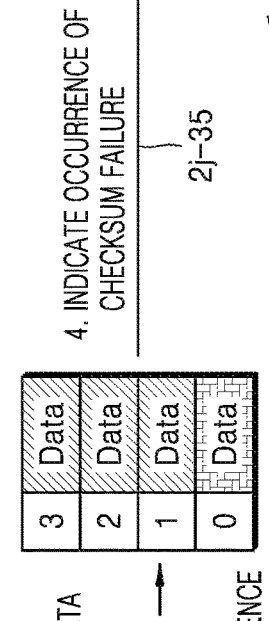
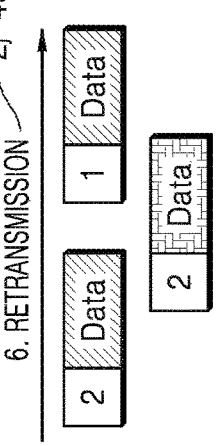

METHOD AND APPARATUS FOR WIRELESS COMMUNICATION IN WIRELESS COMMUNICATION SYSTEM

CROSS-REFERENCE TO RELATED APPLICATION(S)

This application is a Continuation application of U.S. patent application Ser. No. 16/185,812, filed in the U.S. Patent and Trademark Office on Nov. 9, 2018, which claimed priority under 35 U.S.C. § 119 to Korean Patent Application Nos. 10-2017-0148985, 10-2017-0161013, and 10-2017-0180135, filed on Nov. 9, 2017, Nov. 28, 2017, and Dec. 26, 2017, respectively, in the Korean Intellectual Property Office, the disclosures of which are incorporated by reference herein in their entirety.

BACKGROUND

1. Field

The present disclosure relates generally to a method and apparatus for wireless communication in a wireless communication system.

2. Description of Related Art

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why 5G communication systems and pre-5G communication systems are called beyond 4G network communication systems or post long-term evolution (LTE) systems. In order to achieve a high data transmission rate, 5G communication systems are being developed to be implemented in a super-high frequency band (millimeter wave (mmWave)), e.g., a band of 60 GHz. In order to reduce the occurrence of stray electrical waves in such a super-high frequency band and to increase a transmission distance of electrical waves in 5G communication systems, various technologies are being studied, for example: beamforming, massive multiple input multiple output (MIMO), full dimensional MIMO (FD-MIMO), array antennas, analog beam-forming, and large scale antennas. In order to improve system networks for 5G communication systems, various technologies have been developed, e.g., evolved small cells, advanced small cells, cloud radio access networks (cloud RANs), ultra-dense networks, device-to-device communication (D2D), wireless backhaul, moving networks, cooperative communication, coordinated multi-points (CoMPs), and interference cancellation. In addition, for 5G communication systems, other technologies have been developed, e.g., hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where people create and consume information, to the Internet of things (IoT), where distributed configurations, such as objects, exchange information with each other to process the information. Internet of everything (IoE) technology is being newly provided, in which technology related to the IoT is combined with, for example, technology for processing big data through connection with a cloud server. In order to implement the IoT, various technical components are required, such as, a sensing technique, wired/wireless communication and network infrastructures, a service interfacing technique, a security technique, etc. In recent years, techniques including a sensor network for connecting objects, machine to machine (M2M) communication, machine type communication (MTC), etc. have been studied. In the IoT environment, intelligent Internet technology (IIT) services may be provided to collect and analyze data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are implemented by using 5G communication technology including beam-forming, MIMO, array antenna, etc. The application of the cloud RAN as a big data processing technique described above may be an example of convergence of the 5G communication technology and the IoT technology.

As described above, with the development of wireless communication systems, various services are now available, and thus, a way of smoothly providing these services is required.

SUMMARY

Aspects of the present disclosure provide methods and apparatuses capable of smoothly providing communication in a wireless communication system.

In accordance with an aspect of the disclosure, a method performed by a terminal in a wireless communication system is provided. Packet data convergence protocol (PDCP) configuration information that configures a PDCP entity of the terminal to use an uplink data compression (UDC), is received from a base station. The PDCP entity generates a UDC header and a UDC data block, based on the PDCP configuration information. The PDCP entity ciphers the UDC header and the UDC data block. The PDCP entity generates PDCP data including a PDCP header, the ciphered UDC header and the ciphered UDC data block. The generated PDCP data is transmitted to the base station. A header compression is not configured in case that the UDC is configured.

In accordance with another aspect of the disclosure, a method performed by a base station in a wireless communication system is provided. PDCP configuration information that configures a PDCP entity of the terminal to use a UDC, is transmitted to a terminal. PDCP data including a PDCP header, a ciphered UDC header, a ciphered UDC data block, is received from the terminal. A UDC header and a UDC data block are generated by the PDCP entity of the terminal, based on the PDCP configuration information. The UDC header and the UDC data block are ciphered by the PDCP entity of the terminal. The PDCP data including the PDCP header, the ciphered UDC header, and the ciphered UDC data block is generated by the PDCP entity of the terminal. A header compression is not configured in case that the UDC is configured.

In accordance with another aspect of the disclosure, a terminal configured to operate in a wireless communication system is provided. The terminal includes a transceiver and a controller coupled with the transceiver. The controller is configured to receive, from a base station, PDCP configuration information that configures a PDCP entity of the terminal to use a UDC, generate, by the PDCP entity, a UDC header and a UDC data block, based on the PDCP configuration information, cipher, by the PDCP entity, the UDC header and the UDC data block, generate, by the PDCP entity, PDCP data including a PDCP header, the ciphered UDC header, and the ciphered UDC data block, and transmit the generated PDCP data to the base station. A header compression is not configured in case that the UDC is configured.

In accordance with another aspect of the disclosure, a base station configured to operate in a wireless communication system is provided. The base station includes a transceiver and a controller coupled with the transceiver. The controller is configured to transmit, to a terminal, PDCP configuration information that configures a PDCP entity of the terminal to use a UDC, and receive, from the terminal, PDCP data including a PDCP header, a ciphered UDC header, a ciphered UDC data block. A UDC header and a UDC data block are generated by the PDCP entity of the terminal, based on the PDCP configuration information. The UDC header and the UDC data block are ciphered by the PDCP entity of the terminal. The PDCP data including the PDCP header, the ciphered UDC header, and the ciphered UDC data block is generated by the PDCP entity of the terminal. A header compression is not configured in case that the UDC is configured.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram of a power headroom report (PHR) format in an LTE system;

FIGS. 4A, 4B, 4C, and 4D are diagrams of a PHR format, according to an embodiment;

FIG. 18 is a block diagram of data compressed based on an old UDC context not being distinguished from data compressed based on a new UDC context;

DETAILED DESCRIPTION

Figure 1:
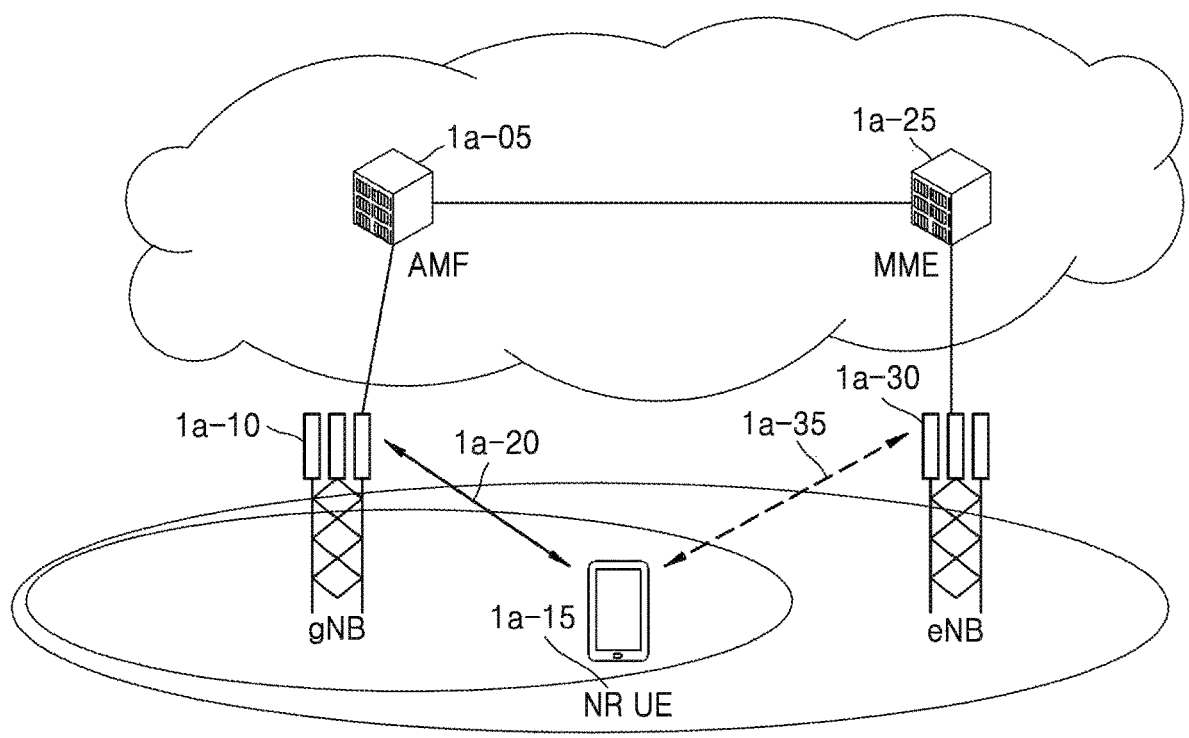
FIG. 1 is a diagram of a mobile communication system to which an embodiment is applied.

Hereinafter, embodiments of the present disclosure are described with reference to the accompanying drawings.

While describing the embodiments, technical content that is well-known in the related fields and not directly related to the present disclosure is not provided. By omitting redundant descriptions, the essence of the present disclosure is not obscured and is more clearly explained.

For the same reasons given above, components may be exaggerated, omitted, or schematically illustrated in drawings for clarity. In addition, the size of each component may not completely reflect the actual size. In the accompanying drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the present disclosure and methods of accomplishing the same may be understood more readily by referring to the following detailed description and the accompanying drawings. In this regard, the present disclosure may have different forms and is not intended to be construed as being limited to the descriptions set forth herein. Rather, embodiments are provided so that the present disclosure will be thorough and complete and will fully convey the concept of the present disclosure to one of ordinary skill in the art, and the present disclosure is only defined by the appended claims and their equivalents.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the present disclosure indicates a software component or hardware component such as a field programmable gate array (FPGA) or an application specific integrated circuit (ASIC), and performs a certain function. However, the term "unit" is not intended to be limited to software or hardware. A unit may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and units may be associated with the smaller number of components and units, or may be divided into additional components and units. Furthermore, the components and units may be embodied to reproduce one or more central processing units (CPUs) in a device or security multimedia card. In addition, in the embodiments, a unit may include at least one processor.

In the following description, a terms used for identifying an access node, referring to a network entity, referring to messages, indicating an interface between network entities, indicating various pieces of identification information, or the like are provided. Therefore, the present disclosure is not intended to be limited to the following terms, and other terms referring to objects having equivalent meanings may be used.

The present disclosure uses terms and names defined in the $3^{rd}$ Generation Partnership Project Long Term Evolution (3GPP LTE) standard. However, the present disclosure is intended to be not limited to the terms and the names and may be equally applied to systems conforming to other standards. In the present disclosure, an evolved node B (eNB) and a new radio node B (gNB) may be interchangeably used. That is, a base station described as an eNB may indicate a gNB.

FIG. 1 is a diagram of a mobile communication system.

Referring to FIG. 1, a wireless access network of the mobile communication system (hereinafter, a new radio (NR) or an NR system) is configured of a gNB 1a-10 and an access and mobility management function (hereinafter, AMF) 1a-05 included in a new radio core network. A new radio user equipment (hereinafter, an NR UE or a terminal) 1a-15 accesses an external network through the gNB 1a-10 and the AMF 1a-05.

In FIG. 1, the gNB 1a-10 corresponds to an eNB of an existing LTE system. The gNB 1a-10 is connected to the NR UE through a wireless channel and may provide an excellent service, compared to the eNB according to the related art (operation 1a-20). In the NR, all user traffic is serviced through a shared channel, and thus, a device to obtain and schedule a plurality of pieces of state information including buffer states, available transmit power states, channel states, or the like of UEs is required, and the gNB 1a-10 corresponds to the device. One gNB may generally control a plurality of cells. A bandwidth greater than the maximum bandwidth of existing LTE may be given to achieve high speed data transmission, compared to the existing LTE system, and beamforming technology may be added to wireless access technology such as orthogonal frequency division multiplexing (OFDM). In addition, an adaptive modulation and coding (AMC) technique may be used to determine a modulation scheme and a channel coding rate according to a channel state of a UE. The AMF 1a-05 performs functions of supporting mobility, configuring a bearer, configuring a QoS, or the like. The AMF 1a-05 is a device configured to perform not only a mobility management function but also perform various control functions with respect to the UE, and is connected to a plurality of node B. In addition, the NR may interoperate with the existing LTE system, and the AMF 1a-05 is connected to a mobility management entity (MME) 1a-25 via a network interface. The MME 1a-25 is connected to an eNB 1a-30 that is an existing NB. A UE that supports LTE-NR dual connectivity may transceive data while maintaining connection not only to a gNB but also to an eNB (operation 1a-35).

Figure 2A:
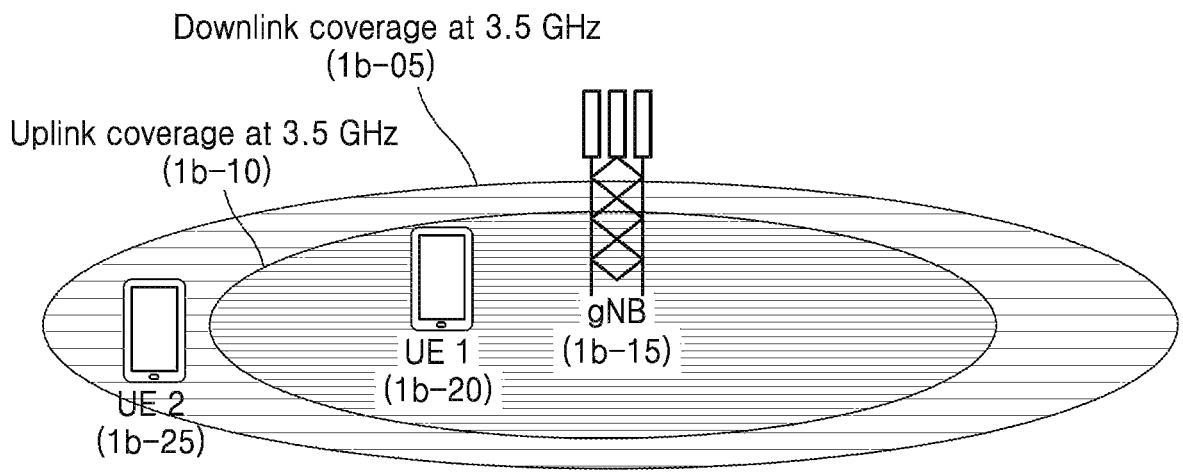
FIGS. 2A and 2B are diagrams of applying a supplementary uplink frequency, according to an embodiment.
Figure 2B:
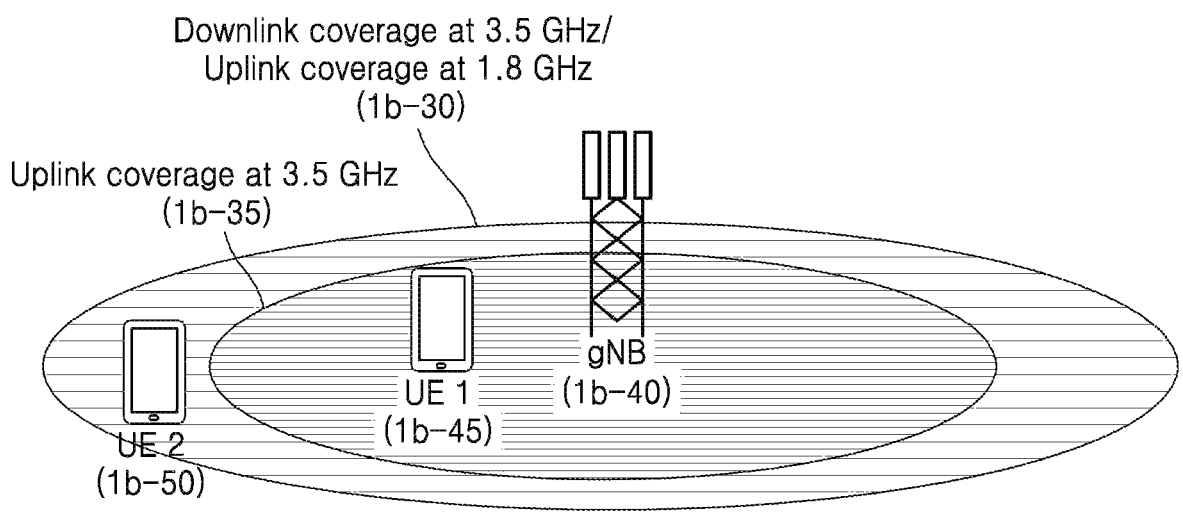

FIGS. 2A and 2B are diagrams of applying a supplementary uplink frequency according to an embodiment.

Referring to FIGS. 2A and 2B, in a mobile communication system, uplink coverage and downlink coverage may be mismatched. The mismatch occurs due to a channel characteristic of an uplink being different from a channel characteristic of a downlink, a limit of maximum transmit power of a UE, or a structural limit of a transmission antenna. In general, the downlink coverage is broader than the uplink coverage. For example, in a time division duplex (TDD) system of 3.5 GHz, a downlink coverage 1b-05 is broader than an uplink coverage 1b-10. In this case, a first UE 1b-20 may receive a service from an uplink and a downlink, but a second UE 1b-25 might not be able to successfully transmit data to a gNB 1b-15 in the uplink. Accordingly, to eliminate the issue due to the mismatch, available downlink coverage may be decreased to match that of the uplink. That is, even when broader coverage can be provided through the downlink, the downlink coverage may be limited.

To avoid capability deterioration due to a mismatch, a mobile communication system may allow a UE to apply an uplink frequency with broader service coverage. For example, an uplink of 3.5 GHz and a separate uplink of 1.8 GHz 1b-30 may be additionally provided to the UE. Such supplementary uplink frequency may be called a supplementary uplink (SUL) frequency. Due to a frequency characteristic, the more the frequency band is decreased, the more the propagation distance of a wireless signal is increased. Therefore, 1.8 GHz that is lower than 3.5 GHz may provide broader coverage. Thus, a second UE 1b-50 may successfully transmit data to a gNB 1b-40 by using an uplink of 1.8 GHz 1b-35. In addition, a first UE 1b-45 is enabled to use any of uplinks of 1.8 GHz and 3.5 GHz, regardless of coverage, and in this regard, to disperse access congestion of uplinks, the first UE 1b-45 may select and use one of 1.8 GHz and 3.5 GHz. Such supplementary uplink frequency may be a frequency that is used in an LTE system.

For one UE, both NR uplink frequency and SUL frequency may be set. However, in this case, a physical uplink shared channel (PUSCH) that is an uplink data channel may be transmitted through only one uplink at one instance. In addition, a physical uplink control channel (PUCCH) may be transmitted through only one uplink at one instance and may be transmitted through an uplink that is the same as or different from the PUSCH.

When a certain event occurs in the mobile communication system, a UE reports its spare transmit power. Such information may be used when a gNB manages resources scheduled with respect to the UE. For example, when spare transmit power reported by a certain UE is sufficient, the gNB may allocate a supplementary wireless resource to the UE. In the LTE system, the spare transmit power is called power headroom. In the mobile communication system, a UE is required to report such information. In an embodiment, a procedure is disclosed, in which an applicable power headroom format and power headroom are transmitted when an SUL frequency is set.

When a certain event occurs, the power headroom may be reported by the UE to the gNB. In this regard, the certain event may be listed as shown in Table 1 below.

TABLE 1 prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;
periodicPHR-Timer expires;
upon configuration or reconfiguration of the power headroom reporting functionality by upper layers, which is not used to disable the function;
activation of an SCell of any MAC entity with configured uplink;
addition of the SCell with PUCCH in SCG (PSCell) in EN-DC;
prohibitPHR-Timer expires or has expired, when the MAC entity has UL resources for new transmission, and the following is true in this TTI for any of the activated Serving Cells of any MAC entity with configured uplink:
there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the MAC entity had UL resources allocated for transmission or PUCCH transmission on this cell.

Referring to Table 1 above, dl-PathlossChange, prohibitPHR-Timer, and periodicPHR-Timer may be signaled as radio resource control (RRC) to the UE. The UE cannot report power headroom while a prohibitPHR-Timer is activated. When the periodicPHR-Timer expires, the UE may report the power headroom to the gNB 1b-40, but may not request the gNB 1b-40 for a separate wireless resource for the report.

FIG. 3 is a diagram of a power headroom report (PHR) format in an LTE system.

Referring to FIG. 3, in the LTE system, various PHR formats are defined. There is a default PHR format that is used when a single frequency is used; an extendedPHR format and an extendedPHR2 format which are used by a carrier aggregation (CA) technique in which a service is provided by grouping a plurality of frequencies; and a dualConnectivityPHR format that is used by a dual connectivity technique in which a service is provided by simultaneously connecting two NBs.

Referring to FIG. 3, the extendedPHR format is described below to describe a characteristic of the PHR format. In the extendedPHR format, a combination of bits corresponding to respective secondary cells (SCells) is included in a first byte 1c-05. In the first byte 1c-05, each bit is used to indicate which PH information of a certain SCell is included in a corresponding format. When a value of a bit is 1, it indicates that PH information of the SCell corresponding to the bit is included in the PHR format.

After the first byte 1c-05, one or more bytes are used to address PH information of a primary cell (PCell) and SCell. For one serving cell, bytes 1c-10, 1c-20, and 1c-30, each including at least one PH information, and bytes 1c-15, 1c-25, and 1c-35, each selectively including UE transmission power information, are generated. In this regard, PH information is addressed in a PH field configured of 6 bits. In addition to the PH field, a P field and a V field are included in the bytes 1c-10, 1c-20, and 1c-30, each including PH information. The P field is used to indicate whether the PH information has been affected by UE transmission power that is limited according to a specification and rules, not a wireless power control factor. The V field is used to indicate a case in which PH information is generated by inserting a predefined parameter because an actual transmission did not occur. When the V field is set as 1, it indicates that the predefined parameter has been used, and UE transmission power information addressed in another byte is omitted.

Next to a byte of the PH field, bytes 1c-15, 1c-25, and 1c-35, each including UE transmission power information corresponding to information of the PH field are followed. The bytes 1c-15, 1c-25, and 1c-35, each including UE transmission power information include a Pcmax field for addressing UE transmission power information, the Pcmax field being configured of 6 bits. In this regard, the remaining 2 bits are reserved bits that are not used in addressing certain information.

When PH information of PCell and PH information of one or more SCells are included in one PHR format, information corresponding to PCell is included, and then PH information corresponding to SCells according to ascending order of SCell indexes is included. In a case of PCell, a PUCCH is present, and a PUSCH and a PUCCH may be simultaneously transmitted according to capabilities of a network and a UE. When the PUSCH and the PUCCH are simultaneously used, transmit power allocated to the PUSCH and transmit power allocated to the PUCCH have to be subtracted from the maximum transmit power of the UE so as to compute a PH. When the PUSCH and the PUCCH are simultaneously used, an NB previously commanded the simultaneous use of PUSCH and PUCCH to the UE by using a PUCCH configuration. To provide PH for a case in which the PUSCH is solely transmitted or transmitted together with the PUCCH, Type 1 PH 1c-20 and Type 2 PH 1c-10 are used. Type 1 PH is defined as Pcmax-PPUSCH. In this regard, PPUSCH refers to an amount of power allocated to the PUSCH. Type 2 PH is defined as Pcmax-PPUSCH-PPUCCH. In this regard, PPUCCH refers to an amount of power allocated to the PUCCH. When simultaneous use of the PUSCH and the PUCCH is not indicated in a PUCCH configuration, only Type 1 PH is used. Alternatively, both Type 1 PH and Type 2 PH are used. Type 2 PH is applied only to a PCell in a CA system, and is not applied to an SCell. When simultaneous use of the PUSCH and the PUCCH is indicated in a PUCCH configuration, a PCell includes both Type 1 PH and Type 2 PH as PH. In consideration of a fact that Type 1 PH is necessary to interpret Type 2 PH, the PH of a PCell is arranged at the front. In a case of an SCell, when a ul-Configuration is set, Type 3 PH is applied thereto, and otherwise, Type 1 PH is applied thereto.

The UE computes power headroom by using Equation (1) below. Equation (1) is used when only PUSCH is transmitted.

$$PH(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad (1)$$

PH(i) of an $i^{th}$ subframe in a serving cell c is computed based on maximum uplink transmit power $P_{CMAX,c}(i)$, the number of resource blocks $M_{PUSCH,c}(i)$, power offset $\Delta_{TF,c}$ induced from MCS, path loss $PL_c$, and G(i) (accumulated TPC commands). In Equation (1) above, $PL_c$ refers to path loss of a cell configured to provide the path loss with respect to the serving cell c. Path loss used in determining uplink transmit power of a random serving cell may be path loss of a forward channel of the serving cell or path loss of a forward channel of another cell. Which path loss among those described above to be used is notified to the UE after the NB selects a path loss in a call configuration procedure. In addition, in Equation (1) above, $f_c(i)$ refers to an accumulated value of transmit power control commands of the serving cell c. $P_{O\_PUSCH,c}$ indicates a parameter of an upper layer and corresponds to a sum of a cell-specific value and an UE-specific value. In general, a value of $P_{O\_PUSCH,c}$ varies according to types of transmission of the PUSCH, the types including semi-persistent scheduling, dynamic scheduling, a random access response, or the like. $\alpha_c$ is a 3-bit cell-specific value provided from an upper layer and is a weight to be applied to path loss in computation of uplink transmit power (i.e., when the weight is increased, the uplink transmit power is further affected by the path loss), and an applicable value is limited according to the types of the PUSCH. A j value is used to indicate a type of the PUSCH. A case of j=0 indicates semi-persistent scheduling, a case of j=1 indicates dynamic scheduling, and a case of j=2 indicates a random access response. In Equation (1) above, when transmission of the PUSCH does not occur in a certain serving cell, $M_{PUSCH}$ and ATF may not be applied to Equation (1) above due to definition.

Even when there is no actual transmission of the PUSCH, the NB may trigger PH so as to obtain information about path loss in a certain uplink. When PHR is triggered with respect to a certain serving cell, the UE determines a method of computing a PH value according to whether the PUSCH is transmitted. When transmission of the PUSCH occurs with respect to the certain serving cell, PH is computed by using Equation (1) above. When transmission of the PUSCH does not occur with respect to the certain serving cell, it indicates that there is no allocated transmission resource, and thus, it is not clear which values are used as $M_{PUSCH}$ and $\Delta_{TF}$. In this regard, it is necessary to provide a device configured to allow the NB and the UE to compute and interpret PH by using the same $M_{PUSCH}$ and $\Delta_{TF}$. This may be determined by defining a transmission format (an amount of transmission resources and an MCS level) to be used by the NB and the UE when the NB and the UE computes PH for a case where there is no transmission of the PUSCH. When one RB and a lowest MCS level are assumed as a reference transmission format, $M_{PUSCH}$ and $\Delta_{TF}$ are each 0 and this indicates that $M_{PUSCH}$ and $\Delta_{TF}$ are excluded from Equation (1) above. That is, because data transmission did not actually occur in a certain serving cell, $P_{CMAX,c}(i)$ does not exist. Therefore, it is necessary to determine which value is to be set as $P_{CMAX,c}(i)$. For such a virtual transmission, virtual $P_{CMAX,c}(i)$ is defined and used. $P_{CMAX,c}(i)$ may be determined by using $P_{EMAX}$ and $P_{powerclass}$, wherein $P_{EMAX}$ indicates maximum transmit power allowed in the certain cell and $P_{powerclass}$ indicates maximum transmit power internally allowed in the UE. For example, the value may be determined in Equation (2) below.

$$P_{CMAX,c} = \min\{P_{EMAX}, P_{PowerClass}\} \quad (2)$$

$P_{CMAX}$ is determined based on a relation of $P_{CMAX,L} \leq P_{CMAX} \leq P_{CMAX,H}$. In this regard, in consideration of zero power back-off, $P_{CMAX,L} = P_{CMAX,H}$, and thus, $P_{CMAX} = P_{CMAX,H}$. In this regard, $P_{CMAX,H}$ is less than $P_{PowerClass}$ and $P_{EMAX}$. $P_{EMAX}$ indicates a cell-specific allowed maximum transmit power, and $P_{PowerClass}$ indicates a UE-specific allowed maximum transmit power.

FIGS. 4A, 4B, 4C, and 4D are diagrams of a PHR format, according to an embodiment.

Referring to FIGS. 4A, 4B, 4C, and 4D, FIG. 4A corresponds to a PHR format of a case in which a PCell or an SUL transmits a PUSCH. The PHR format may be applied when simultaneous transmission of PUSCH and PUCCH is not supported. The PHR format according to an embodiment indicates PH information about a maximum of two uplinks, but does not include a combination of bits indicating an SCell, as in a PHR format of an LTE system. A byte 1d-05 including a PH field also includes a P field and a V field, and their objectives are the same as in the LTE system. A byte 1d-10 including a $P_{cmax}$ field may be omitted when a value of a V field is 1.

FIG. 4B corresponds to a PHR format of a case in which a PUSCH and a PUCCH are configured in only one uplink among a PCell and an SUL, and simultaneous transmission of a PUSCH and a PUCCH is supported. The PHR format may sequentially include Type 2 PH 1d-15 and 1d-20 and Type 1 PH 1d-25 and 1d-30 which correspond to an uplink to which PUSCH and PUCCH are configured.

FIG. 4C corresponds to a PHR format of a case in which a PUSCH is transmitted in one uplink among a PCell and an SUL and a PUCCH is transmitted in the other uplink, and simultaneous transmission of a PUSCH and a PUCCH is supported in an uplink. In the PHR format, the uplink through which a PUCCH is transmitted supports simultaneous transmission of a PUSCH and a PUCCH, therefore, both Type 2 PH and Type 1 PH may be included. In addition, Type 1 PH corresponding to the uplink through which a PUSCH is transmitted may be included. Regardless of a PCell and an SUL, Type 2 PH 1d-35 and 1d-40 may be positioned at the top of the PHR format. Afterward, Type 1 PH 1d-45 and 1d-50 of a PCell and Type 1 PH 1d-55 and 1d-60 of an SUL may be sequentially included.

FIG. 4D corresponds to a PHR format of a case in which a PUSCH is transmitted in one uplink among a PCell and an SUL and a PUCCH is transmitted in the other uplink, and simultaneous transmission of a PUSCH and a PUCCH is not supported in an uplink. In the PHR format, any uplink does not support simultaneous transmission of a PUSCH and a PUCCH, therefore, Type 2 PH is not included. Type 1 PH 1d-65 and 1d-70 of a PCell and Type 1 PH 1d-75 and 1d-80 of an SUL may be sequentially included.

In a case where certain configuration information is provided in the aforementioned formats, Type 3 PH may be included instead of Type 1 PH. It is possible to configure a PHR format that does not consider a case in which PH information is generated by inserting a predefined parameter due to a non-occurrence of a transmission. In this case, $P_{cmax}$ fields are omitted. In addition, information of a V field is discarded.

Figure 5:
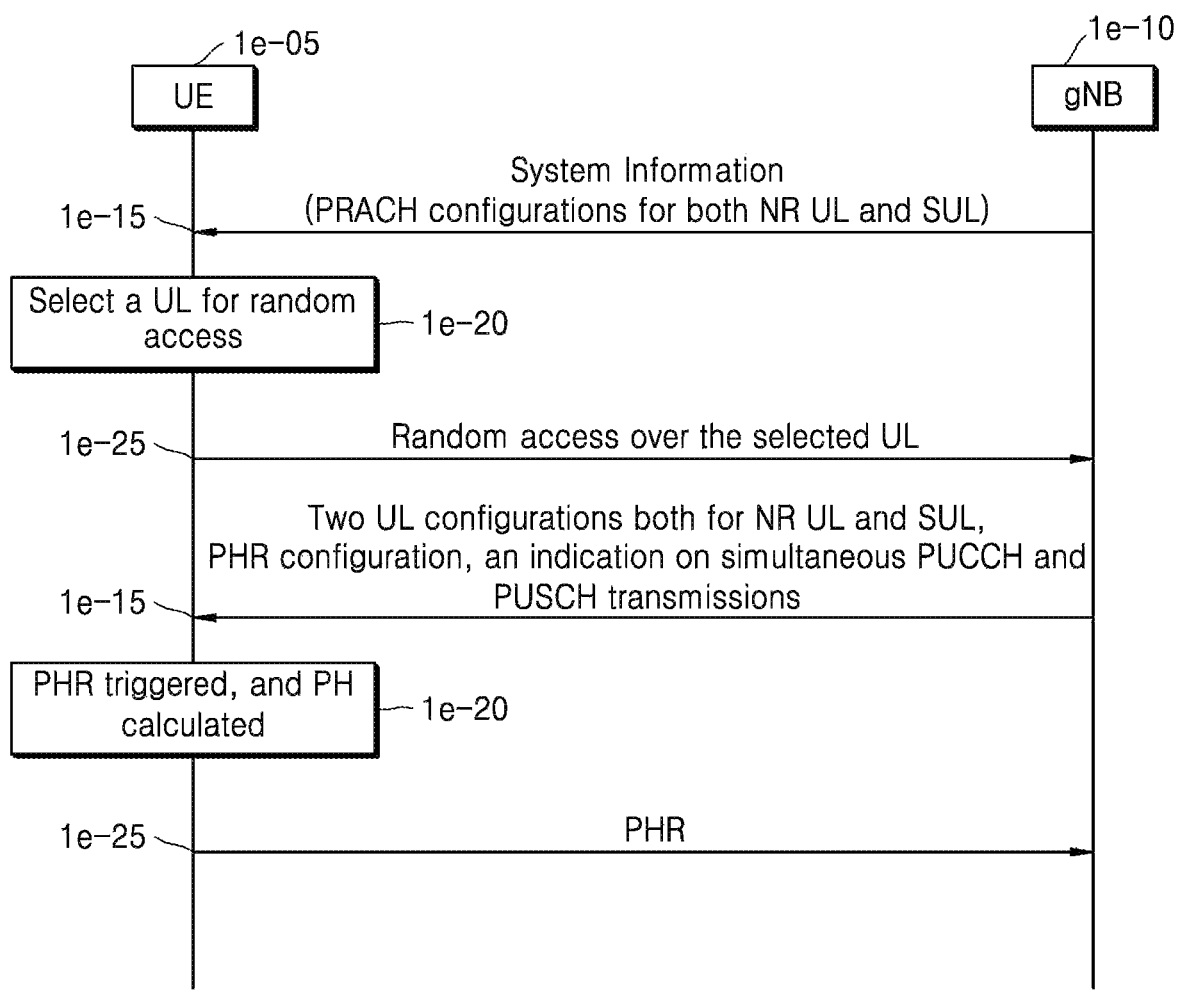
FIG. 5 is a flowchart of a method of transmitting a PHR, according to an embodiment.

FIG. 5 is a flow diagram of a process of transmitting a PHR, according to an embodiment.

Referring to FIG. 5, UE 1e-05 receives system information from a gNB 1e-10 at step 1e-15. The system information may include a physical random access channel (PRACH) configuration information applied to an NR uplink and an SUL. The UE 1e-05 selects one uplink according to preset rules at step 1e-20, and performs a random access through the selected uplink at step 1e-25. When the random access is successfully completed, the UE 1e-05 enters a connection mode and then receives configuration information from the base station (gNB) 1e-10 at step 1e-15. When the UE 1e-05 uses both the NR uplink and the SUL, configuration information for both uplinks must be provided. The gNB 1e-10 transmits PHR configuration information to the UE 1e-05. The PHR configuration information may include a dl-PathlossChange, prohibitPHR-Timer, and a periodicPHR-Timer. The gNB 1e-10 may configure, to the UE 1e-05, whether simultaneous transmission of a PUSCH and a PUCCH is supported by each of the NR uplink and the SUL. The gNB 1e-10 may configure whether to generate PH information by inserting a predefined parameter due to a non-occurrence of a transmission. When a PHR is triggered based on preset rules, the UE 1e-05 calculates PH with respect to each serving cell at step 1e-20. The UE 1e-05 selects one of the formats illustrated in FIG. 4 according to conditions, and transmits the PHR to the gNB 1e-10 at step 1e-25.

Figure 6:
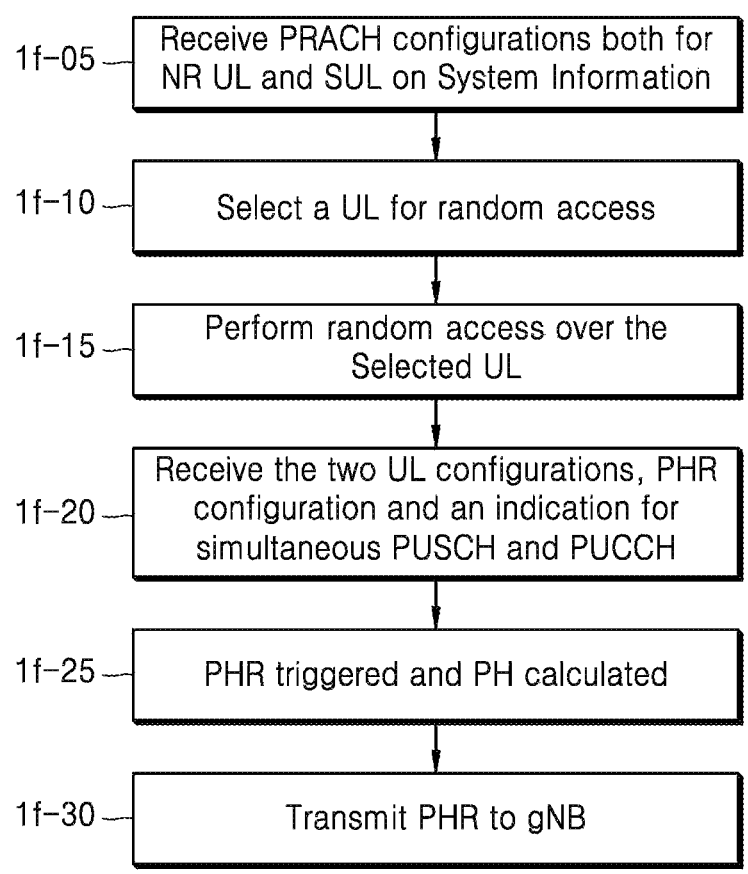
FIG. 6 is a flowchart of a method of a UE transmitting a PHR, according to an embodiment.

FIG. 6 is a flowchart of operations of a UE that transmits a PHR, according to an embodiment.

Referring to FIG. 6, at step 1f-05, the UE receives system information from a base station. The system information may include PRACH configuration information applied to an NR uplink and SUL.

At step 1f-10, the UE selects one uplink according to preset rules.

At step 1f-15, the UE performs a random access through the selected uplink.

At step 1f-20, the UE receives configuration information about both uplinks. The PHR configuration information may include a dl-PathlossChange, a prohibitPHR-Timer, and a periodicPHR-Timer. The UE may be configured, by the base station (gNB), whether simultaneous transmission of a PUSCH and a PUCCH is supported by each of the NR uplink and the SUL. In addition, the UE may be configured, by the gNB, whether to generate PH information by inserting a predefined parameter due to a non-occurrence of a transmission.

At step 1f-25, when a PHR is triggered based on preset rules, the UE calculates PH with respect to each serving cell.

At step 1f-30, the UE selects one of formats illustrated in FIG. 4 according to conditions, and transmits the PHR to the gNB.

Figure 7:
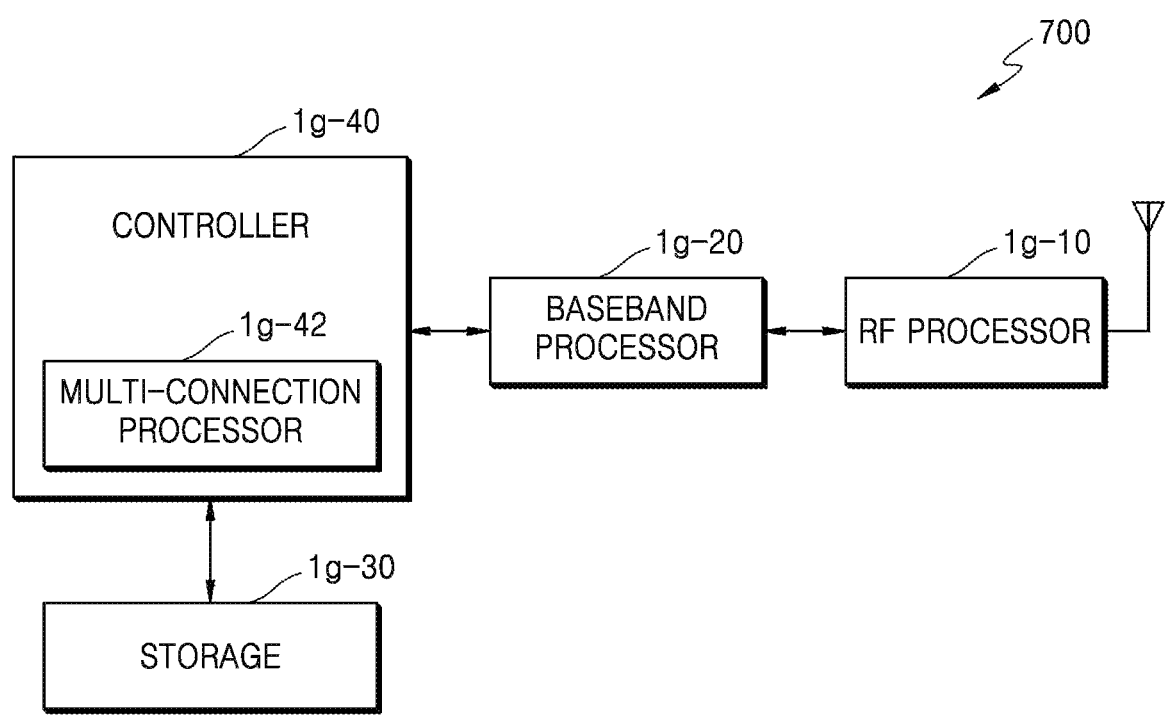
FIG. 7 is a block diagram of a UE, according to an embodiment.

FIG. 7 is a block diagram of a UE 700, according to an embodiment.

Referring to FIG. 7, the UE 700 includes a radio frequency (RF) processor 1g-10, a baseband processor 1g-20, a storage 1g-30, and a controller 1g-40.

The RF processor 1g-10 performs functions including conversion, amplification, or the like of a band of a signal so as to transceive the signal through a wireless channel. That is, the RF processor 1g-10 up-converts a baseband signal provided from the baseband processor 1g-20 to an RF band signal and receives the RF band signal via an antenna, and down-converts an RF band signal received via the antenna to a baseband signal. For example, the RF processor 1g-10 may include a transmission filter, a reception filter, an amplifier, a mixer, an oscillator, a digital-to-analog converter (DAC), an analog-to-digital converter (ADC), or the like. Although FIG. 7 illustrates only one antenna, the UE 700 may include a plurality of antennas. In addition, the RF processor 1g-10 may include a plurality of RF chains. Furthermore, the RF processor 1g-10 may perform beamforming. For beamforming, the RF processor 1g-10 may adjust phases and magnitudes of respective signals transceived via the plurality of antennas or antenna elements. Furthermore, the RF processor 1g-10 may perform MIMO, and may transceive a plurality of layers while performing a MIMO operation.

The baseband processor 1g-20 performs a function of conversion between the baseband signal and a bit string according to a physical layer specification of a system. For example, in data transmission, the baseband processor 1g-20 generates complex symbols by encoding and modulating a transmitted bit string. In addition, in data reception, the baseband processor 1g-20 reconstructs a received bit string by demodulating and decoding a baseband signal provided from the RF processor 1g-10. For example, when data is transmitted according to an OFDM scheme, the baseband processor 1g-20 generates complex symbols by encoding and modulating a transmitted bit string, maps the complex symbols to subcarriers, and configures OFDM symbols by performing an inverse fast Fourier transform (IFFT) operation and inserting a cyclic prefix (CP). Furthermore, in data reception, the baseband processor 1g-20 may divide the baseband signal provided from the RF processor 1g-10 into OFDM symbol units and restore the signals mapped to the subcarriers by performing a fast Fourier transform (FFT) operation and then reconstruct the received bit string by demodulating and decoding the signals.

The baseband processor 1g-20 and the RF processor 1g-10 transmit and receive signals as described above. Accordingly, the baseband processor 1g-20 and the RF processor 1g-10 may be referred to as a transmitter, a receiver, a transceiver, or a communicator. Furthermore, at least one of the baseband processor 1g-20 and the RF processor 1g-10 may include a plurality of communication modules to support different wireless access technologies. In addition, at least one of the baseband processor 1g-20 and the RF processor 1g-10 may include different communication modules configured to support a plurality of different wireless access technologies. Furthermore, at least one of the baseband processor 1g-20 and the RF processor 1g-10 may include different communication modules configured to process signals of different frequency bands. For example, the different wireless access technologies may include a wireless local area network (WLAN) (e.g., Institute of Electrical and Electronics Engineers (IEEE) standard 7+102.11), a cellular network (e.g., an LTE network or an NR network), or the like. Examples of the different frequency bands may include a super high frequency (SHF) band (e.g., 2 NRHz or 1 NRHz), and a millimeter wave (mmWave) band (e.g., 60 GHz).

The storage 1g-30 may store data such as a default program, an application program, and configuration information for the operations of the UE. For example, the storage 1g-30 may store information about a second access node configured to perform wireless communication by using a second wireless access technology. In addition, the storage 1g-30 provides stored data, in response to a request by the controller 1g-40.

The controller 1g-40 controls overall operations of the UE. For example, the controller 1g-40 transmits and receives signals through the baseband processor 1g-20 and the RF processor 1g-10. In addition, the controller 1g-40 records and reads the data stored in the storage 1g-30. To do so, the controller 1g-40 may include at least one processor. For example, the controller 1g-40 may include a communication processor configured to perform communication control and an application processor (AP) configured to control an upper layer such as an application program.

Figure 8:
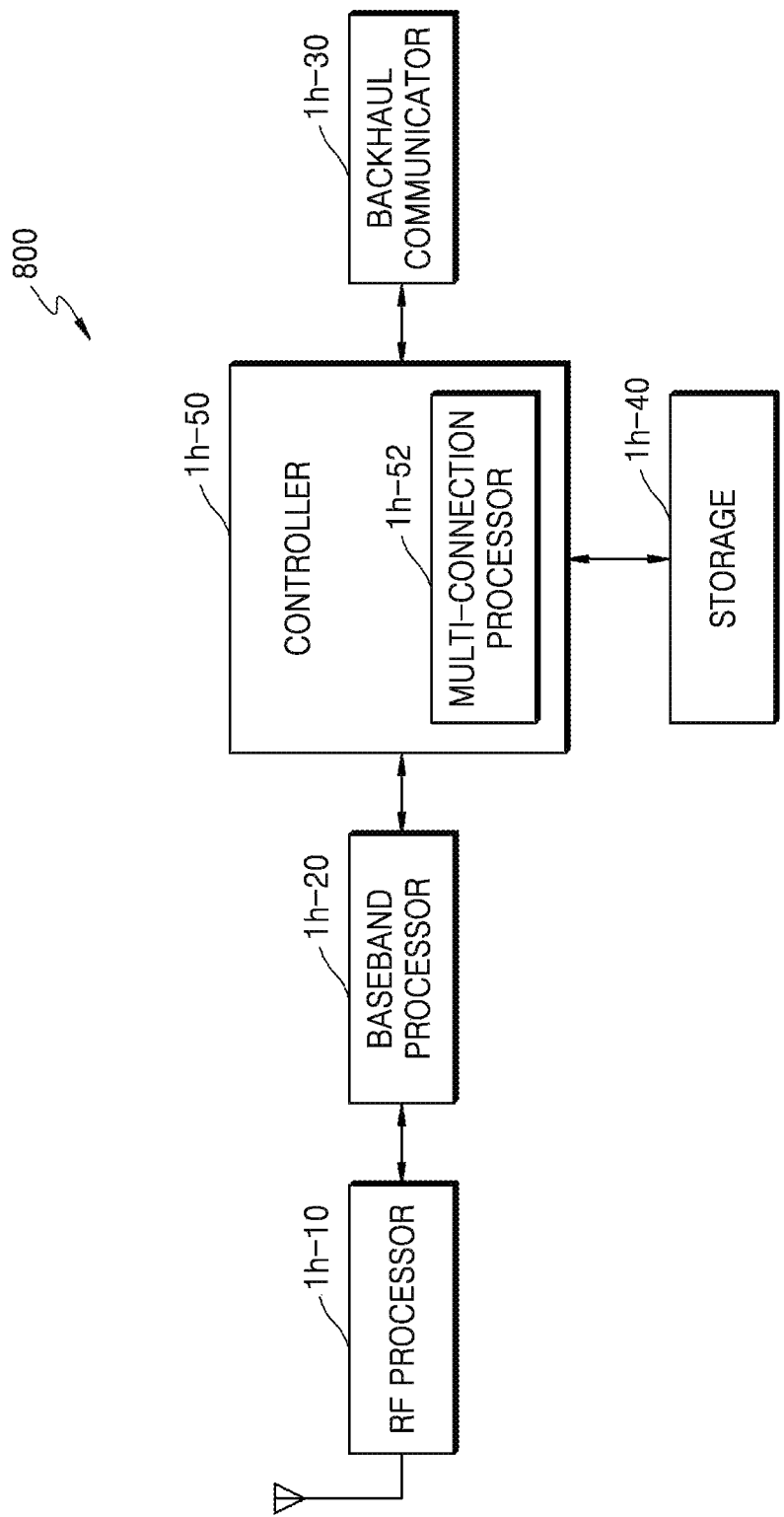
FIG. 8 is a block diagram of a base station in a wireless communication system, according to an embodiment.

FIG. 8 is a diagram illustrating a configuration of a base station 800 in a wireless communication system according to an embodiment.

Referring to FIG. 8, the base station 800 includes an RF processor 1h-10, a baseband processor 1h-20, a backhaul communicator 1h-30, a storage 1h-40, and a controller 1g-50.

The RF processor 1h-10 performs functions including conversion, amplification, or the like of a band of a signal so as to transceive the signal through a wireless channel. That is, the RF processor 1h-10 up-converts a baseband signal provided from the baseband processor 1h-20 to an RF band signal and receives the RF band signal via an antenna, and down-converts an RF band signal received via the antenna to a baseband signal. For example, the RF processor 1h-10 may include a transmission filter, a reception filter, an amplifier, a mixer, an oscillator, a DAC, an ADC, or the like. Although FIG. 8 illustrates only one antenna, the base station 800 may include a plurality of antennas. In addition, the RF processor 1h-10 may include a plurality of RF chains. Furthermore, the RF processor 1h-10 may perform beamforming. For beamforming, the RF processor 1h-10 may adjust phases and magnitudes of respective signals transceived via the plurality of antennas or antenna elements. Furthermore, the RF processor 1h-10 may perform a down-MIMO operation by transmitting one or more layers.

The baseband processor 1h-20 performs a function of conversion between the baseband signal and a bit string according to a physical layer specification of a first wireless access technology. For example, in data transmission, the baseband processor 1h-20 generates complex symbols by encoding and modulating a transmitted bit string. In addition, in data reception, the baseband processor 1h-20 reconstructs a received bit string by demodulating and decoding a baseband signal provided from the RF processor 1h-10. For example, when data is transmitted according to an OFDM scheme, the baseband processor 1h-20 generates complex symbols by encoding and modulating a transmitted bit string, maps the complex symbols to subcarriers, and configures OFDM symbols by performing an IFFT operation and inserting a CP. Furthermore, in data reception, the baseband processor 1h-20 may divide the baseband signal provided from the RF processor 1h-10 into OFDM symbol units and restore the signals mapped to the subcarriers by performing a FFT operation and then reconstruct the received bit string by demodulating and decoding the signals. Accordingly, the baseband processor 1h-20 and the RF processor 1h-10 may be referred to as a transmitter, a receiver, a transceiver, a communicator, or a wireless communicator.

The backhaul communicator 1h-30 provides an interface for performing communication with other nodes in a network. That is, the backhaul communicator 1h-30 converts a bit string to a physical signal, the bitstream being transmitted from the base station 800 to other nodes including an auxiliary base station, a core network, or the like, and converts a physical signal received from other nodes to a bit string.

The storage 1h-40 stores data such as a default program, an application program, and configuration information for operations of the base station 800. For example, the storage 1h-40 may store information about a bearer allocated to a connected UE, a measurement result reported by the connected UE, or the like. In addition, the storage 1h-40 may store information that is a criterion of determining whether to provide or stop multi-connection to the UE. Furthermore, the storage 1h-40 may provide stored data, in response to a request by the controller 1h-50.

The controller 1h-50 controls all operations of the base station 800. For example, the controller 1h-50 transceives signals via the baseband processor 1h-20 and the RF processor 1h-10, or via the backhaul communicator 1h-30. In addition, the controller 1h-50 may record/read data to/from the storage 1h-40. To do so, the controller 1h-50 may include at least one processor.

Figure 9:
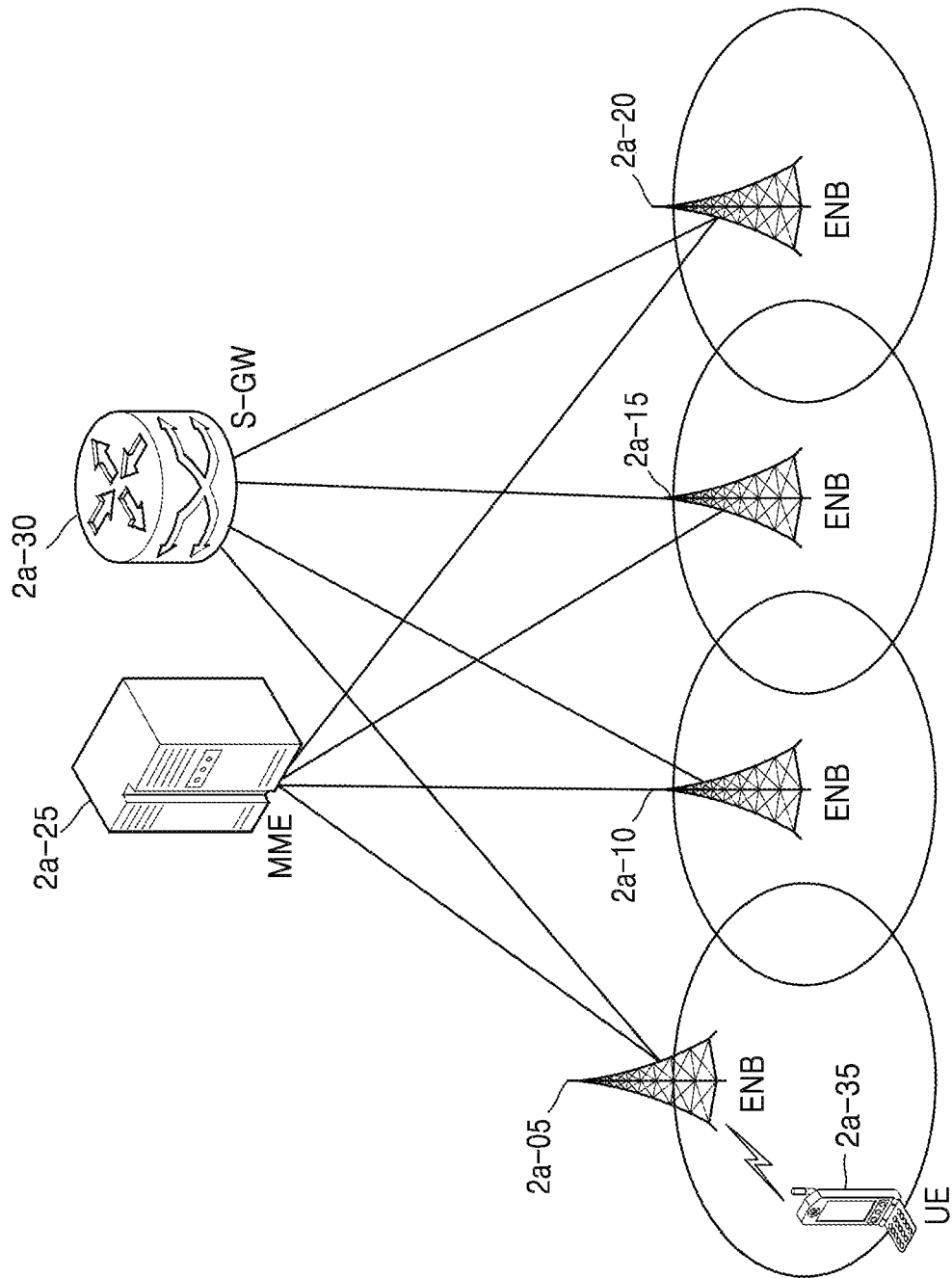
FIG. 9 is a diagram of an LTE system, according to an embodiment.

FIG. 9 is a diagram of an LTE system according to an embodiment.

Referring to FIG. 9, a wireless access network of the LTE system is configured of a plurality of evolved node B (hereinafter, an eNB, a Node B, or a base station) 2a-05, 2a-10, 2a-15, and 2a-20, a mobility management entity (MME) 2a-25, and a serving-gateway (S-GW) 2a-30. A user equipment (hereinafter, a UE or a terminal) 2a-35 accesses an external network via the eNBs 2a-05, 2a-10, 2a-15, and 2a-20 and the S-GW 2a-30.

The eNBs 2a-05, 2a-10, 2a-15, and 2a-20 each correspond to an existing node B of a universal mobile telecommunication system (UMTS) system. The eNBs 2a-05, 2a-10, 2a-15, and 2a-20 are each connected to the UE 2a-35, and performs complicated functions, compared to the existing node B. In the LTE system, all user traffic including a real-time service such as a voice over internet protocol (VoIP) based on an internet protocol is serviced through a shared channel, and thus, a device to obtain and schedule a plurality of pieces of state information including buffer states, available transmit power states, channel states, or the like of UEs is required, and the eNBs 2a-05, 2a-10, 2a-15, and 2a-20 each correspond to the device. In general, one eNB controls a plurality of cells. For example, to implement transmission speed of 100 Mbps, the LTE system uses, as a wireless access technology, OFDM at a bandwidth of 20 MHz. In addition, the LTE system uses an AMC technique of determining a modulation scheme and a channel coding rate according to a channel state of the UE. The S-GW 2a-30 is a device configured to provide a data bearer, and generates or removes the data bearer, in response to a control of the MME 2a-25. The MME 2a-25 performs not only a mobility management function but also performs various control functions with respect to the UE, and is connected to a plurality of eNB s.

Figure 10:
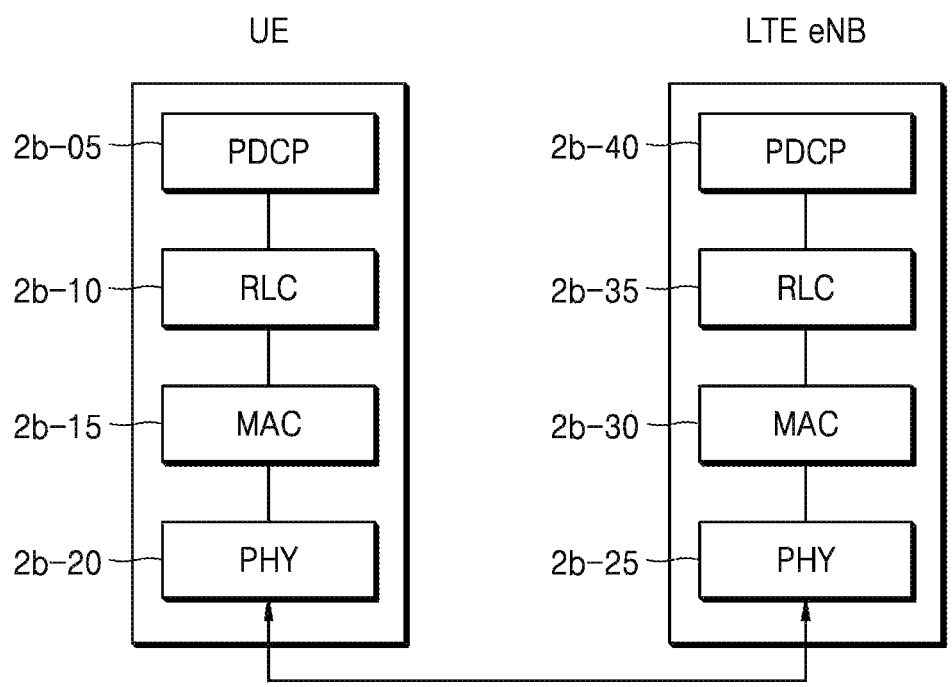
FIG. 10 is a block diagram of a radio protocol architecture in an LTE system, according to an embodiment.

FIG. 10 is a block diagram of a radio protocol architecture in an LTE system according to an embodiment.

Referring to FIG. 10, the radio protocol of the LTE system may be configured of packet data convergence protocols (PDCPs) 2b-05 and 2b-40, radio link controls (RLCs) 2b-10 and 2b-35, medium access controls (MACs) 2b-15 and 2b-30, and physical layers (PHYs) 2b-20 and 2b-25, respectively in a UE and an LTE eNB. The PDCPs 2b-05 and 2b-40 may perform operations such as Internet protocol (IP) header compression/decompression. The main functions of the PDCPs 2b-05 and 2b-40 are summarized as follows.

Header compression and decompression (ROHC only)
Transfer of user data
In-sequence delivery of upper layer packet data units (PDUs) at PDCP re-establishment procedure for RLC AM
For split bearers in data convergence (DC) (RLC acknowledged mode (AM)): PDCP PDU routing for transmission and PDCP PDU reordering for reception
Duplicate detection of lower layer service data units (SDUs) at PDCP re-establishment procedure for RLC AM
Retransmission function PDCP SDUs at handover and for split bearers in DC, PDCP PDUs at PDCP data-recovery procedure, for RLC AM
Ciphering and deciphering function
Timer-based SDU discard in uplink The RLCs 2b-10 and 2b-35 reconfigure a PDCP PDU to an appropriate size to perform an automatic repeat request (ARQ) operation or the like. The main functions of the RLCs 2b-10 and 2b-35 are summarized below.

Transfer of upper layer PDUs
Error correction through ARQ (only for acknowledged mode (AM) data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol Error detection (only for AM data transfer)
RLC SDU discard (only for UM and AM data transfer)
RLC re-establishment The MACs 2b-15 and 2b-30 are connected to a plurality of RLC layer apparatuses configured in one UE, and perform operations of multiplexing RLC PDUs into MAC PDUs and demultiplexing RLC PDUs from MAC PDUs. The main functions of the MACs 2b-15 and 2b-30 are summarized below.

Mapping between logical channels and transport channels
Multiplexing/demultiplexing of MAC SDUs belonging to one or different logical channels into/from transport blocks (TB s) delivered to/from the physical layer on transport channels
Scheduling information reporting
Error correction through hybrid automatic repeat request (HARQ)
Priority handling between logical channels of one UE
Priority handling between UEs by means of dynamic scheduling
MB MS service identification
Transport format selection
Padding The PHYs 2b-20 and 2b-25 perform operations of channel-encoding and modulating upper layer data and transmitting OFDM symbols through a wireless channel by converting the upper layer data to the OFDM symbols or operations of demodulating and channel-decoding OFDM symbols received through the wireless channel, and transmitting decoded data to an upper layer.

Figure 11:
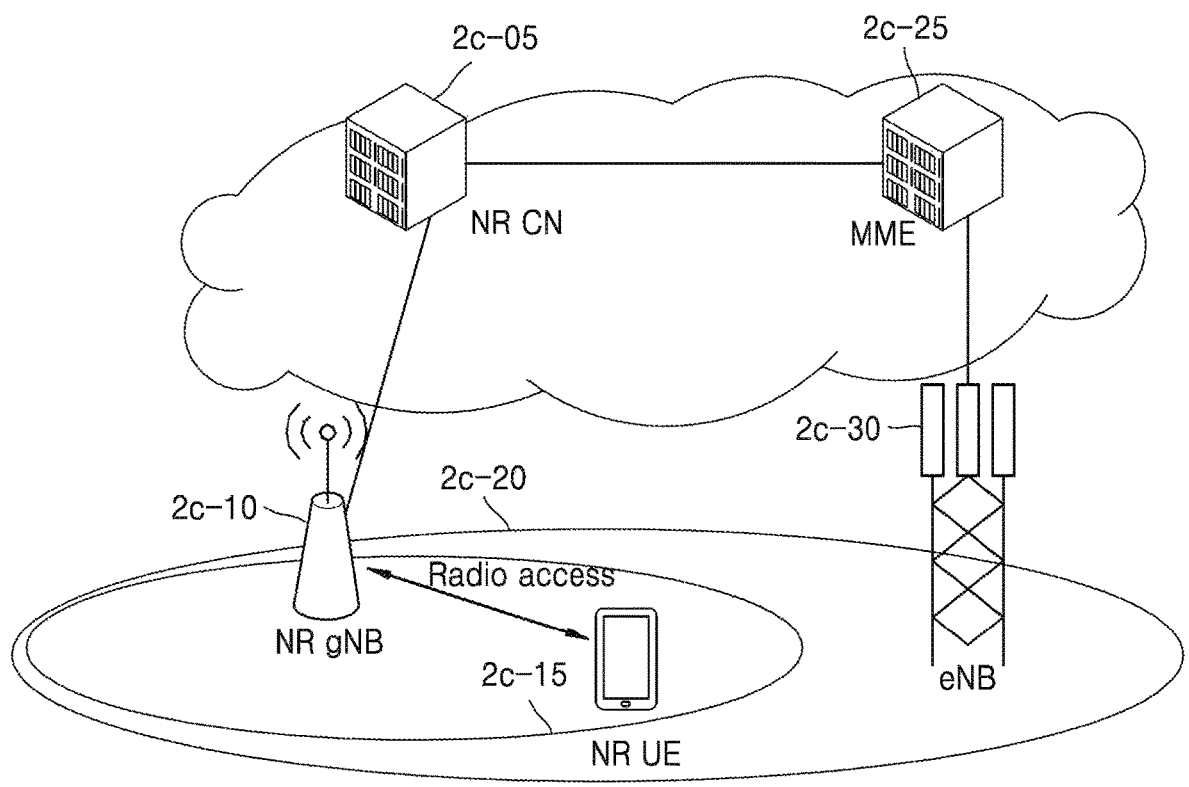
FIG. 11 is a diagram of a mobile communication system to which an embodiment is applied.

FIG. 11 is a diagram of a mobile communication system to which an embodiment is applied.

Referring to FIG. 11, a wireless access network of the mobile communication system (hereinafter, NR or 5G) is configured of a new radio node B (hereinafter, NR gNB or NR base station) 2c-10 and a new radio core network (hereinafter, NR CN) 2c-05. A new radio user equipment (hereinafter, a NR UE or a terminal) 2c-15 accesses an external network through the NR gNB 2c-10 and the NR CN 2c-05.

The NR gNB 2c-10 corresponds to an evolved node B (eNB) of an existing LTE system. The NR gNB 2c-10 is connected to the NR UE 2c-15 through a wireless channel and may provide an excellent service, compared to the eNB according to the related art. In the NR, all user traffic is serviced through a shared channel, and, thus, a device to obtain and schedule a plurality of pieces of state information including buffer states, available transmit power states, channel states, or the like of UEs is required, and the NR gNB 2c-10 corresponds to the device. In general, one NR gNB controls a plurality of cells. A bandwidth greater than the maximum bandwidth of existing LTE may be given to achieve high speed data transmission, compared to the existing LTE system, and beamforming technology may be added to wireless access technology such as OFDM.

In addition, the NR uses an AMC technique of determining a modulation scheme and a channel coding rate according to a channel state of a UE. The NR CN 2c-05 performs functions of supporting mobility, configuring a bearer, configuring a QoS, or the like. The NR CN 2c-05 is a device configured to perform not only a mobility management function but also various control functions with respect to the UE, and is connected to a plurality of NBs. In addition, the NR may interoperate with the existing LTE system, and the NR CN 2c-05 is connected to a MME 2c-25 via a network interface. The MME 2c-25 is connected to an eNB 2c-30 that is an existing base station.

Figure 12:
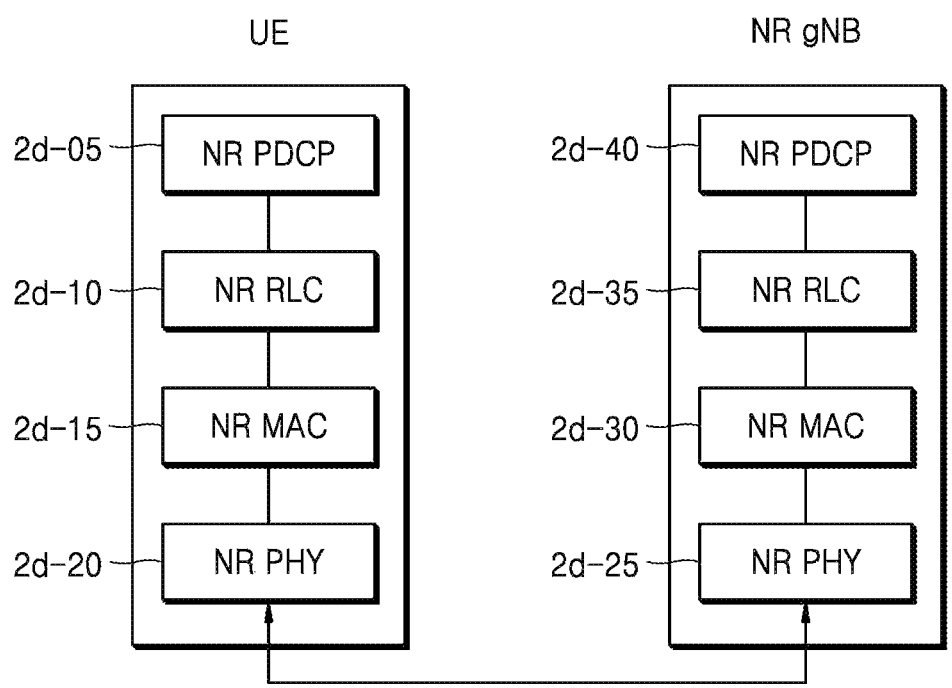
FIG. 12 is a block diagram of a radio protocol architecture of a new mobile communication system to which an embodiment is applied.

FIG. 12 is a block diagram of a radio protocol architecture of a mobile communication system to which an embodiment is applied.

Referring to FIG. 12, a radio protocol of the mobile communication system is configured of NR PDCPs 2d-05 and 2d-40, NR RLCs 2d-10 and 2d-35, NR MACs 2d-15 and 2d-30, and NR PHYs 2d-20 and 2d-25, respectively in UE and a NR gNB. The main functions of the NR PDCPs 2d-05 and 2d-40 may include some of the following functions.

Header compression and decompression (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering function
Timer-based SDU discard in uplink In the above, reordering for reception of the NR PDCPs 2d-05 and 2d-40 may refer to a function of sequentially reordering of PDCP PDUs received from a lower layer, based on PDCP sequence numbers (SNs), and may include a function of transferring data to an upper layer in the reordered order or a function of directly transferring data without consideration of an order, a function of reordering the order and recording missing PDCP PDUs, a function of transmitting a state report about the missing PDCP PDUs to a transmitter, and a function of requesting retransmission of the missing PDCP PDUs.

The main functions of the NR RLCs 2d-10 and 2d-35 may include at least some of the following functions.

Transfer of upper layer PDU
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection function
Protocol error detection
RLC SDU discard
RLC re-establishment In this regard, the in-sequence delivery of the NR RLCs 2d-10 and 2d-35 may refer to a function of sequentially transferring RLC SDUs received from a lower layer to an upper layer, and may include a function of reassembling and delivering a plurality of RLC SDUs when one RLC SDU which has been segmented into the plurality of RLC SDUs is received, a function of reordering the received RLC PDUs according to RLC SNs or PDCP SNs, a function of reordering the order and recording missing RLC PDUs, a function of transmitting a state report about the missing RLC PDUs to a transmitter, and a function of requesting retransmission of the missing RLC PDUs. When there is a missing RLC SDU, the in-sequence delivery may include a function of sequentially transferring only the RLC SDUs before the missing RLC SDU to the upper layer, and even when there is the missing RLC SDU, when a preset timer has expired, may include a function of sequentially transferring, to the upper layer, all RLC SDUs received before the preset timer started, or may include a function of sequentially transferring all RLC SDUs received up to now to the upper layer even when there is the missing RLC SDU, when the timer has expired. In addition, the NR RLCs 2d-10 and 2d-35 may process the RLC PDUs in the order of reception (in the order of arrival irrespective of the order of sequence numbers), and may transfer the RLC PDUs to the NR PDCPs 2d-05 and 2d-40, regardless of the order (out-of-sequence delivery), and in a case of a segment, the NR RLCs 2d-10 and 2d-35 may receive segments stored in a buffer or to be received at a later time, may reconstruct the segments into one RLC PDU, and then may process and transfer the RLC PDU to the NR PDCPs 2d-05 and 2d-40. The NR RLCs 2d-10 and 2d-35 may not include a concatenation function. The concatenation function may be performed by the NR MACs 2d-15 and 2d-30 or may be replaced by a multiplexing function of the NR MACs 2d-15 and 2d-30.

The out-of-sequence delivery of the NR RLCs 2d-10 and 2d-35 may refer to a function of transferring the RLC SDUs received from the lower layer directly to the upper layer, regardless of the order. When one RLC SDU which has been segmented into a plurality of RLC SDUs is received, the out-of-sequence delivery may include a function of reassembling and transferring the plurality of RLC SDUs. In addition, the out-of-sequence delivery may include a function of storing RLC SN or PDCP SN of the received RLC PDUs and ordering thereof, and recording of missing RLC PDUs.

The NR MACs 2d-15 and 2d-30 may be connected to a plurality of NR RLC layer apparatuses configured in one UE, and the main function of the NR MACs 2d-15 and 2d-30 may include some of the following functions.

Mapping between logical channels and transport channels.
Multiplexing/demultiplexing of MAC SDUs
Scheduling information reporting function
Error correction through HARQ
Priority handling between logical channels of one UE
Priority handling between UEs by means of dynamic scheduling MBMS service identification
Transport format selection
Padding The NR PHYs 2*d*-20 and 2*d*-25 perform operations of channel-encoding and modulating upper layer data and transmitting OFDM symbols through a wireless channel by converting the upper layer data to the OFDM symbols, or operations of demodulating and channel-decoding OFDM symbols received through the wireless channel, and transmitting decoded data to an upper layer.

In an embodiment, there is provided a procedure of a wireless communication system in which a UE compresses data to be transmitted to an uplink and a NB decompresses the data, and there is also provided a supporting method with respect to a data transceiving procedure in which a transmitting end compresses and transmits data and a receiving end decompresses the data, the supporting method including a specific header format, a method of solving failure of decompression, or the like. The embodiment may also be applied to a procedure in which the NB compresses downlink data to be transmitted to the UE and the UE receives and decompresses the compressed downlink data.

The transmitting end compresses and transmits data such that more data may be transmitted and coverage may also be improved.

Figure 13:
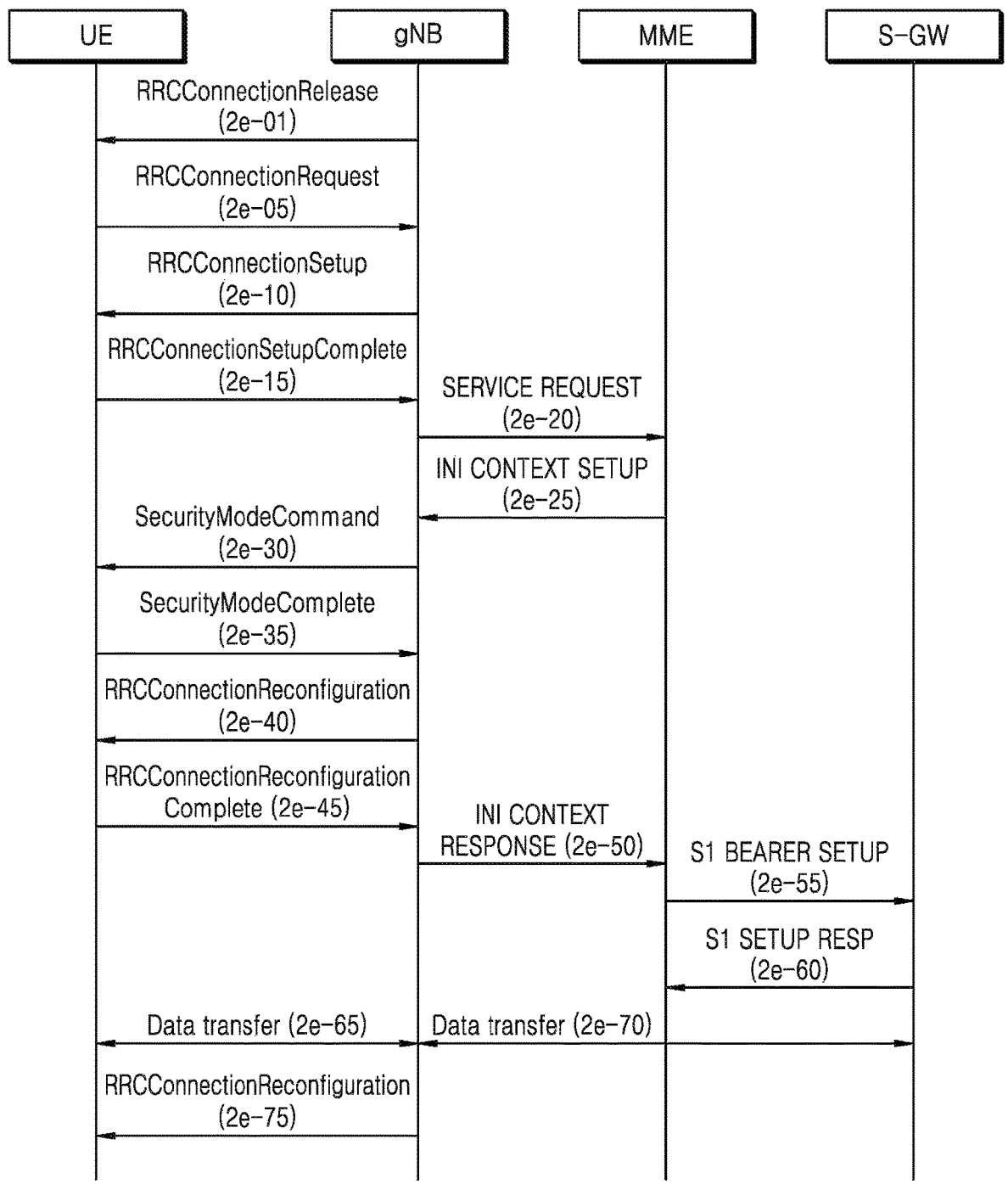
FIG. 13 is a flow diagram of a procedure, performed by a base station, for instructing whether to perform a UDC, when a UE establishes connection to a network, according to an embodiment.

FIG. 13 is a flow diagram of a procedure performed by a gNB, for instructing whether to perform uplink data compression (UDC), when a UE establishes connection to a network, according to an embodiment.

Referring to FIG. 13, a procedure is illustrated in which a base station (gNB) requests a UDC when a UE in an RRC idle mode or an RRC inactive (or lightly-connected) mode is switched to an RRC connected mode and establishes connection to a network.

When the UE that transceives data in the RRC connected mode does not transceive data for a certain reason or for a certain time, the gNB transmits an RRCConnectionRelease message to the UE to switch to the RRC idle mode at step 2*e*-01). Afterward, when the UE that has not established a connection with the base station (hereinafter, the idle mode UE) has data to be transmitted, the idle mode UE performs an RRC connection establishment procedure with the gNB. The idle mode UE establishes reverse transmission synchronization with the gNB through a random access procedure, and transmits an RRCConnectionRequest message to the gNB at step 2*e*-05. The RRCConnectionRequest message may include an identifier of the idle mode UE, establishment cause, or the like. The gNB transmits an RRCConnectionSetup message such that the idle mode UE establishes RRC connection at step 2*e*-10. The RRCConnectionSetup message may include information indicating whether to use UDC for each logical channel (LogicalChannelConfig), each bearer, or each PDCP layer (PDCP-Config). In more detail, for each logical channel, each bearer, or each PDCP layer (or each service data access protocol (SDAP) layer), the RRCConnectionSetup message may indicate for which IP flow or QoS flow a UDC method is to be used (the RRCConnectionSetup message may configure information to the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. In addition, the RRCConnectionSetup message may include an uplink data decompression setup or release command. In this regard, when configured to use UDC, the UE may always be configured with a RLC AM bearer (a lossless mode due to an ARQ function or a retransmission function) and may not be configured with a header compression protocol (e.g., a ROHC protocol). Furthermore, the RRCConnectionSetup message may include RRC connection configuration information. An RRC connection may refer to a signaling radio bearer (SRB) and may be used in transceiving an RRC message that is a control message between the UE and the gNB. The UE establishes the RRC connection and then transmits an RRCConnetionSetupComplete message to the gNB at step 2*e*-15. In a case where the gNB does not know, or desires to check capability, of the currently connected UE, the gNB may transmit a UE capability inquiry message. The UE may transmit a UE capability report message. The UE capability report message may include an indicator indicating whether the UE is capable of using the UDC method. The RRCConnetionSetupComplete message may include a control message such as a SERVICE REQUEST message for requesting an MME to configure a bearer for a certain service by the UE.

The gNB transmits the SERVICE REQUEST message included in the RRCConnetionSetupComplete message to the MME at step 2*e*-20, and the MME determines whether to provide the service requested by the UE. As a result of the determination, when the MME decides to provide the service requested by the UE, the MME transmits an INITIAL CONTEXT SETUP REQUEST message to the gNB at step 2*e*-25. The INITIAL CONTEXT SETUP REQUEST message includes QoS information to be applied in configuring a data radio bearer (DRB), security information (e.g., a security key, a security algorithm, or the like) to be applied to the DRB, or the like.

The gNB exchanges a SecurityModeCommand message at step 2*e*-30 and a SecurityModeComplete message at step 2*e*-35 with the UE to configure a security mode. After the security mode is completely configured, the gNB transmits an RRCConnectionReconfiguration message to the UE at step 2*e*-40. The RRCConnectionReconfiguration message may include information indicating whether to use a UDC method for each logical channel (LogicalChannelConfig), each bearer, or each PDCP layer (PDCP-Config). In more detail, for each logical channel, each bearer, or each PDCP layer (or each SDAP layer), the RRCConnectionReconfiguration message may indicate for which IP flow or QoS flow the UDC method is to be used (the RRCConnectionReconfiguration message may configure information for the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. In addition, the RRCConnectionReconfiguration message may include an uplink data decompression setup or release command. In this regard, when configured to use UDC, the UE may always be configured with a RLC AM bearer (a lossless mode due to an ARQ function or a retransmission function) and may not be configured with a header compression protocol (e.g., a ROHC protocol). Furthermore, the RRCConnectionReconfiguration message may include setting information about the DRB to process user data, and the UE sets the DRB by using the setting information and transmits an RRCConnectionReconfigurationComplete message to the gNB at step 2e-45.

The gNB completes the DRB setting with the UE and then transmits an INITIAL CONTEXT SETUP COMPLETE message to the MME at step 2e-50, and the MME receives the message and then exchanges an S1 BEARER SETUP message at step 2e-55 and an S1 BEARER SETUP RESPONSE message at step 2e-60 with a S-GW so as to set an S1 bearer. The S1 bearer indicates data transmission connection that is set up between the S-GW and the gNB, and corresponds to the DRB in a one-to-one manner.

When the aforementioned procedure is completed, the UE and the gNB transfer and receive data via the S-GW at steps 2e-65 and 2e-70. The data transfer procedure includes three steps that are RRC connection setting, security setting, and DRB setting. The gNB may transmit an RRCConnectionReconfiguration message to the UE so as to newly perform, add, or change configuration of the UE at step 2e-75. The RRCConnectionReconfiguration message may include information indicating whether to use a UDC method for each logical channel (LogicalChannelConfig), each bearer, or each PDCP layer (PDCP-Config). In more detail, for each logical channel, each bearer, or each PDCP layer (or each SDAP layer), the RRCConnectionReconfiguration message may indicate for which IP flow or QoS flow the UDC method is to be used (the RRCConnectionReconfiguration message may configure information to the SDAP layer, the information being about IP flow or QoS flow in which the UDC method is to be used or not to be used, and then the SDAP layer may instruct the PDCP layer whether to use the UDC method with respect to each QoS flow. Alternatively, the PDCP layer may autonomously check each QoS flow and then may determine whether to apply the UDC method thereto). In this regard, when it is instructed to use the UDC method, an identifier of a predefined library or dictionary which is to be used in the UDC method or a size of a buffer to be used in the UDC method may be indicated. In addition, the RRCConnectionReconfiguration message may include an uplink data decompression setup or release command. In this regard, when configured to use UDC, it may always be configured with a RLC AM bearer (a lossless mode due to an ARQ function or a retransmission function) and may not be configured with a header compression protocol (e.g., a ROHC protocol).

Figure 14:
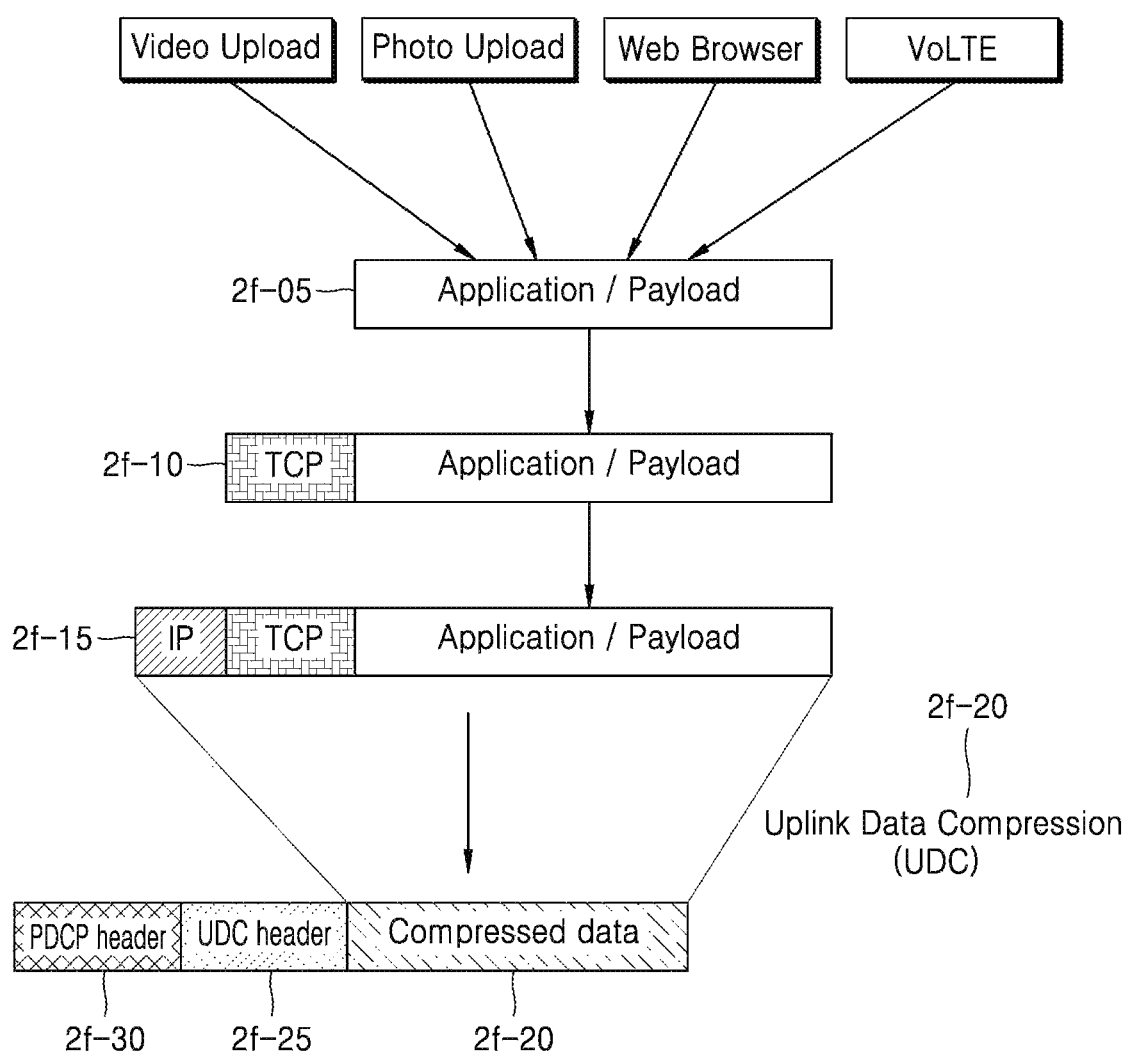
FIG. 14 is a diagram of a procedure and a data structure for performing UDC, according to an embodiment.

FIG. 14 is a diagram of a procedure and a data structure for performing UDC, according to an embodiment.

Referring to FIG. 14, uplink data 2f-05 may be generated as data corresponding to services including video transmission, photo transmission, web browsing, voice over LTE (VoLTE), or the like. A plurality of items of data generated in an application layer may be processed through a network data transmission layer such as a transmission control protocol and Internet protocol (TCP/IP) or a user datagram protocol (UDP) to configure each of headers 2f-10 and 2f-15, and may be transferred to a PDCP layer. When the PDCP layer receives data (a PDCP SDU) from an upper layer, the PDCP layer may perform a procedure as described below.

When the RRC message 2e-10, 2e-40, or 2e-75 indicates to use UDC in the PDCP layer, the PDCP layer performs UDC on the PDCP SDU as indicated by 2f-20 to compress uplink data, may configure a UDC header (a header for the compressed uplink data) 2f-25, may perform ciphering, may perform integrity protection when it is configured to do so, and may configure a PDCP header 2f-30, thereby generating PDCP SDUs. A PDCP layer apparatus, which includes an apparatus for processing UDC (UDC compressor/UDC decompressor), determines whether to perform a UDC procedure on each data according to configuration of an RRC message, and uses the UDC compressor/UDC decompressor. A transmitting end performs data compression by using the UDC compressor in a PDCP layer of the transmitting end, and a receiving end performs data decompression by using the UDC decompressor in a PDCP layer of the receiving end.

The procedure of FIG. 14 may be applied to not only compression of uplink data but also compression of downlink data, where the compressions are performed by the UE. In addition, the descriptions of the uplink data may be equally applied to the downlink data.

Figure 15:
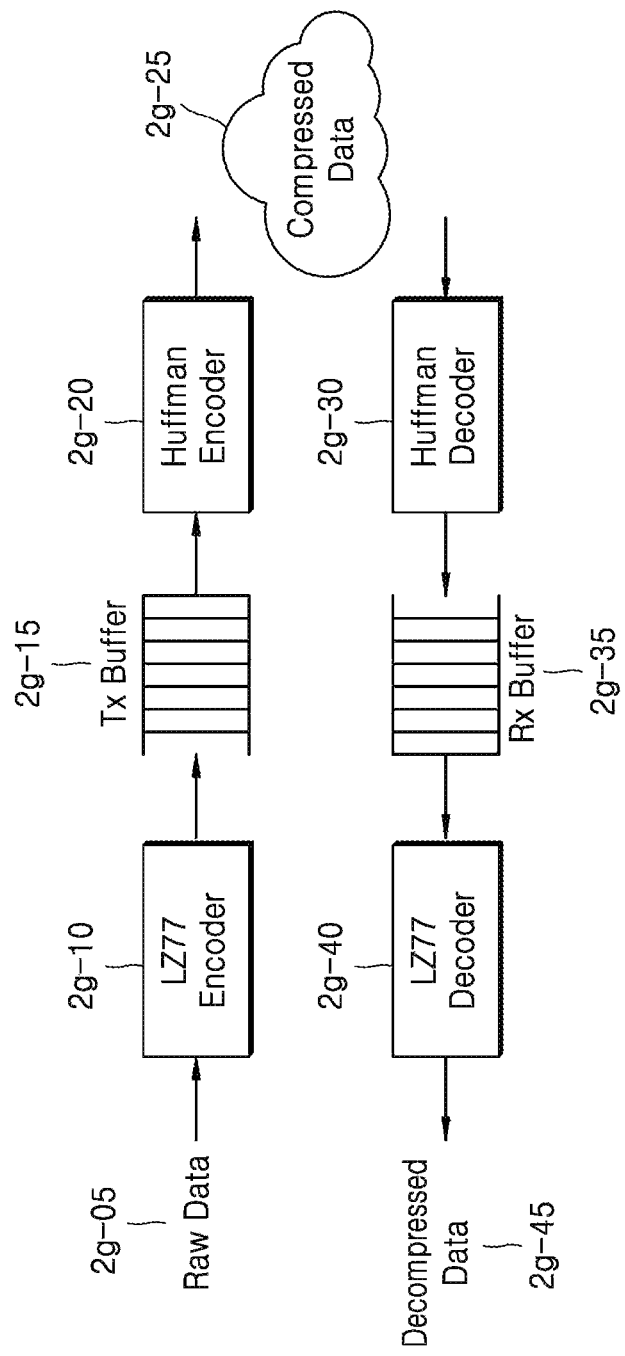
FIG. 15 is a diagram of a UDC method, according to an embodiment.

FIG. 15 is a diagram OF a UDC method, according to an embodiment.

Referring to FIG. 15, a DEFLATE-based UDC algorithm is illustrated which is a lossless compression algorithm. According to the DEFLATE-based UDC algorithm, basically, uplink data may be compressed using a combination of an LZ77 algorithm and a Huffman coding algorithm.

According to the LZ77 algorithm, an operation of finding repeated occurrences of data within a sliding window is performed, and when the repeated occurrences within the sliding window are found, data compression is performed by expressing the repeated data within the sliding window as a location and length thereof. The sliding window is called a buffer in the UDC method and may be set to 8 kilobytes or 32 kilobytes. That is, the sliding window or the buffer may record 8,192 or 32,768 characters, find repeated occurrences of data, and perform data compression by expressing the repeated data as a location and length thereof. Therefore, since the LZ77 algorithm is a sliding window scheme, that is, since subsequent data is coded immediately after previously coded data is updated in a buffer, successive data may have correlations therebetween. Thus, the subsequent data may be normally decoded only when the previously coded data is normally decoded.

The codes compressed and expressed as the location and length by using the LZ77 algorithm is compressed once again by using the Huffman coding algorithm. According to the Huffman coding algorithm, repeated characters may be found and data compression may be performed once again by assigning the shortest code to the most frequent character and assigning the longest code to the least frequent character. The Huffman coding algorithm is a prefix coding algorithm and is an optimal coding scheme by which all codes are uniquely decodable.

As described above, a transmitting end may encode raw data 2g-05 by using the LZ77 algorithm in an LZ77 encoder 2g-10, update a buffer 2g-15, and configure a UDC header by generating checksum bits for the content (or data) of the buffer. The checksum bits may be used by a receiving end to determine validity of a buffer state. The transmitting end may compress the codes encoded using the LZ77 algorithm, by using the Huffman coding algorithm in a Huffman encoder 2g-20, and may transmit the compressed data as uplink data 2g-25. The receiving end may perform a decompression procedure on the compressed data received from the transmitting end, in an inverse manner to that of the transmitting end. That is, the receiving end may perform Huffman decoding in a Huffman decoder 2g-30, may update a buffer 2g-35, and may check validity of the updated buffer, based on the checksum bits of the UDC header. Upon determining that the checksum bits have no error, the receiving end may decompress the data by performing decoding using the LZ77 algorithm in a LZ77 decoder 2g-40 to reconstruct the raw data and deliver the decompressed data to an upper layer 2g-45.

As described above, since the LZ77 algorithm is a sliding window scheme, that is, since subsequent data is coded immediately after previously coded data is updated in a buffer, successive data may have correlations therebetween. Thus, the subsequent data may be normally decoded only when the previously coded data is normally decoded. Therefore, a PDCP layer of the receiving end may check PDCP sequence numbers of a PDCP header, may check a UDC header (check an indicator indicating whether data compression is or is not performed), and may perform a data decompression procedure on compressed UDC data in ascending order of the PDCP sequence numbers.

A procedure for configuring UDC for a UE by a base station and a procedure for performing UDC by the UE are as described below.

Referring to FIG. 13, the base station (gNB) may configure or release UDC for a bearer or a logical channel which configures a RLC AM mode for the UE, by using the RRC message indicated by 2e-10, 2e-40, or 2e-75 in FIG. 13. The base station may reset a UDC entity (or protocol) of a PDCP layer of the UE, by using the RRC message. Resetting the UDC entity (or protocol) indicates that a UDC buffer for uplink data compression of the UE is reset, and is required to achieve synchronization between the UDC buffer of the UE and a UDC buffer for uplink data decompression of the base station. To reset the buffer of the UDC entity, an existing PDCP control PDU may be modified or a new PDCP control PDU may be defined and a transmitting end (base station) may reset a UDC buffer of a receiving end (UE) by using the PDCP control PDU instead of the RRC message to achieve synchronization for user data compression and decompression between the transmitting end and the receiving end.

Using the RRC message, whether to perform uplink data compression may be determined for each bearer, each logical channel, or each PDCP layer. In this regard, whether to perform or not to perform uplink data decompression may be configured for each IP (or QoS) flow in each bearer, logical channel, or PDCP layer. For the configuration for each QoS flow, the PDCP layer may configure an indicator or information to indicate for which QoS flow to perform uplink data decompression and for which QoS flow not to perform uplink data decompression. The configuration for each QoS flow may be set for an SDAP layer apparatus other than the PDCP layer such that the SDAP layer may instruct the PDCP layer whether to perform or not to perform uplink data decompression for each QoS flow when the QoS flow is mapped to a bearer.

Using the RRC message, the base station may configure a PDCP discard timer value for the UE. In this case, for the PDCP discard timer value, a PDCP discard timer value for data to which UDC is not applied and a PDCP discard timer value for data to which UDC is applied may be separately configured. A method of discarding data in the PDCP layer of the UE and executing the PDCP discard timer is described below with reference to another embodiment.

When configured to perform UDC for a certain bearer, logical channel, or PDCP layer (or for any QoS flows of the certain bearer, logical channel, or PDCP layer) by using the RRC message, the UE may reset a buffer in a UDC entity of the PDCP layer in accordance with the configuration and may prepare a UDC procedure. When PDCP SDUs are received from an upper layer, when configured to perform UDC for the PDCP layer, the UE may perform UDC on the received PDCP SDUs. When configured to perform UDC only for certain QoS flows of the PDCP layer, the UE may determine whether to perform UDC by checking an instruction of an upper SDAP layer or QoS flow identities, and may perform UDC. When UDC is performed and the buffer is updated in accordance with the UDC compression, the UE may configure a UDC buffer. When UDC is performed, the UE may compress the PDCP SDUs received from the upper layer, into UDC data (e.g., a UDC block) having a smaller size. The UE may configure a UDC header for the compressed UDC data. The UDC header may include an indicator indicating whether UDC is or is not performed. For example, a 1-bit indicator of the UDC header may have a value 0 indicating that UDC is applied, or a value 1 indicating that UDC is not applied. In this regard, UDC may not be applied because the PDCP SDUs received from the upper layer do not have a repeated data structure and thus may not be compressed using the UDC method (e.g., a DEFLATE algorithm). When UDC is performed on the PDCP SDUs received from the upper layer and the UDC buffer is updated, the PDCP layer of the receiving end may calculate checksum bits and may include, in the UDC buffer, the calculated checksum bits to check validity of the updated UDC buffer (the checksum bits have a certain length, e.g., 4 bits).

The UE may perform integrity protection on data to which uplink data decompression is applied or not applied, when integrity protection is configured for the data, may perform ciphering, and may transfer the data to a lower layer.

Figure 16:
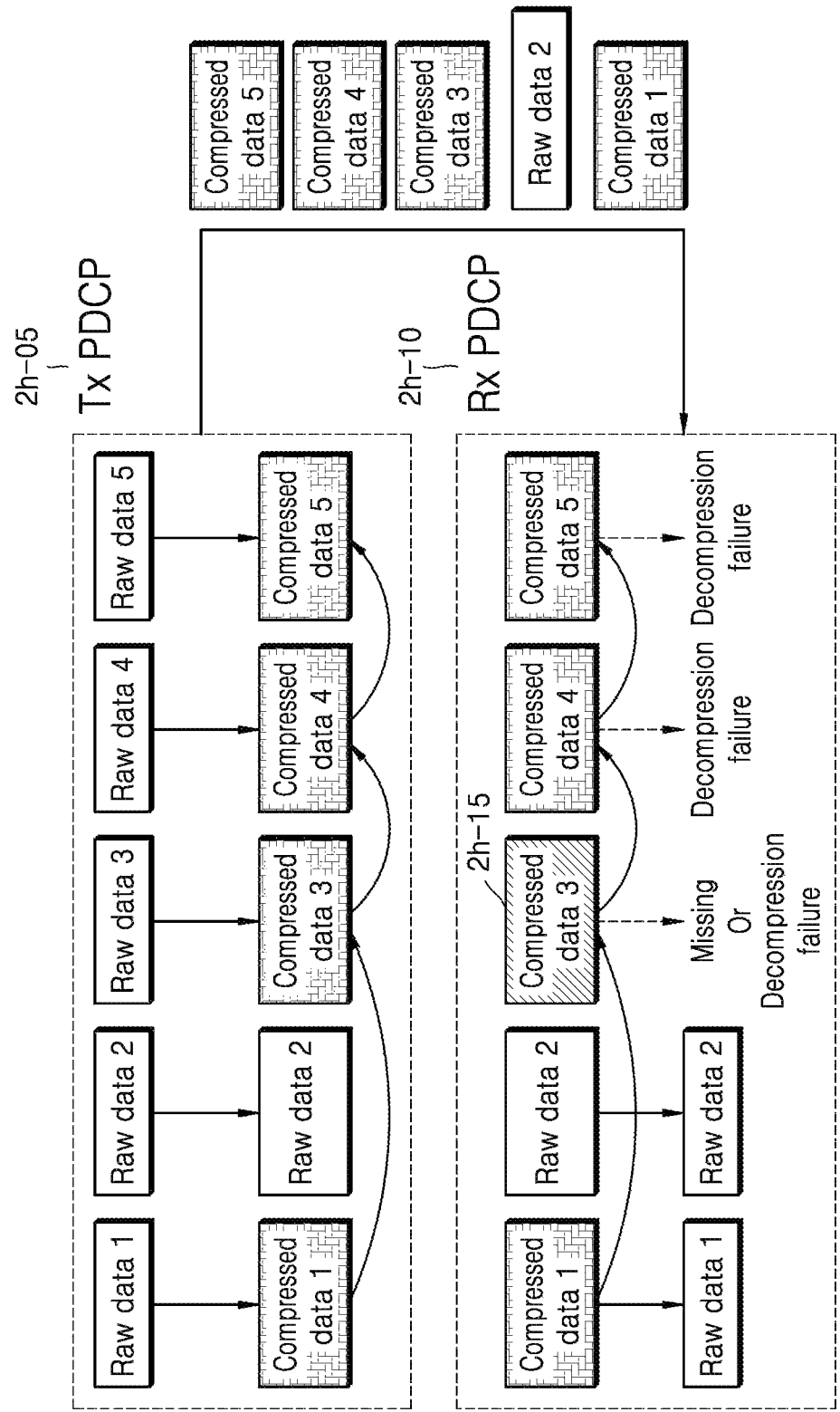
FIG. 16 is a block diagram of a decompression failure occurring in a UDC method, according to an embodiment.

FIG. 16 is a diagram of decompression failure occurring in a UDC method, according to an embodiment.

Referring to FIG. 16, as described above with reference to FIG. 15, when a transmitting end performs data compression by using an algorithm to perform UDC (i.e., the DEFLATE-based UDC algorithm that is performed by performing the LZ77 algorithm and then performing the Huffman coding), the transmitting end updates previously-compressed data in a buffer, compares the data with next data to be compressed, based on the buffer, finds a repeated structure, and performs compression on the repeated structure by using a position and length. Thus, when a receiving end performs decompression, the receiving end has to perform the decompression in a same order of compression as performed by the transmitting end so as to succeed in the decompression. For example, when the transmitting end has performed UDC on data of PDCP sequence numbers 1, 3, 4, and 5 and did not perform UDC compression on data of PDCP sequence number 2 2h-05 in FIG. 16, the receiving end has to perform decompression on received data in the order of PDCP sequence numbers 1, 3, 4, and 5 in a PDCP layer so as to succeed in the decompression.

When the transmitting end performs UDC, a UDC header indicates the UDC, and therefore, the receiving end may determine, by checking the UDC header, whether the UDC has been applied thereto. In a procedure of performing UDC decompression, when data of PDCP sequence number 3 is missing, UDC decompression thereafter all fails. That is, UDC decompression cannot be performed on data of PDCP sequence numbers 4 and 5 2h-10. Thus, missing data (packet) should not occur in the procedure of the UDC decompression, and the receiving end has to decompress data in a same order of UDC as performed by the transmitting end. Therefore, the UDC has to be performed in an RLC AM mode that is a lossless mode in which retransmission is possible.

However, missing data may occur due to a PDCP discard timer of a PDCP layer. That is, the PDCP layer drives a timer for each data (a packet or a PDCP SDU) received from an upper layer by using a value of the PDCP discard timer, the value being set in the RRC message. When the timer expires, data corresponding to the timer is discarded. Thus, when a timer related to data on which UDC has been performed expires, the data may be discarded, such that a plurality of items of data on which UDC has been performed may fail in UDC decompression performed by the receiving end.

In an embodiment, a data discarding method of a PDCP layer that supports a UDC method is provided below. Data discarding methods of the PDCP layer which are provided below may prevent an issue in which data on which UDC has been performed is discarded by a PDCP discard timer of a PDCP layer of the transmitting end such that UDC decompression performed by the receiving end fails.

A plurality of items of data that are discarded by a data discarding method of a PDCP layer may be a PDCP SDU (a data part) or a PDCP PDU (a part including data and a header).

A first embodiment of the data discarding method of the PDCP layer that supports the UDC method is described below.

The data discarding method of the PDCP layer according to the first embodiment may be performed in the following manner.

When the PDCP layer receives data (a PDCP SDU) from an upper layer, independent PDCP discard timers respectively corresponding to a plurality of items of received data (or packets) are executed (timer values may be set by the gNB by using the RRC message).

When a certain PDCP discard timer has expired and a part of data (a PDCP SDU or a PDCP PDU; when a header is configured by receiving the PDCP SDU, the data may become the PDCP PDU) corresponding to the expired PDCP discard timer has been already transferred (concatenated) to a MAC PDU of a MAC layer or has been already transmitted from the MAC layer, even when the PDCP discard timer has expired, the data (the PDCP SDU or the PDCP PDU) corresponding to the expired PDCP discard timer is not discarded. When the PDCP discard timer has expired and the part of data (the PDCP SDU or the PDCP PDU) corresponding to the PDCP discard timer has not been transferred to the MAC PDU of the MAC layer and has not been transmitted from the MAC layer, the data is discarded. When the data corresponding to the expired PDCP discard timer has been transferred to a lower layer, an indicator indicating the discarding may be sent to the lower layer.

The data discarding method of the PDCP layer may be applied to both data on which UDC has been performed and data on which UDC has not been performed.

A second embodiment of the data discarding method of the PDCP layer that supports the UDC method is described below.

The data discarding method of the PDCP layer according to the second embodiment may be performed in the following manner.

When the PDCP layer receives data (a PDCP SDU) from an upper layer, independent PDCP discard timers respectively corresponding to a plurality of items of received data (or packets) are executed (timer values may be set by the gNB by using the RRC message).

When a certain PDCP discard timer has expired and a part of data (a PDCP SDU or a PDCP PDU; when a header is configured by receiving the PDCP SDU, the data may become the PDCP PDU) corresponding to the expired PDCP discard timer has been already transferred (concatenated) to a MAC PDU of a MAC layer or has been already transmitted from the MAC layer, or UDC has been performed on the data, even when the PDCP discard timer has expired, the data (the PDCP SDU or the PDCP PDU) corresponding to the expired PDCP discard timer is not discarded. When the PDCP discard timer has expired and the part of data (the PDCP SDU or the PDCP PDU) corresponding to the expired PDCP discard timer has not been transferred to the MAC PDU of the MAC layer and has not been transmitted from the MAC layer, or UDC has not been performed on the data, the data is discarded. When the data corresponding to the PDCP discard timer has been transferred to a lower layer, an indicator indicating the discarding may be sent to the lower layer.

One of three methods below may be applied as a method of discarding a plurality of items of data on which UDC has been performed.

1) First method: When a window of a PDCP layer of a transmitting end passes, a plurality of items of data on which UDC has been performed are discarded. That is, when PDCP sequence numbers of the plurality of items of data on which UDC has been performed are less than a PDCP sequence number of a bottom boundary of the window of the PDCP layer of the transmitting end, the plurality of items of data are discarded. In more detail, a plurality of items of data (on which UDC has been performed) whose PDCP sequence numbers are less than a PDCP sequence number are all discarded, wherein the PDCP sequence number corresponds to a result of subtracting a 2^(PDCP sequence number size (length)−1) value from a PDCP sequence number of data to be transferred from a current PDCP layer to a lower layer.

2) Second method: A plurality of items of data (on which UDC has been performed) whose PDCP sequence numbers are less than a PDCP sequence number of first data for which successful transfer to a lower layer is not acknowledged are all discarded.

3) Third method: When the PDCP layer of the transmitting end receives information about which PDCP sequence numbers have been normally received, according to a PDCP control PDU, a plurality of items of data (on which UDC has been performed) that are determined to have been normally received according to the information are discarded. The PDCP control PDU may be a re-use of a PDCP status report or may be newly defined, and may be periodically transmitted or may be transmitted by being triggered by a PDCP layer of a receiving end.

A third embodiment of the data discarding method of the PDCP layer that supports the UDC method is described below.

The data discarding method of the PDCP layer according to the third embodiment may be performed in the following manner.

When the PDCP layer receives data (a PDCP SDU) from an upper layer, independent PDCP discard timers respectively corresponding to a plurality of items of received data (or packets) are executed. When the independent PDCP discard timers are executed, the independent PDCP discard timers are executed with different timer values with respect to a plurality of items of data on which UDC is to be performed and a plurality of items of data on which UDC is not to be performed (the different timer values may be set by the gNB by using the RRC message). For example, a longer timer value may be applied to the plurality of items of data on which UDC is to be performed, and a shorter timer value may be applied to the plurality of items of data on which UDC is not to be performed.

When a certain PDCP discard timer has expired and a part of data (a PDCP SDU or a PDCP PDU; when a header is configured by receiving the PDCP SDU, the data may become the PDCP PDU) corresponding to the expired PDCP discard timer has been already transferred (concatenated) to a MAC PDU of a MAC layer or has been already transmitted from the MAC layer, even when the PDCP discard timer has expired, the data (the PDCP SDU or the PDCP PDU) corresponding to the expired PDCP discard timer is not discarded. When the PDCP discard timer has expired and the part of data (the PDCP SDU or the PDCP PDU) corresponding to the expired PDCP discard timer has not been transferred to the MAC PDU of the MAC layer and has not been transmitted from the MAC layer, the data is discarded. When the data corresponding to the PDCP discard timer has been transferred to a lower layer, an indicator indicating the discarding may be sent to the lower layer.

A fourth embodiment of the data discarding method of the PDCP layer that supports the UDC method is described below.

The data discarding method of the PDCP layer according to the fourth embodiment may be performed in the following manner.

When the PDCP layer receives data (a PDCP SDU) from an upper layer, independent PDCP discard timers respectively corresponding to a plurality of items of received data (or packets) are executed (timer values may be set by the gNB by using the RRC message). When the PDCP discard timers are executed, a PDCP discard timer corresponding to data on which UDC is to be performed may not be executed (alternatively, the PDCP discard timer may be set to have an infinite value).

When a certain PDCP discard timer has expired and a part of data (a PDCP SDU or a PDCP PDU—when a header is configured by receiving the PDCP SDU, the data may become the PDCP PDU) corresponding to the expired PDCP discard timer has been already transferred (concatenated) to a MAC PDU of a MAC layer or has been already transmitted from the MAC layer, even when the PDCP discard timer has expired, the data (the PDCP SDU or the PDCP PDU) corresponding to the expired PDCP discard timer is not discarded. When the PDCP discard timer has expired and the part of data (the PDCP SDU or the PDCP PDU) corresponding to the expired PDCP discard timer has not been transferred to the MAC PDU of the MAC layer and has not been transmitted from the MAC layer, the data is discarded. When the data corresponding to the PDCP discard timer has been transferred to a lower layer, an indicator indicating the discarding may be sent to the lower layer.

One of three methods below may be applied as a method of discarding a plurality of items of data on which UDC has been performed.

1) First method: When a window of a PDCP layer of a transmitting end passes, a plurality of items of data on which UDC has been performed are discarded. That is, when PDCP sequence numbers of the plurality of items of data on which UDC has been performed are less than a PDCP sequence number of a bottom boundary of the window of the PDCP layer of the transmitting end, the plurality of items of data are discarded. In more detail, a plurality of items of data (on which UDC has been performed) whose PDCP sequence numbers are less than a PDCP sequence number are all discarded, wherein the PDCP sequence number corresponds to a result of subtracting a $2^{(PDCP\ sequence\ number\ size\ (length)-1)}$ value from a PDCP sequence number of data to be transferred from a current PDCP layer to a lower layer.

2) Second method: A plurality of items of data (on which UDC has been performed) whose PDCP sequence numbers are less than a PDCP sequence number of first data for which successful transfer to a lower layer is not acknowledged are all discarded.

3) Third method: When the PDCP layer of the transmitting end receives information about which PDCP sequence numbers have been normally received, according to a PDCP control PDU, a plurality of items of data (on which UDC has been performed) that are determined to have been normally received according to the information are discarded. The PDCP control PDU may be a re-use of a PDCP status report or may be newly defined, and may be periodically transmitted or may be transmitted by being triggered by a PDCP layer of a receiving end.

In the aforementioned embodiments, in a case where a PDCP discard timer is executed, when successful transfers (all data whose PDCP sequence numbers are less than that of data for which successful transfer has been acknowledged are successfully transferred) are sequentially acknowledged from a lower layer, or successful transfer is confirmed according to a PDCP status report, the PDCP discard timer may be stopped and data corresponding to the PDCP discard timer may be directly discarded.

As described above with reference to FIG. 15, when the transmitting end performs UDC by using an algorithm to perform UDC (i.e., the DEFLATE-based UDC algorithm that is performed by performing the LZ77 algorithm and then performing the Huffman coding), the transmitting end generates checksum bits based on current buffer contents after performing the UDC, and configures a UDC buffer. Afterward, the transmitting end updates a buffer by using raw data of data on which UDC has been performed, compares the data with next data to be compressed, based on the buffer, finds a repeated data structure, and performs compression on the repeated data structure by using a position and length. In this regard, checksum bits in a UDC header are used to determine, by a receiving end, validity of a state of the buffer before a UDC compressor (or a UDC function) of a PDCP layer of the receiving end performs decompression on the data. That is, before the receiving end performs decompression on the data, the receiving end checks validity of a UDC buffer of the receiving end, according to the checksum bits in the UDC header, performs decompression on the data when there is no checksum error, and when a checksum failure occurs, does not perform decompression on the data and recovers the data by reporting the checksum failure (checksum error) to the transmitting end.

Thus, when the receiving end performs decompression, the receiving end has to perform the decompression in a same order of compression as performed by the transmitting end so as to succeed in the decompression. For example, when the transmitting end has performed UDC on data of PDCP sequence numbers 1, 3, 4, and 5 and did not perform UDC on data of PDCP sequence number 2, the receiving end has to perform decompression on received data in order of PDCP sequence numbers 1, 3, 4, and 5 in the PDCP layer so as to succeed in the decompression. In this regard, when the transmitting end has performed UDC, UDC is indicated by the UDC header, and thus, the receiving end may determine, by checking the UDC header, whether UDC has been applied thereto. In a procedure of performing UDC decompression, when a checksum failure occurs in data of PDCP sequence number 3, UDC decompression thereafter may all fail. Therefore, UDC decompression may not be successfully performed on data of PDCP sequence numbers 4 and 5.

In an embodiment, a checksum failure processing method is provided to solve the aforementioned checksum failure-related issues.

A first embodiment of the checksum failure processing method is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting an RRC Connection Reconfiguration message to the UE. A newly defined RRC message may be used as the RRC message, or an existing RRC message may be changed and used by having a new indicator defined therein. The RRC message may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated by the indicator.

Operations of the receiving end: The receiving end transmits the RRC message and performs a re-establishment procedure on the PDCP layer, the RLC layer, or the MAC layer. That is, the RLC layer processes a plurality of items of received data, up-transfers the data to an upper layer, initializes a RLC buffer, and expects to receive an initialized new RLC sequence number (window parameters and timers are all initialized). The PDCP layer processes a plurality of items of data received from a lower layer, and stands by for data to be newly received. A MAC layer apparatus may initialize a HARQ buffer. When the base station instructs a checksum failure processing operation be performed by using the RRC message, the base station may update security keys of the PDCP layer of the UE when required. According to another method, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to a UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit an RRC message indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end receives the RRC message, the transmitting end performs a re-establishment procedure on the PDCP layer, the RLC layer, or the MAC layer. That is, the RLC layer initializes the RLC buffer, initializes RLC sequence numbers, and initializes all of window parameters and timers. In addition, the PDCP layer may update the UDC buffer by performing again a UDC procedure from a PDCP sequence number indicated in the RRC message, may configure a UDC header by calculating checksum bits corresponding thereto, and may transfer data including the UDC header to a lower layer (may perform retransmission). According to another method, the PDCP layer may perform the UDC procedure from a first PDCP sequence number for which successful transfer is not acknowledged from the lower layer when the PDCP layer is re-established, may update the UDC buffer, may configure a UDC header by calculating checksum bits corresponding thereto, and may transfer data packet including the UDC header to the lower layer (that is, may perform retransmission). The MAC layer may initialize a HARQ buffer. According to another method, when the transmitting end receives an indication to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and, thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

A second embodiment of the checksum failure processing method is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting an RRC Connection Reconfiguration message to the UE. A newly defined RRC message may be used as the RRC message, or an existing RRC message may be changed and used by having a new indicator defined therein. The RRC message may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the gNB) includes, in the RRC message, the PDCP sequence number at which the checksum failure has occurred, transmits the RRC message, and discards all PDCP PDUs (or PDCP SDUs) whose PDCP sequence numbers are greater than or equal to the PDCP sequence number. According to another embodiment, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit an RRC message indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the RRC message, the transmitting end may reset (initialize) the UDC buffer of the transmitting end, may discard a plurality of items of data that are not transmitted yet and have PDCP sequence numbers greater than a PDCP sequence number indicated in the RRC message, may perform again UDC from data (a PDCP SDU) corresponding to the indicated PDCP sequence number to a plurality of items of data having greater PDCP sequence numbers than the data, may update the UDC buffer, may include checksum bits in a UDC header, and may transfer data including the UDC header to a lower layer (may perform retransmission). The transmitting end may newly perform compression on a plurality of items of data that were compressed (transmitted) and were already given PDCP sequence numbers from among the PDCP sequence numbers that are greater than the indicated PDCP sequence number, may sequentially allocate new PDCP sequence numbers to a plurality of items of new data, and may perform a compression procedure following the aforementioned compression procedure. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

A third embodiment of the checksum failure processing method is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting an RRC Connection Reconfiguration message to the UE. A newly defined RRC message may be used as the RRC message, or an existing RRC message may be changed and used by having a new indicator defined therein. The RRC message may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the base station) includes, in the RRC message, the PDCP sequence number at which the checksum failure has occurred, transmits the RRC message, and discards, by checking UDC headers (1-bit indicators indicating whether UDC has been applied), only a plurality of items of data (PDCP PDUs or PDCP SDUs) to which UDC has been applied and that are from among PDCP PDUs (or PDCP SDUs) whose PDCP sequence numbers are greater than or equal to the PDCP sequence number. That is, a plurality of items of data to which UDC has not been applied do not have any relation to the checksum failure, and thus are not discarded. According to another method, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit an RRC message indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the RRC message, the transmitting end may reset (initialize) the UDC buffer of the transmitting end, may discard data to which UDC has been applied, the data being from among a plurality of items of data that are not transmitted yet and have PDCP sequence numbers greater than a PDCP sequence number indicated in the RRC message, may perform again UDC only on a plurality of items of data (PDCP PDUs or PDCP SDUs) to which UDC has been applied and are from data (a PDCP SDU) corresponding to the indicated PDCP sequence number to a plurality of items of data having greater PDCP sequence numbers than the data, may update the UDC buffer, may include checksum bits in a UDC header, and may transfer data including the UDC header to a lower layer (may perform retransmission). That is, the transmitting end does not retransmit a plurality of items of data to which UDC has not been applied and that have PDCP sequence numbers greater than the indicated PDCP sequence number. The transmitting end may newly perform compression on a plurality of items of data that were compressed (transmitted) and were already given PDCP sequence numbers from among the PDCP sequence numbers that are greater than the indicated PDCP sequence number, may sequentially allocate new PDCP sequence numbers to a plurality of items of new data, and may perform a compression procedure following the aforementioned compression procedure. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

A fourth embodiment of the checksum failure processing method is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting an RRC Connection Reconfiguration message to the UE. A newly defined RRC message may be used as the RRC message, or an existing RRC message may be changed and used by having a new indicator defined therein. The RRC message may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the base station) includes, in the RRC message, a PDCP sequence number at which the checksum failure has occurred, transmits the RRC message, and discards only data corresponding to the PDCP sequence number. According to another method, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit an RRC message indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the RRC message, the transmitting end may reset (initialize) the UDC buffer of the transmitting end, may reconstruct data that corresponds to a PDCP sequence number indicated in the RRC message and was previously transmitted (when the data is stored in a buffer, the data is retransmitted as it is), and may retransmit the data. The transmitting end may transmit contents of the UDC buffer of the transmitting end to the receiving end, the contents being used to apply UDC on the data corresponding to the indicated PDCP sequence number (alternatively, the transmitting end may define and transmit a new PDCP control PDU). To update the UDC buffer of the receiving end, in which a checksum error has occurred, and to synchronize contents of the UDC buffer of the transmitting end with contents of the UDC buffer of the receiving end, the transmitting end may transmit the contents of the UDC buffer of the transmitting end, the contents corresponding to the PDCP sequence number, and thus may update and synchronize the UDC buffer of the transmitting end. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

Figure 17:
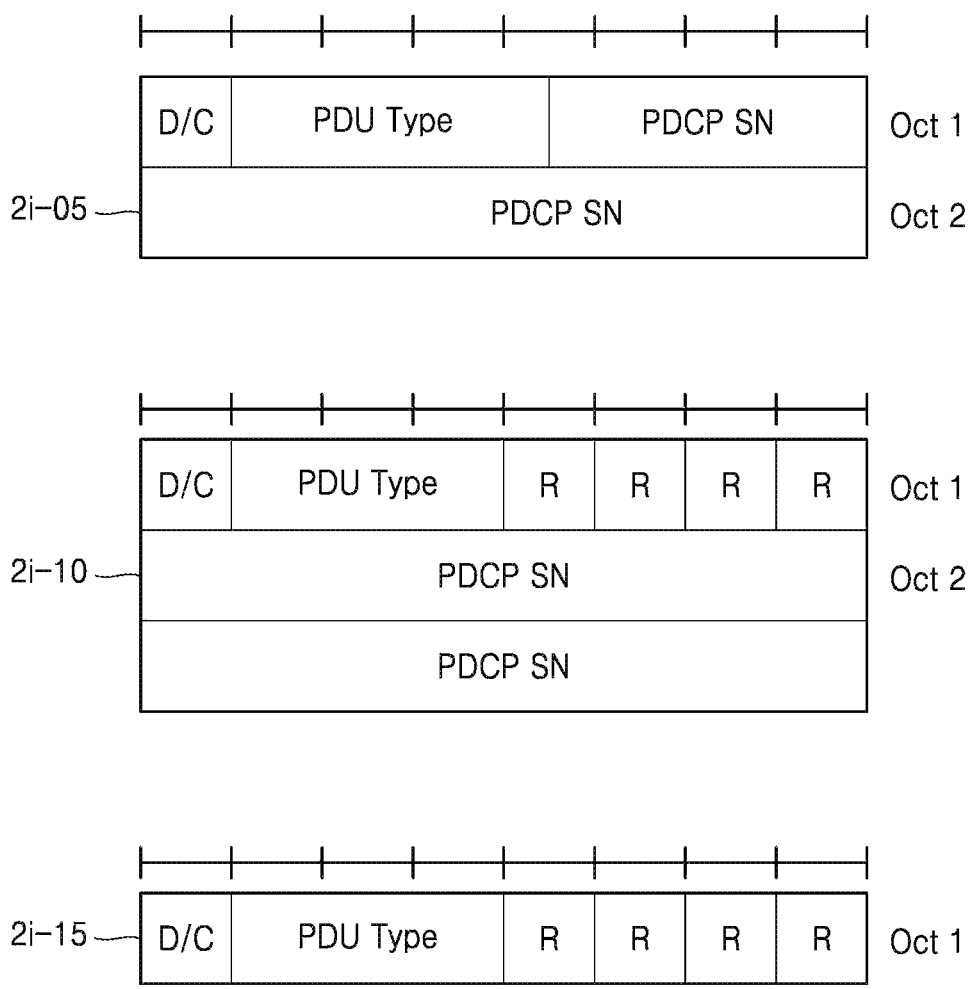
FIG. 17 is a diagram of a PDCP control packet data unit (PDU) format that is applicable to a checksum failure processing method, according to an embodiment.

FIG. 17 is a diagram of a PDCP control PDU format that is applicable to a checksum failure processing method, according to an embodiment.

Referring to FIG. 17, a D/C field of a PDCP layer refers to a field for distinguishing general data from PDCP layer control information (also referred to as a PDCP control PDU), and a PDU Type field refers to a field for indicating a type of information in the PDCP layer control information.

According to an embodiment, the PDCP control PDU format that is applied to the checksum failure processing method may have different lengths according to lengths of PDCP sequence numbers as in $2i$-05 and $2i$-10, and may be used to indicate a PDCP sequence number at which checksum failure has occurred in the receiving end. In this regard, to indicate the PDCP sequence number at which checksum failure of the receiving end has occurred, a PDCP control PDU for an existing PDCP status report may be used. According to another method, because the checksum failure has occurred, instead of the PDCP sequence number, an indicator indicating to reset the UDC buffer may be defined and then the reset may be indicated. According to another method, an indicator indicating occurrence of the checksum failure may be defined, instead of the PDCP sequence number, and then the occurrence of the checksum failure may be indicated. That is, a format 2$i$-15 is defined, and a new PDCP control PDU is defined by allocating reserved values (e.g., 011 or a reserved value that is one of 100 to 111) to the PDU type, and the PDCP control PDU having the defined PDU type may perform a function of indicating the checksum failure. Table 2 below is used in describing the PDU type.

TABLE 2

| PDU Type | |
| --- | --- |
| Bit | Description |
| 000 | PDCP status report |
| 001 | Interspersed ROHC feedback packet |
| 010 | LWA status report |
| 011 | UDC checksum failure feedback |
| 100-111 | reserved |

A fifth embodiment of the checksum failure processing method, the PDCP control PDU described in FIG. 17 being applied to the fifth embodiment, is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting a PDCP control PDU to the UE. A newly defined PDCP control PDU may be used as the PDCP control PDU, or an existing PDCP control PDU may be changed and used by having a new indicator defined therein. The PDCP control PDU may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end transmits the PDCP control PDU and performs a re-establishment procedure on the PDCP layer, the RLC layer, or the MAC layer. That is, the RLC layer processes a plurality of items of received data, up-transfers the data to an upper layer, initializes the RLC buffer, and expects to receive an initialized new RLC sequence number (window parameters and timers are all initialized). The PDCP layer processes a plurality of items of data received from a lower layer, and stands by for data to be newly received. The MAC layer may initialize the HARQ buffer. When the gNB instructs a checksum failure processing operation be performed by using the PDCP control PDU, the base station (Node B) may update security keys of the PDCP layer of the UE when required. According to another method, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to a UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit a PDCP control PDU indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end receives the PDCP control PDU, the transmitting end performs a re-establishment procedure on the PDCP layer, the RLC layer, or the MAC layer. That is, the RLC layer initializes the RLC buffer, initializes RLC sequence numbers, and initializes all of window parameters and timers. Then, the PDCP layer may update the UDC buffer by performing a UDC procedure again from a PDCP sequence number indicated in the PDCP control PDU, may configure a UDC header by calculating checksum bits corresponding thereto, and may transfer data including the UDC header to a lower layer (that is, may perform retransmission). According to another method, the PDCP layer may perform the UDC procedure from a first PDCP sequence number for which successful transfer is not acknowledged from the lower layer when the PDCP layer is re-established, may update the UDC buffer, may configure a UDC header by calculating checksum bits corresponding thereto, and may transfer data including the UDC header to the lower layer (may perform retransmission). The MAC layer may initialize a HARQ buffer. According to another method, when the transmitting end receives an indication to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

A sixth embodiment of the checksum failure processing method, the PDCP control PDU described in FIG. 17 being applied to the sixth embodiment, is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting a PDCP control PDU to the UE. A newly defined PDCP control PDU may be used as the PDCP control PDU, or an existing PDCP control PDU may be changed and used by having a new indicator defined therein. The PDCP control PDU may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the gNB) includes, in the PDCP control PDU, the PDCP sequence number at which the checksum failure has occurred, transmits the PDCP control PDU, and discards all PDCP PDUs (or PDCP SDUs) whose PDCP sequence numbers are greater than or equal to the PDCP sequence number. According to another embodiment, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit a PDCP control PDU indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the PDCP control PDU, the transmitting end may reset (initialize) the UDC buffer of the transmitting end, may discard a plurality of items of data that are not transmitted yet and have PDCP sequence numbers greater than a PDCP sequence number indicated in the PDCP control PDU, may perform again UDC from data (a PDCP SDU) corresponding to the indicated PDCP sequence number to a plurality of items of data having greater PDCP sequence numbers than the data, may update the UDC buffer, may include checksum bits in a UDC header, and may transfer data including the UDC header to a lower layer (may perform retransmission). The transmitting end may newly perform compression on a plurality of items of data that were compressed (transmitted) and were already given PDCP sequence numbers from among the PDCP sequence numbers that are greater than the indicated PDCP sequence number, may sequentially allocate new PDCP sequence numbers to a plurality of items of new data, and may perform a compression procedure following the aforementioned compression procedure. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

A seventh embodiment of the checksum failure processing method, the PDCP control PDU described in FIG. 17 being applied to the seventh embodiment, is described below.

When the receiving end (the gNB) acknowledges a checksum failure of the UDC buffer of the receiving end, the checksum failure being with respect to data on which UDC decompression is to be performed, the receiving end indicates occurrence of the checksum failure by transmitting a PDCP control PDU to the UE. A newly defined PDCP control PDU may be used as the PDCP control PDU, or an existing PDCP control PDU may be changed and used by having a new indicator defined therein. The PDCP control PDU may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the base station) includes, in the PDCP control PDU, the PDCP sequence number at which the checksum failure has occurred, transmits the PDCP control PDU, and discards, by checking UDC headers (1-bit indicators indicating whether UDC has been applied), only a plurality of items of data (PDCP PDUs or PDCP SDUs) to which UDC has been applied and that are from among PDCP PDUs (or PDCP SDUs) whose PDCP sequence numbers are greater than or equal to the PDCP sequence number. That is, a plurality of items of data to which UDC has not been applied do not have any relation to the checksum failure, and thus are not discarded. According to another embodiment, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit a PDCP control PDU indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the PDCP control PDU, the transmitting end may reset (initialize) the UDC buffer of the transmitting end, may discard data to which UDC has been applied, the data being from among a plurality of items of data that are not transmitted yet and have PDCP sequence numbers greater than a PDCP sequence number indicated in the PDCP control PDU, may perform again UDC only on a plurality of items of data (PDCP PDUs or PDCP SDUs) to which UDC has been applied and are from data (a PDCP SDU) corresponding to the indicated PDCP sequence number to a plurality of items of data having greater PDCP sequence numbers than the data, may update the UDC buffer, may include checksum bits in a UDC header, and may transfer data including the UDC header to a lower layer (may perform retransmission). That is, the transmitting end does not retransmit a plurality of items of data to which UDC has not been applied and that have PDCP sequence numbers greater than the indicated PDCP sequence number. The transmitting end may newly perform compression on a plurality of items of data that were compressed (transmitted) and were already given PDCP sequence numbers from among the PDCP sequence numbers that are greater than the indicated PDCP sequence number, may sequentially allocate new PDCP sequence numbers to a plurality of items of new data, and may perform a compression procedure following the aforementioned compression procedure. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

An eighth embodiment of the checksum failure processing method, the PDCP control PDU described in FIG. 17 being applied to the eighth embodiment, is described below.

When the receiving end (the base station) acknowledges a checksum failure of the UDC buffer of the receiving end, the checksum failure being with respect to data on which UDC decompression is to be performed, the receiving end indicates occurrence of the checksum failure by transmitting a PDCP control PDU to the UE. A newly defined PDCP control PDU may be used as the PDCP control PDU, or an existing PDCP control PDU may be changed and used by having a new indicator defined therein. The PDCP control PDU may indicate whether a checksum failure has occurred in data corresponding to a certain PDCP sequence number. According to another method, because a checksum failure has occurred, instead of the PDCP sequence number, an indicator indicating to reset the UDC buffer may be defined and then the reset may be indicated. According to another method, an indicator indicating occurrence of a checksum failure may be defined, instead of the PDCP sequence number, and then the occurrence of the checksum failure may be indicated.

Operations of the receiving end: The receiving end (the base station) includes, in the PDCP control PDU, a PDCP sequence number at which the checksum failure has occurred, transmits the PDCP control PDU, and discards only data corresponding to the PDCP sequence number. According to another embodiment, the receiving end may reset the UDC buffer of the receiving end, may discard a plurality of items of data, from among a plurality of items of newly-received data, whose UDC header or PDCP header does not include an indicator indicating that the UDC buffer of the transmitting end has been reset due to the UDC checksum failure, and may restart decompression from a plurality of items of data whose UDC header or PDCP header includes the indicator indicating that the UDC buffer of the transmitting end has been reset due to the UDC checksum failure. According to another method, when the receiving end acknowledges the checksum failure, the receiving end may stop a decompression procedure, may transmit a PDCP control PDU indicating the checksum failure to the transmitting end, and may store a plurality of items of data received after the transmission. When the receiving end receives data whose PDCP header indicates, by using a 1-bit indicator, that the UDC buffer of the transmitting end has been reset, the data being from among the plurality of items of data received after the transmission, the receiving end may reset the UDC buffer of the receiving end, may discard all data whose PDCP sequence numbers are less than a PDCP sequence number of the data and whose decompression is not performed, and may restart and perform decompression on a plurality of items of data whose PDCP sequence numbers are greater than or equal to the PDCP sequence number of the data.

Operations of the transmitting end: When the transmitting end (the UE) receives the PDCP control PDU, the transmitting end may reset (initialize) the UDC buffer of the transmitting end, may reconstruct data that corresponds to a PDCP sequence number indicated in the PDCP control PDU and was previously transmitted (when the data is stored in a buffer, the data is retransmitted as it is), and may retransmit the data. The transmitting end may transmit contents of the UDC buffer of the transmitting end to the receiving end, the contents being used to apply UDC on the data corresponding to the indicated PDCP sequence number (alternatively, the transmitting end may define and transmit a new PDCP control PDU). To update the UDC buffer of the receiving end, in which a checksum error has occurred, and to synchronize contents of the UDC buffer of the transmitting end with contents of the UDC buffer of the receiving end, the transmitting end may transmit the contents of the UDC buffer of the transmitting end, the contents corresponding to the PDCP sequence number, and thus may update and synchronize the UDC buffer of the transmitting end. According to another method, when the transmitting end receives an indication indicating to reset the UDC buffer, the transmitting end may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU and may transfer the indicator indicating that a UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value). According to another method, when the transmitting end receives an indication indicating occurrence of the checksum failure, the transmitting end may reset the UDC buffer of the transmitting end, may newly perform UDC only on a PDCP PDU to be newly configured, or data whose PDCP sequence number is greater than or equal to a PDCP sequence number of data that is not transferred yet to the lower layer, and may transfer the data to the lower layer. In addition, the transmitting end may include an indicator in a UDC header or PDCP header of the newly-configured PDCP PDU, the indicator indicating that the UDC buffer of the transmitting end has been reset (or an indicator indicating to reset the UDC buffer of the receiving end), and may transfer the indicator indicating that the UDC buffer of the transmitting end has been reset (that is, when data that was ciphered using a PDCP count value and a security key and then transmitted is ciphered again using the same PDCP count value and security key and then transmitted, a risk of hacking is increased, and thus, the transmitting end may comply with a rule that ciphering and transmission are performed once with respect to one PDCP count value).

According to the checksum failure processing methods, the transmitting end may similarly perform one of the aforementioned embodiments from data corresponding to a PDCP sequence number that is immediately prior to the PDCP sequence number indicated by the receiving end.

FIG. 18 is a diagram for describing data compressed based on an old UDC context not being distinguished from data compressed based on new UDC context.

Referring to FIG. 18, when the checksum failure occurs in the receiving end of the embodiments described above, except for the first and fifth embodiments of the checksum failure processing method, data compressed based on an old UDC context might not be distinguished from data compressed based on a new UDC context. According to the first and fifth embodiments of the checksum failure processing method, the PDCP layers, the RLC layers, or the MAC layers of the transmitting and receiving ends are re-established such that data compressed based on old UDC context and data compressed based on new UDC context are not transferred in a mixed manner to the PDCP layer. In this regard, the old UDC context may refer to compression information (e.g., buffer information of the transmitting and receiving ends) about compression that was performed before occurrence of the checksum failure, and the new UDC context may refer to compression information (e.g., buffer information of the transmitting and receiving ends) about compression that is newly performed after occurrence of the checksum failure.

A PDCP layer 2*j*-05 of a transmitting end of a UE may perform a UDC on uplink-transmit data. For example, the transmitting end may perform a UDC on a plurality of items of data of PDCP sequence numbers 0, 1, 2, and 3, may transfer the plurality of items of data to a lower layer, and may transmit the plurality of items of data to a receiving end (base station (eNB or gNB)). The plurality of items of transmitted data may arrive at the receiving end while orders 2*j*-15 of the plurality of items of data are mixed due to a HARQ retransmission procedure of a MAC layer and a retransmission procedure of an RLC layer, the orders 2*j*-15 referring to orders of original transmission. In addition, a certain packet may arrive very late.

For example, the PDCP layer 2*j*-05 of the transmitting end performs a UDC on the plurality of items of data of the PDCP sequence numbers 0, 1, and 2 and transmits the plurality of items of data, a PDCP layer 2*j*-10 of the receiving end receives the plurality of items of data corresponding to the PDCP sequence numbers 0 and 1, and a checksum failure occurs in the data of the PDCP sequence number 1. In this regard, according to an embodiment, the receiving end may transmit an RRC message or a PDCP control PDU to indicate the occurrence of the checksum failure in the data of the PDCP sequence number 1 at step 2*j*-35. The data corresponding to the PDCP sequence number 2 may arrive very late due to the HARQ retransmission procedure of the MAC layer and the retransmission procedure of the RLC layer at step 2*j*-25. In this regard, the receiving end (the eNB or the gNB) transmits, to the UE, the RRC message or the PDCP control PDU to indicate a PDCP sequence number where a checksum failure has occurred, and may discard a plurality of items of data to which UDC has been applied (whether UDC has been applied may be checked based on indicators of UDC headers) and that have PDCP sequence numbers greater than or equal to the PDCP sequence number where the checksum failure has occurred at step 2*j*-30.

After the UE receives the RRC message or the PDCP control PDU indicating the PDCP sequence number where the checksum failure has occurred, the UE may reset a UDC buffer for a plurality of items of data to which UDC has been previously applied and that have PDCP sequence numbers greater than or equal to the indicated PDCP sequence number or a plurality of items of data to which UDC is to be newly applied, may perform a UDC procedure, may update the UDC buffer, may calculate checksum bits corresponding to the update and include the checksum bits in a UDC header, and may transfer the data including UDC header to the lower layer (that is, the UE may perform retransmission and then may perform new transmission right after the retransmission by allocating sequential PDCP sequence numbers). The UE generates data by newly compressing (based on UDC context) the plurality of items of data to which UDC has been previously applied and that have PDCP sequence numbers greater than or equal to the indicated PDCP sequence number 1, and transfers the data to the lower layer (that is, retransmission is performed). When the transmitting end has data that was compressed based on old UDC context and is not transferred yet, the data may be discarded.

The plurality of items of data compressed based on new UDC context may be transferred, having PDCP sequence numbers 1 and 2. Then, the data that is compressed based on old UDC context and corresponds to the PDCP sequence number 2 may arrive late. When the receiving end does not distinguish between the two items of data both corresponding to the PDCP sequence number 2, a data decompression failure may occur, and thus, the data compressed based on old UDC context has to be discarded, and the data compressed based on new UDC context has to be decompressed according to its order at step 2*j*-50.

Figure 19:
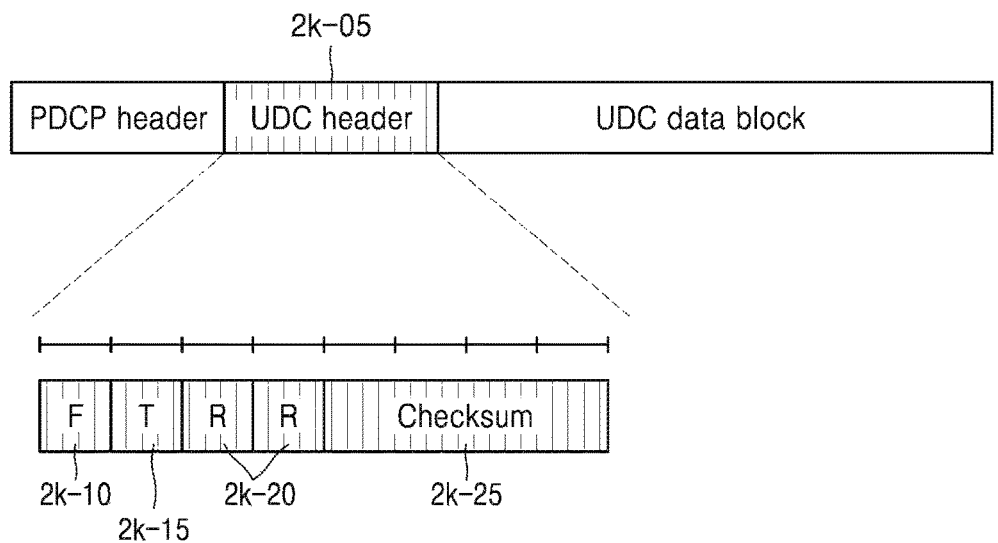
FIG. 19 is a diagram of a UDC header for distinguishing data compressed based on an old UDC context from data compressed based on a new UDC context, according to an embodiment.

FIG. 19 is a diagram of a UDC header to distinguish data compressed based on an old UDC context from data compressed based on a new UDC context, according to an embodiment.

Referring to FIG. 19, when a UDC is applied (when UDC is performed), a PDCP PDU may consist of a PDCP header, a UDC header 2*k*-05, and a compressed UDC data block. In this regard, the UDC header 2*k*-05 may have a size of 1 byte and may consist of an F field 2*k*-10, a T field 2*k*-15, an R field 2*k*-20, and checksum bits 2*k*-25.

The F field 2*k*-10 of the UDC header 2*k*-05 is a field for indicating whether UDC has been applied (indicating whether UDC has been performed) to the compressed UDC data block. That is, when a PDCP layer of a transmitting end receives a PDCP SDU from an upper layer and applies UDC thereto, the PDCP layer may set the F field 2*k*-10 to be 1, when the PDCP layer does not apply UDC thereto, the PDCP layer may set the F field 2*k*-10 to be 0, and by doing so, the PDCP layer may indicate whether UDC has been applied or not.

The T field 2*k*-15 of the UDC header 2*k*-05 indicates a toggle bit and may be changed whenever a UDC buffer is reset (or whenever UDC is reset, is restarted, or is initialized). That is, the T field 2*k*-15 may be toggled (from 0 to 1 or from 1 to 0). An initial value of the toggle bit may be set as 0 or 1. For example, when the initial value is 0, a toggle bit (the T field 2*k*-15) of each of UDC headers of all data in the transmitting end to which UDC is applied may be set as 0. When the transmitting end instructs reset of a UDC buffer of a receiving end by using an RRC message or a PDCP control PDU (or when the transmitting end instructs reset, restart, or initialization of UDC), the toggle bit of a UDC header of data to which UDC is to be newly applied may be set as 1. For example, when a checksum failure has occurred and the receiving end indicates the checksum failure to the transmitting end, the transmitting end may configure a UDC header in which the toggle bit is toggled and may transmit data to which UDC has been applied to the receiving end. Thus, when a checksum error occurs in the receiving end, the receiving end may check a T bit of a UDC header, may discard a plurality of items of data having a same value as the T bit before occurrence of the checksum error, may receive a plurality of items of data each having a toggled value of the T bit, may distinguish the plurality of items of data from the plurality of items of discarded data, and may normally process the plurality of items of data. In this regard, when the F field 2$k$-10 indicates that UDC has not been applied, the plurality of items of data may not be discarded regardless of the T bit and may be normally processed.

According to an embodiment, data compressed based on old UDC context that is not distinguished from data compressed based on new UDC context, may be corrected by defining a toggle bit of a UDC header and using the toggle bit in the aforementioned manner.

The toggle bit of the UDC header and the use of the toggle bit in the transmitting and receiving ends may be applied to the embodiments of the checksum failure processing method.

R bits in the R field 2$k$-20 of FIG. 19 and reserved bits may be defined and used to indicate whether to perform reset on the UDC buffer, whether to use current data so as to update the UDC buffer, or whether to use a predefined dictionary. 1 bit among the reserved bits may be defined and used to indicate whether reset has been performed on the UDC buffer of the transmitting end, due to the checksum failure. Alternatively, 1 bit may be defined and used to instruct the receiving end to reset the UDC buffer of the receiving end because the reset has been performed on the UDC buffer of the transmitting end, due to the checksum failure.

As described above, the checksum bits 2$k$-25 of FIG. 19 are used to verify validity of contents in the UDC buffer of the transmitting end, the contents being used by the transmitting end to apply UDC. In addition, when the receiving end decompresses data to which UDC has been applied, the receiving end may calculate and use the checksum bits 2$k$-25 so as to verify validity of contents in the UDC buffer of the receiving end. The checksum bits 2$k$-25 may have a length of 4 bits, and a probability of verified validity may be increased by defining a longer value of the length.

Figure 20:
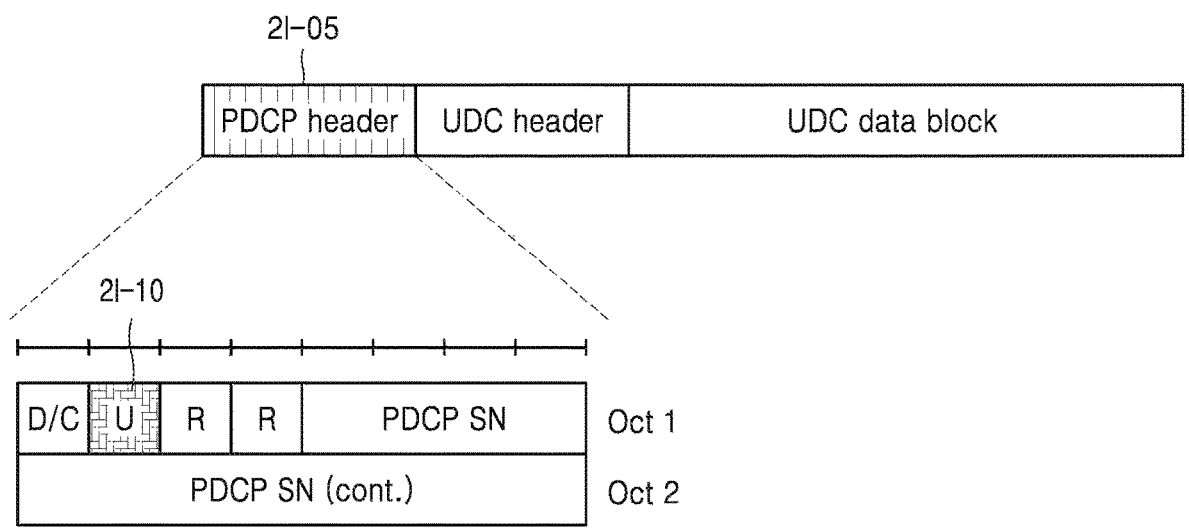
FIG. 20 illustrates a PDCP header in which a new field for decreasing overhead is defined, according to an embodiment.

FIG. 20 illustrates a PDCP header 2$l$-05 in which a new field for decreasing overhead is defined, according to an embodiment.

Referring to FIG. 20, a new U field 2$l$-10 may be applied to the PDCP header 2$l$-05. The U field 2$l$-10 may indicate whether UDC has been applied to a PDCP SDU of a PDCP PDU. In addition, the U field 2$l$-10 may indicate whether the PDCP SDU includes a UDC header. Thus, when a PDCP layer of a transmitting end did not apply UDC to data, the PDCP layer may set the U field 2$l$-10 as 0 (or 1) in the PDCP header 2$l$-05 and may omit an UDC header, and when the PDCP layer of the transmitting end applied UDC to data, the PDCP layer may set the U field 2$l$-10 as 1 (or 0) in the PDCP header 2$l$-05, may configure an UDC header, and may insert the UDC header therein.

When the U field 2$l$-10 in the PDCP header 2$l$-05 is 0, a PDCP layer of a receiving end may recognize omission of a UDC header and may directly perform data processing on the PDCP SDU. However, when the U field 2$l$-10 in the PDCP header 2$l$-05 is 1, the PDCP layer of the receiving end may recognize the presence of the UDC header, and may reconstruct raw data by reading the UDC header in the front of the PDCP SDU, checking validity of a buffer, based on checksum bits of the UDC header, and performing decompression of UDC on other parts of the PDCP SDU.

According to an embodiment, by using the U field 2$l$-10 of 1 bit in the PDCP header 2$l$-05, overhead of 1 byte may be saved when the transmitting end transmits data to the receiving end. The U field 2$l$-10 may be used only when UDC setting is configured in a bearer, a logical channel, or a PDCP layer, and in another setting, the U field 2$l$-10 may be used as a reserved field or a field having another function.

Figure 21:
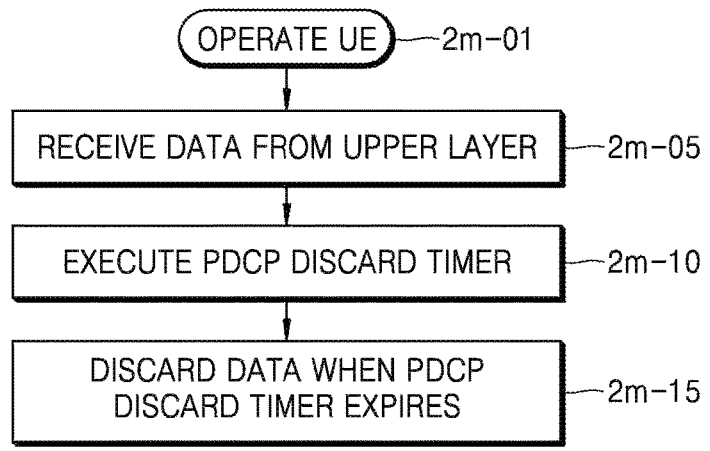
FIG. 21 is a diagram illustrating UE operations associated with a method, performed by a PDCP layer of a transmitting end, of executing a PDCP discard timer and discarding data, according to an embodiment.

FIG. 21 is a flowchart of UE operations associated with a method, performed by a PDCP layer of a transmitting end, of executing a PDCP discard timer and discarding data, according to an embodiment.

Referring to FIG. 21, when a UE 2$m$-01 receives data from an upper layer at step 2$m$-05, the UE 2$m$-01 may drive a PDCP discard timer on each data at step 2$m$-10. Whenever a PDCP discard timer expires, the UE 2$m$-01 may discard data corresponding to the expired PDCP discard timer at step 2$m$-15. A procedure of executing a PDCP discard timer and discarding data when the PDCP discard timer has expired may follow the first to fourth embodiments of the data discarding method by the PDCP layer.

Figure 22:
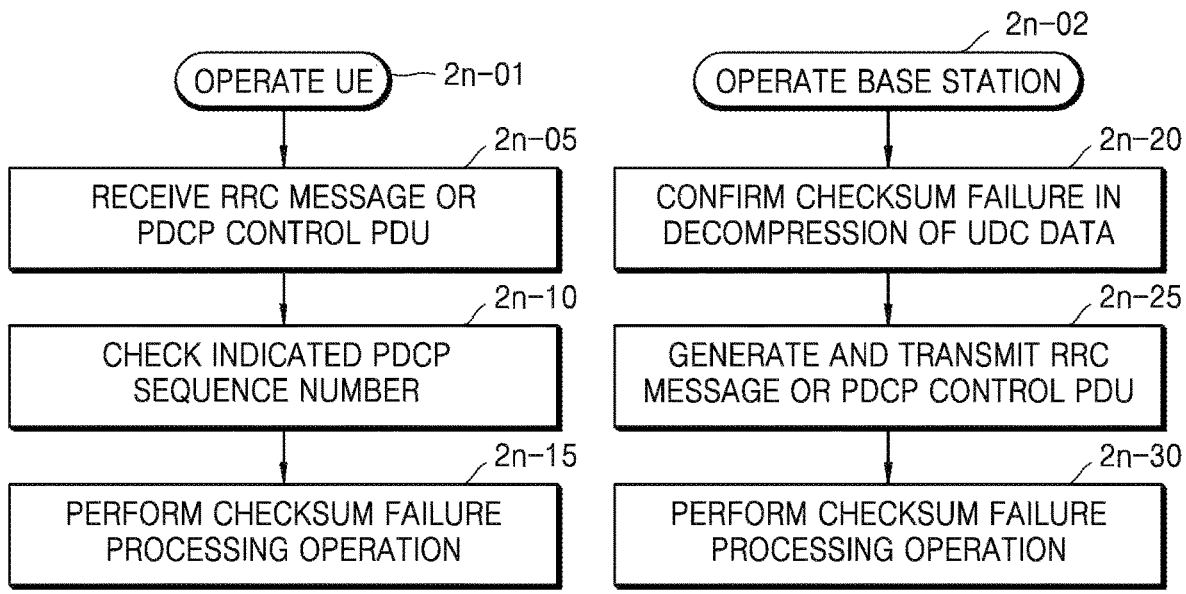
FIG. 22 is a block diagram of UE and base station operations associated with a checksum failure processing method, according to an embodiment.

FIG. 22 is a flowchart of UE operations and base station operations both associated with a checksum failure processing method, according to an embodiment.

Referring to FIG. 20, when a base station 2$n$-02 confirms checksum failure in decompression of UDC data at step 2$n$-20, the base station 2$n$-02 may generate an RRC message or a PDCP control PDU to include a PDCP sequence number corresponding to the checksum failure, and may transmit the RRC message or the PDCP control PDU to a UE 2$n$-01 at step 2$n$-25. In this regard, the base station 2$n$-02 may inform the UE 2$n$-01 with the checksum failure, and may discard or perform normal data processing on previously-received data or data to be received (the base station 2$n$-02 may perform data processing by distinguishing between data by using a F bit and a T bit of a UDC header) at step 2$n$-30.

When the UE 2$n$-01 receives the RRC message or the PDCP control PDU, each indicating the checksum failure, at step 2$n$-05, the UE 2$n$-01 may check the PDCP sequence number indicated in the RRC message or the PDCP control PDU at step 2$n$-10), and may perform a checksum failure processing operation at step 2$n$-15).

The checksum failure processing operations performed by the base station 2$n$-02 and the UE 2$n$-01 may follow the first to eighth embodiments of the checksum failure processing method.

Figure 23:
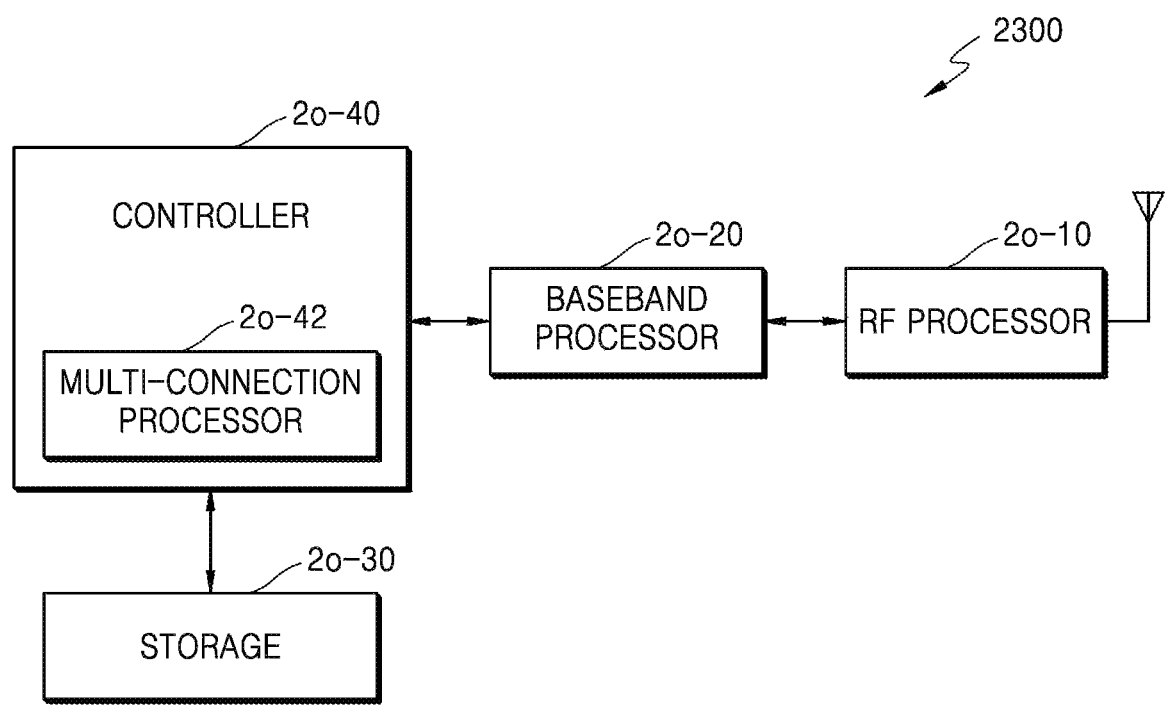
FIG. 23 is a block diagram of a UE, according to an embodiment.

FIG. 23 is a block diagram of a UE 2300 according to an embodiment.

Referring to FIG. 23, the UE 2300 includes an RF processor 2$o$-10, a baseband processor 2$o$-20, a storage 2$o$-30, and a controller 2$o$-40.

The RF processor 2$o$-10 performs functions including conversion, amplification, or the like of a band of a signal so as to transceive the signal through a wireless channel. That is, the RF processor 2$o$-10 up-converts a baseband signal provided from the baseband processor 2$o$-20 to an RF band signal and receives the RF band signal via an antenna, and down-converts an RF band signal received via the antenna to a baseband signal. For example, the RF processor 2o-10 may include a transmission filter, a reception filter, an amplifier, a mixer, an oscillator, a DAC, an ADC, or the like. Although FIG. 23 illustrates only one antenna, the UE 2300 may include a plurality of antennas. In addition, the RF processor 2o-10 may include a plurality of RF chains. Furthermore, the RF processor 2o-10 may perform beamforming. For beamforming, the RF processor 2o-10 may adjust phases and magnitudes of respective signals transceived via the plurality of antennas or antenna elements. In addition, the RF processor 2o-10 may perform MIMO, and may receive a plurality of layers while performing a MIMO operation. The RF processor 2o-10 may perform reception beam sweeping by appropriately setting the plurality of antennas or the antenna elements by the control of the controller 2o-40, or may adjust a direction and width of a received beam such that the received beam coordinates with a transmitted beam.

The baseband processor 2o-20 performs a function of conversion between the baseband signal and a bit string according to a physical layer specification of a system. For example, in data transmission, the baseband processor 2o-20 generates complex symbols by encoding and modulating a transmitted bit string. In addition, in data reception, the baseband processor 2o-20 reconstructs a received bit string by demodulating and decoding a baseband signal provided from the RF processor 2o-10. For example, when data is transmitted according to an OFDM scheme, the baseband processor 2o-20 generates complex symbols by encoding and modulating a transmitted bit string, maps the complex symbols to subcarriers, and configures OFDM symbols by performing an IFFT operation and inserting a CP. Furthermore, in data reception, the baseband processor 2o-20 may divide the baseband signal provided from the RF processor 2o-10 into OFDM symbol units and restore the signals mapped to the subcarriers by performing a FFT operation and then reconstruct the received bit string by demodulating and decoding the signals.

The baseband processor 2o-20 and the RF processor 2o-10 transmit and receive signals as described above. Accordingly, the baseband processor 2o-20 and the RF processor 2o-10 may be referred to as a transmitter, a receiver, a transceiver, or a communicator. Furthermore, at least one of the baseband processor 2o-20 and the RF processor 2o-10 may include a plurality of communication modules to support different wireless access technologies. In addition, at least one of the baseband processor 2o-20 and the RF processor 2o-10 may include different communication modules configured to support a plurality of different wireless access technologies. Furthermore, at least one of the baseband processor 2o-20 and the RF processor 2o-10 may include different communication modules configured to process signals of different frequency bands. For example, the different wireless access technologies may include an LTE network, an NR network, or the like. Examples of the different frequency bands may include an SHF (Super High Frequency) band (e.g., 2.5 GHz or 5 GHz), and a mmWave band (e.g., 60 GHz).

The storage 2o-30 may store data such as a default program, an application program, and configuration information for the operations of the UE 2300. The storage 2o-30 provides stored data, in response to a request by the controller 2o-40.

The controller 2o-40 controls overall operations of the UE 2300. For example, the controller 2o-40 transmits and receives signals through the baseband processor 2o-20 and the RF processor 2o-10. Also, the controller 2o-40 records and reads the data stored in the storage 2o-30. To do so, the controller 2o-40 may include at least one processor. For example, the controller 2o-10 may include a communication processor configured to perform communication control and an AP configured to control an upper layer such as an application program.

Figure 24:
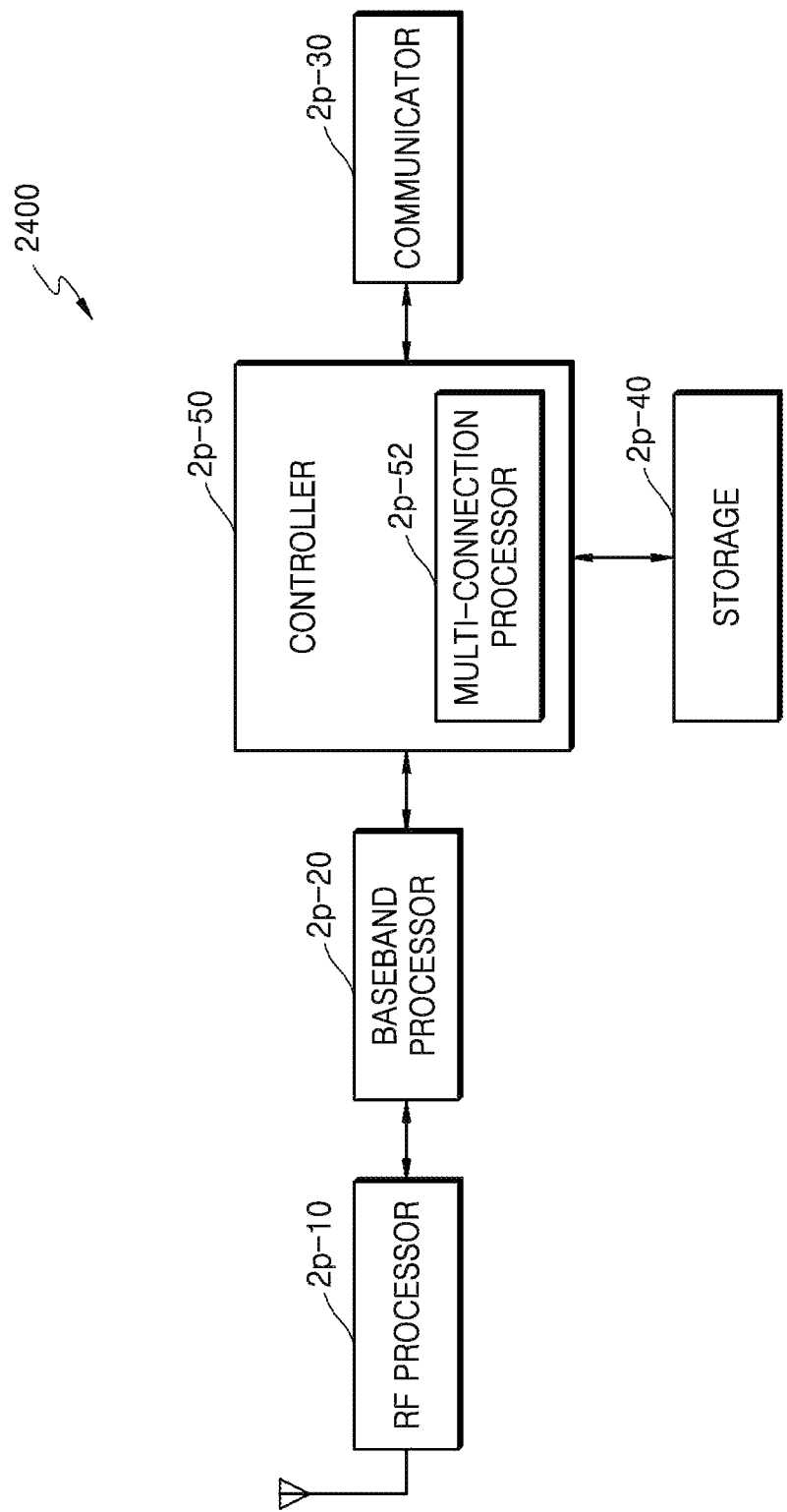
FIG. 24 is a block diagram of a base station in a wireless communication system, according to an embodiment.

FIG. 24 is a block diagram of a base station 2400 in a wireless communication system, according to an embodiment Referring to FIG. 24, the base station 2400 includes an RF processor 2p-10, a baseband processor 2p-20, a communicator 2p-30, a storage 2p-40, and a controller 2p-50.

The RF processor 2p-10 performs functions including conversion, amplification, or the like of a band of a signal so as to transceive the signal through a wireless channel. That is, the RF processor 2p-10 up-converts a baseband signal provided from the baseband processor 2p-20 to an RF band signal and receives the RF band signal via an antenna, and down-converts an RF band signal received via the antenna to a baseband signal. For example, the RF processor 2p-10 may include a transmission filter, a reception filter, an amplifier, a mixer, an oscillator, a DAC, an ADC, or the like. Although FIG. 24 illustrates only one antenna, the base station 2400 may include a plurality of antennas. In addition, the RF processor 2p-10 may include a plurality of RF chains. Furthermore, the RF processor 2p-10 may perform beamforming. For beamforming, the RF processor 2p-10 may adjust phases and magnitudes of respective signals transceived via the plurality of antennas or antenna elements. Furthermore, the RF processor 2p-10 may perform a down-MIMO operation by transmitting one or more layers.

The baseband processor 2p-20 performs a function of conversion between the baseband signal and a bit string according to a physical layer specification of a first wireless access technology. For example, in data transmission, the baseband processor 2p-20 generates complex symbols by encoding and modulating a transmitted bit string. In addition, in data reception, the baseband processor 2p-20 reconstructs a received bit string by demodulating and decoding a baseband signal provided from the RF processor 2p-10. For example, when data is transmitted according to an OFDM scheme, the baseband processor 2p-20 generates complex symbols by encoding and modulating a transmitted bit string, maps the complex symbols to subcarriers, and configures OFDM symbols by performing an IFFT operation and inserting a CP. Furthermore, in data reception, the baseband processor 2p-20 may divide the baseband signal provided from the RF processor 2p-10 into OFDM symbol units and restore the signals mapped to the subcarriers by performing a FFT operation and then reconstruct the received bit string by demodulating and decoding the signals. Accordingly, the baseband processor 2p-20 and the RF processor 2p-10 may be referred to as a transmitter, a receiver, a transceiver, a communicator, or a wireless communicator.

The communicator 2p-30 provides an interface for performing communication with other nodes in a network.

The storage 2p-40 stores data such as a default program, an application program, and configuration information for operations of the base station 2400. In particular, the storage 2p-40 may store information about a bearer allocated to a connected UE, a measurement result reported by the connected UE, or the like. In addition, the storage 2p-40 may store information that is a criterion of determining whether to provide or stop multi-connection to the UE. Furthermore, the storage 2p-40 may provide stored data, in response to a request by the controller 2p-50.

The controller 2*p*-50 controls all operations of the base station 2400. For example, the controller 2*p*-50 transceives signals via the baseband processor 2*p*-20 and the RF processor 2*p*-10, or via the communicator 2*p*-30. In addition, the controller 2*p*-50 may record/read data to/from the storage 2*p*-40. To do so, the controller 2*p*-50 may include at least one processor.

Figure 25:
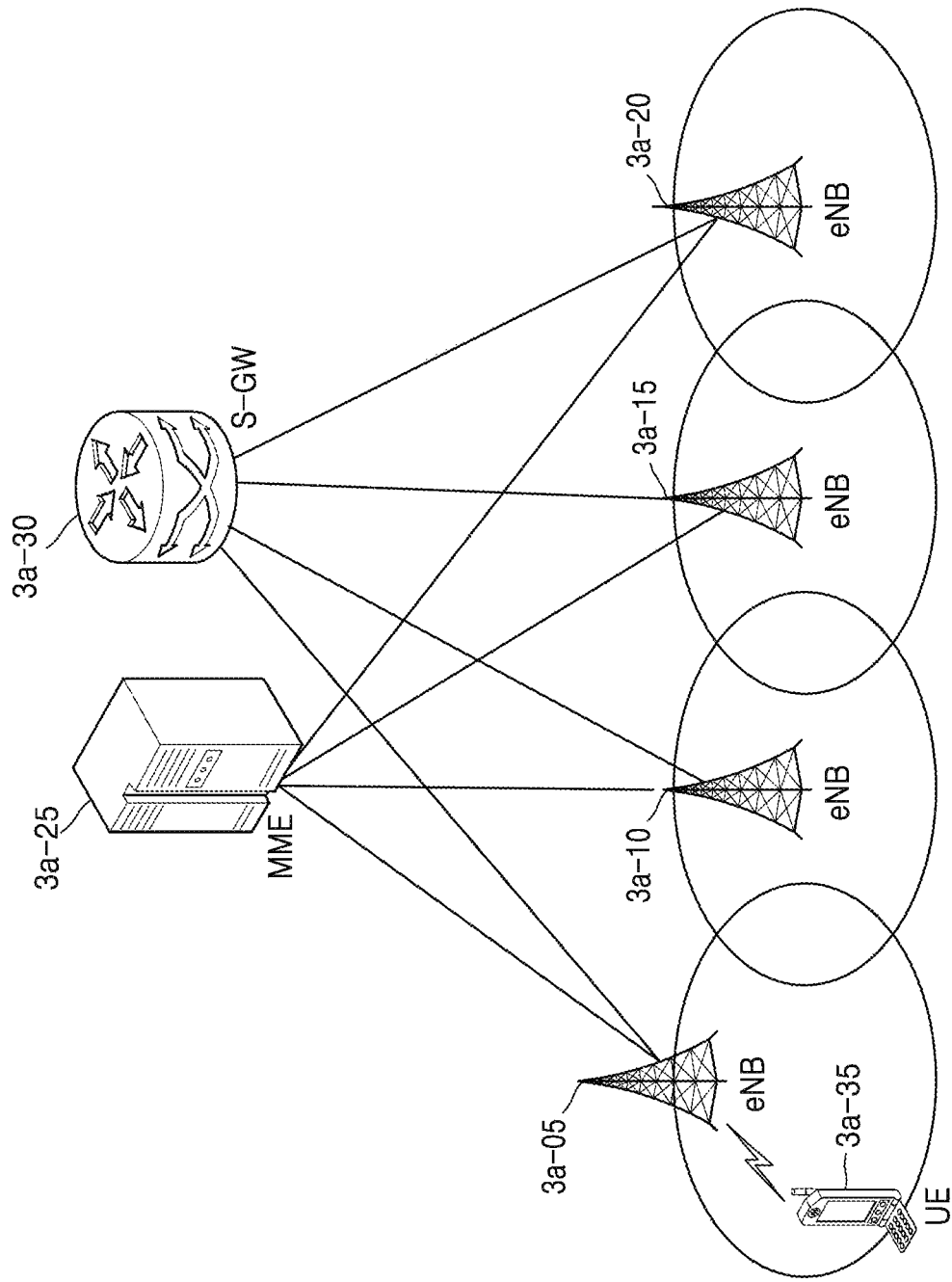
FIG. 25 is a diagram of an LTE system, according to an embodiment.

FIG. 25 is a diagram of an LTE system, according to an embodiment.

Referring to FIG. 25, a wireless access network of the LTE system is configured of a plurality of evolved node B (hereinafter, an eNB, a Node B, or a base station) 3*a*-05, 3*a*-10, 3*a*-15, and 3*a*-20, an MME 3*a*-25, and an S-GW 3*a*-30. A user equipment (hereinafter, a UE or a terminal) 3*a*-35 accesses an external network via the eNBs 3*a*-05, 3*a*-10, 3*a*-15, and 3*a*-20 and the S-GW 3*a*-30.

The eNBs 3*a*-05, 3*a*-10, 3*a*-15, and 3*a*-20 each correspond to an existing node B of a UMTS system. The eNBs 3*a*-05, 3*a*-10, 3*a*-15, and 3*a*-20 are each connected to the UE 3*a*-35, and perform complicated functions, as compared to the existing node B. In the LTE system, all user traffic including a real-time service such as a VoIP based on an internet protocol is serviced through a shared channel, and, thus, a device to obtain and schedule a plurality of pieces of state information including buffer states, available transmit power states, channel states, or the like of UEs is required, and the eNBs 3*a*-05, 3*a*-10, 3*a*-15, and 3*a*-20 each correspond to the device. In general, one eNB controls a plurality of cells. For example, to implement transmission speed of 100 Mbps, the LTE system uses, as a wireless access technology, OFDM at a bandwidth of 20 MHz. In addition, the LTE system uses an AMC technique of determining a modulation scheme and a channel coding rate according to a channel state of UE. The S-GW 3*a*-30 is a device configured to provide a data bearer, and generates or removes the data bearer, in response to a control of the MME 3*a*-25. The MME 3*a*-25 performs not only a mobility management function but also performs various control functions with respect to the UE, and is connected to a plurality of eNBs.

Figure 26:
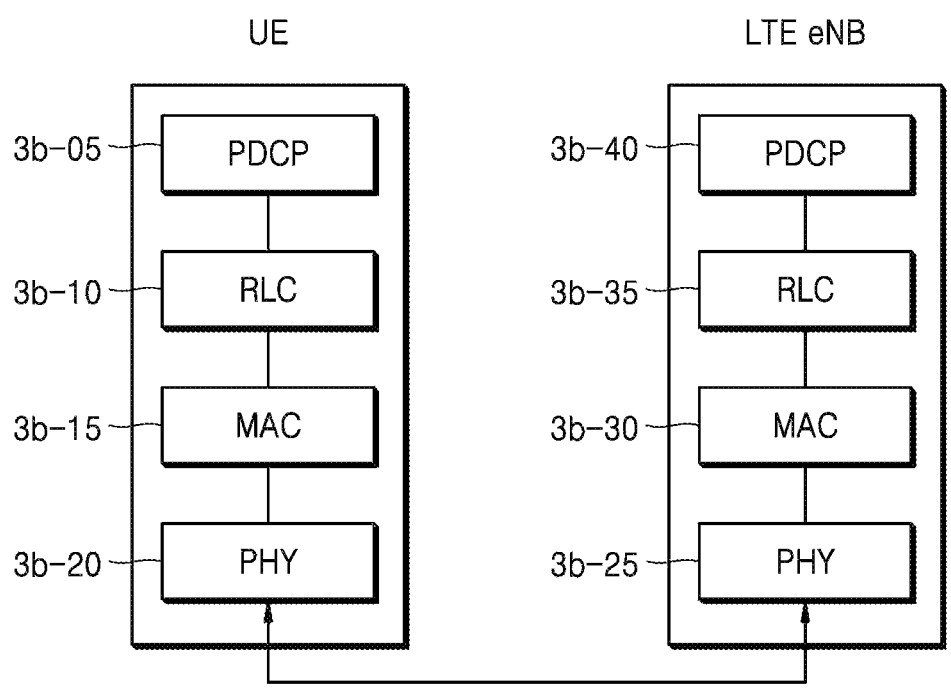
FIG. 26 is a block diagram illustrating a radio protocol architecture in an LTE system, according to an embodiment.

FIG. 26 is a block diagram of a radio protocol architecture in an LTE system, according to an embodiment.

Referring to FIG. 26, a radio protocol of the LTE system may be configured of PDCPs 3*b*-05 and 3*b*-40, RLCs 3*b*-10 and 3*b*-35, MACs 3*b*-15 and 3*b*-30, and PHYs 3*b*-20 and 3*b*-25, respectively in a UE and an LTE eNB. The PDCPs 3*b*-05 and 3*b*-40 may perform operations such as IP header compression/decompression. The main functions of the PDCPs 3*b*-05 and 3*b*-40 are summarized as follows.

Header compression and decompression (ROHC only)
  Transfer of user data
  In-sequence delivery of upper layer PDUs at PDCP re-establishment procedure for RLC AM
  For split bearers in DC (RLC AM): PDCP PDU routing for transmission and PDCP PDU reordering for reception
  Duplicate detection of lower layer SDUs at PDCP re-establishment procedure for RLC AM
  Retransmission function PDCP SDUs at handover and for split bearers in DC, PDCP PDUs at PDCP data-recovery procedure, for RLC AM
  Ciphering and deciphering function
  Timer-based SDU discard in uplink The RLCs 3*b*-10 and 3*b*-35 reconfigure a PDCP PDU to an appropriate size to perform an ARQ operation or the like. The main functions of the RLCs 3*b*-10 and 3*b*-35 are summarized below.

Transfer of upper layer PDUs
  Error correction through ARQ (only for acknowledged mode (AM) data transfer)
  Concatenation, segmentation and reassembly of RLC SDUs (only for unacknowledged mode (UM) and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol Error detection (only for AM data transfer)
  RLC SDU discard (only for UM and AM data transfer)
  RLC re-establishment The MACs 3*b*-15 and 3*b*-30 are connected to a plurality of RLC layers configured in one UE, and perform operations of multiplexing RLC PDUs into MAC PDUs and demultiplexing RLC PDUs from MAC PDUs. The main functions of the MACs 3*b*-15 and 3*b*-30 are summarized below.

Mapping between logical channels and transport channels
  Multiplexing/demultiplexing of MAC SDUs belonging to one or different logical channels into/from TB s delivered to/from the physical layer on transport channels
  Scheduling information reporting
  Error correction through HARQ
  Priority handling between logical channels of one UE
  Priority handling between UEs by means of dynamic scheduling
  MB MS service identification
  Transport format selection
  Padding The PHYs 3*b*-20 and 3*b*-25 perform operations of channel-encoding and modulating upper layer data and transmitting OFDM symbols through a wireless channel by converting the upper layer data to the OFDM symbols, or operations of demodulating and channel-decoding OFDM symbols received through the wireless channel, and transmitting decoded data to an upper layer.

Figure 27:
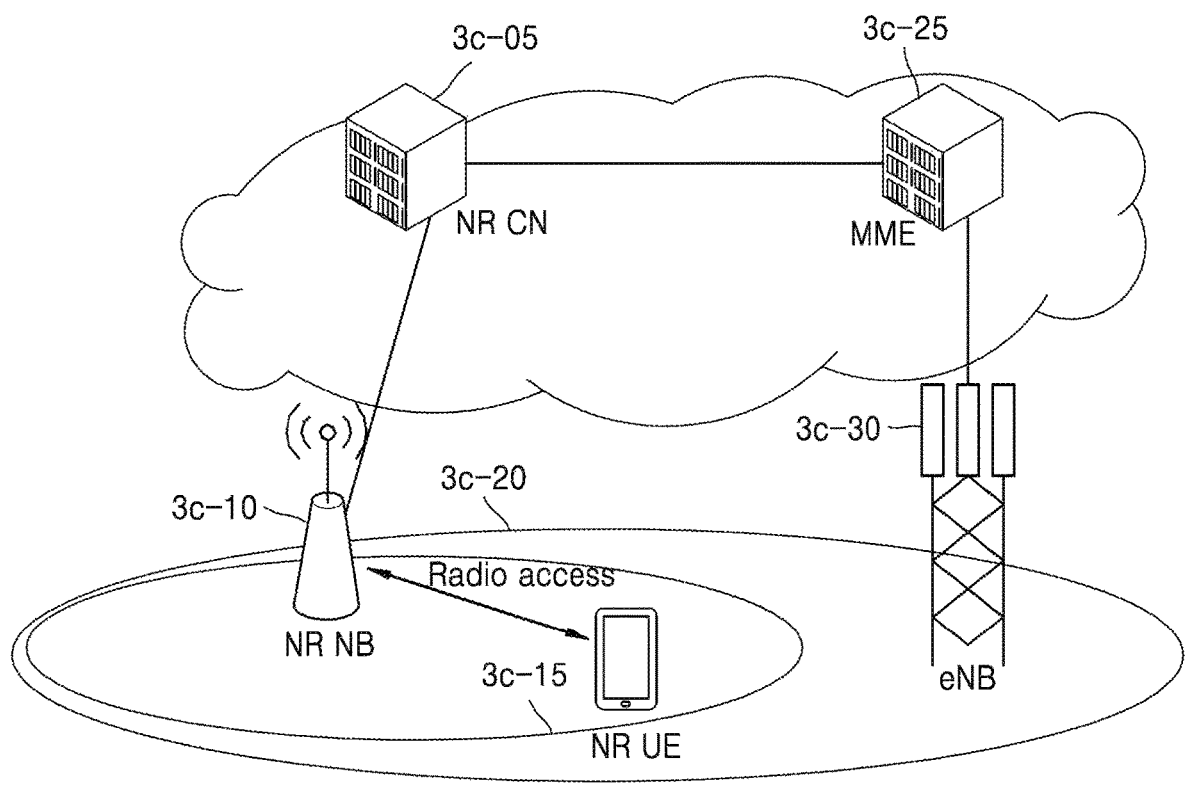
FIG. 27 is a diagram of a mobile communication system to which an embodiment is applied.

FIG. 27 is a diagram of a mobile communication system, according to an embodiment.

Referring to FIG. 27, a wireless access network of the mobile communication system is configured of a new radio node B (hereinafter, NR gNB or NR base station) 3*c*-10 and a new radio core network (hereinafter, NR CN) 3*c*-05. A new radio user equipment (hereinafter, a NR UE or a terminal) 3*c*-15 accesses an external network through the NR gNB 3*c*-10 and the NR CN 3*c*-05.

The NR gNB 3*c*-10 corresponds to an eNB of an existing LTE system. The NR gNB 3*c*-10 is connected to the NR UE 3*c*-15 through a wireless channel and may provide an excellent service, compared to the eNB according to the related art. In the NR, all user traffic is serviced through a shared channel, and thus, a device to obtain and schedule a plurality of pieces of state information including buffer states, available transmit power states, channel states, or the like of UEs is required, and the NR gNB 3*c*-10 corresponds to the device. In general, one NR gNB controls a plurality of cells. A bandwidth greater than the maximum bandwidth of existing LTE may be given to achieve high speed data transmission, compared to the existing LTE system, and beamforming technology may be added to wireless access technology such as OFDM. In addition, an AMC technique may be used to determine a modulation scheme and a channel coding rate according to a channel state of a UE. The NR CN 3*c*-05 performs functions of supporting mobility, configuring a bearer, configuring a QoS, or the like. The NR CN 3*c*-05 is a device configured to perform not only a mobility management function but also perform various control functions with respect to the UE, and is connected to a plurality of NBs. In addition, the NR may interoperate with the existing LTE system, and the NR CN 3c-05 is connected to a MME 3c-25 via a network interface. The MME 3c-25 is connected to an eNB 3c-30 that is an existing NB.

Figure 28:
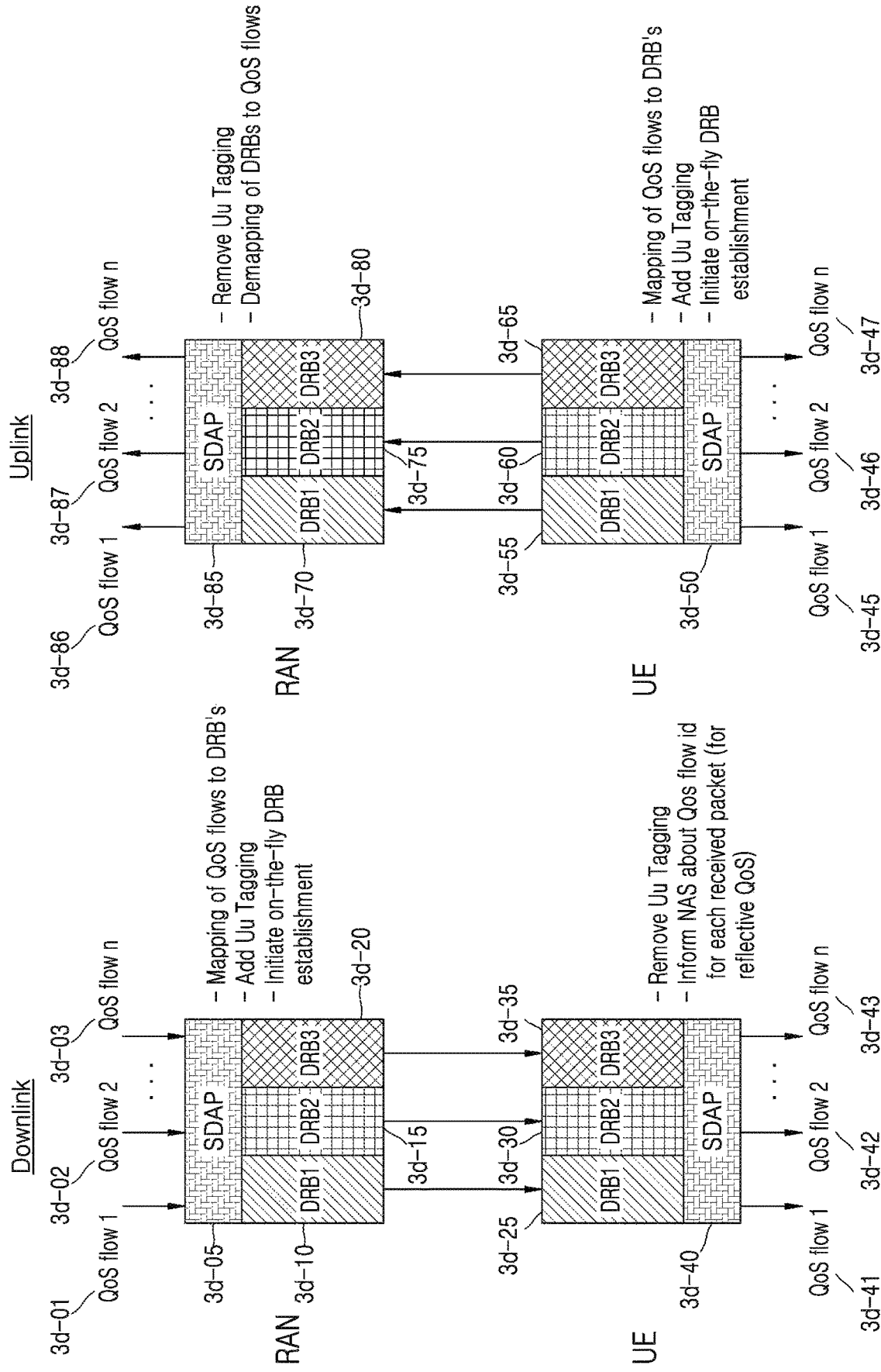
FIG. 28 is a diagram of a new radio (NR) system to handle quality of service (QoS), according to an embodiment.

FIG. 28 is a diagram of functions of an NR system to handle QoS, according to an embodiment.

Referring to FIG. 28, the NR system is requested to establish a user traffic transmission path or control respective IP flows according to services, in response to the services that require different QoSs (i.e., QoS requests). An NR core network may configure a plurality of PDU sessions, and each of the PDU sessions may include a plurality of IP flows. An NR gNB may map a plurality of QoS flows to a plurality of data radio bearers (DRBs) and may simultaneously set the DRBs. That is, a plurality of QoS flows 3d-01, 3d-02, and 3d-03 may be mapped to one DRB or respective DRBs 3d-10, 3d-15, and 3d-20, therefore, to distinguish between the QoS flows 3d-01, 3d-02, and 3d-03, it is necessary to mark a QoS flow ID to downlink packets. Alternatively, DRB mapping may be explicitly set by using an RRC control message. An existing LTE PDCP protocol does not have the aforementioned function, such that it is necessary to insert new SDAPs 3d-05, 3d-40, 3d-50, and 3d-85, each performing the function, or to add a function to a PDCP to perform a new function. The mark allows that a UE implements a reflective QoS with respect to an uplink. The reflective QoS means a mapping method by which the UE may perform uplink transmission through a DRB in which a downlink packet having a specific flow ID has been transferred, the downlink packet being transmitted by a base station, and to indicate that, an SDAP header may include 1 bit of a reflective QoS indicator (RQI) bit. An access stratum (AS) of the UE may easily provide the information to an NAS of the UE by explicitly marking the QoS flow ID to the downlink packet. A method of mapping IP flows to DRB s in a downlink has two operations below.

1. NAS level mapping: IP flow→QoS flow
2. AS level mapping: QoS flow→DRB

A receiving end of the downlink may recognize existence of QoS flow mapping information and reflective QoS mechanisms according to respective received DRBs 3d-25, 3d-30, and 3d-35, and may transfer corresponding information to the NAS. That is, when RQI is set as 1 in an SDAP header of a received data packet, this means that a mapping rule for the AS and the NAS has been updated, such that the UE may update the mapping rule and may transfer an uplink packet accordingly. That is, mapping with two operations may be used for an uplink. First, IP flows are mapped to QoS flows, according to signaling by the NAS, and the AS maps the QoS flows to defined DRBs 3d-55, 3d-60, and 3d-65. The UE may mark the QoS flow ID to the uplink packet, or may transfer the uplink packet without having the QoS flow ID marked thereto. The function is performed by an SDAP layer of the UE. When the QoS flow ID is marked to the uplink packet, a base station (the gNB) may mark the QoS flow ID without an uplink traffic flow template (TFT) to a packet to transfer the information to NG-U and may transmit the packet.

Figure 29:
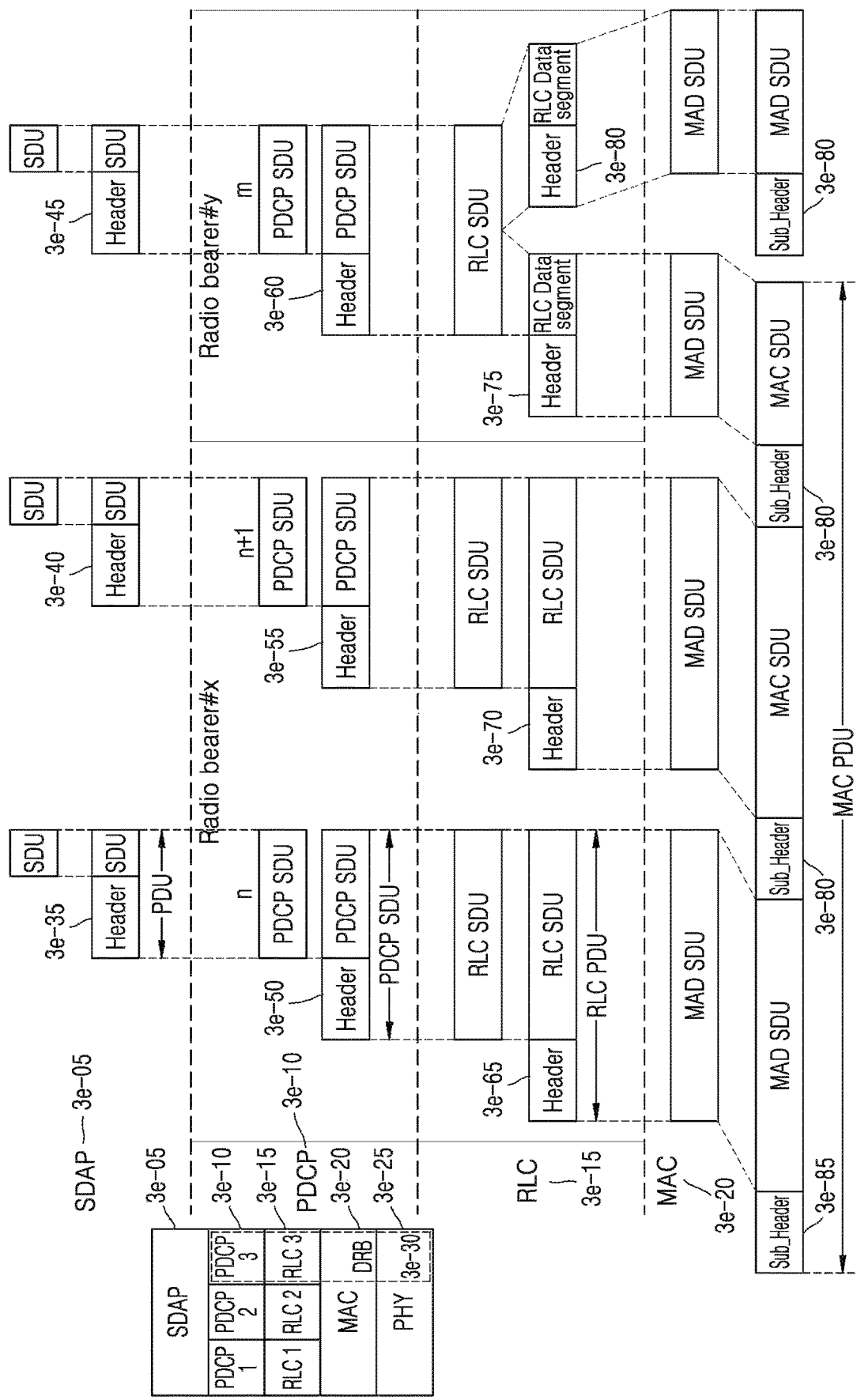
FIG. 29 is a diagram of a protocol stack including a service data access protocol (SDAP) layer in an NR system, according to an embodiment.

FIG. 29 is a diagram of a protocol stack including an SDAP layer in an NR, according to an embodiment.

Referring to FIG. 29, to process a new QoS function of the NR, information below must be transferred via a wireless interface.

Downlink: QOS flow ID+Reflective QOS processing required indicator
Uplink: QOS flow ID In the NR, an interface to transfer new information to Uu is required, and a new protocol serving as the interface is defined above a PDCP layer 3e-10. An SDAP layer 3e-05 is not a DRB-based protocol, and a packet is transferred according to a set DRB mapping rule 3e-30. That is, when IP traffic occurs, the SDAP layer 3e-05 maps an IP flow to a QoS flow ID and then maps the QoS flow ID to a DRB. In this regard, the IP traffic is configured of IP header and payload, and an SDAP headers 3e-35, 3e-40, and 3e-45 may each be positioned before an IP packet. The PDCP layer 3e-10 compresses the IP header and adds PDCP headers 3e-50, 3e-55, and 3e-60. An RLC 3e-15 adds respective RLC headers 3e-65, 3e-70, 3e-75, and 3e-80, and then a MAC 3e-20 sequentially adds a MAC sub-header 3e-85 and a MAC header and transfers a MAC PDU to a PHY 3e-25.

When a base station decides to apply a reflective mechanism (a UE is instructed to transmit an uplink packet through a DRB in which a QoS flow ID included in a downlink packet was transferred) to a UE, the downlink packet is transferred by having a QoS flow ID and a reflective QoS indicator included in the SDAP layer 3e-05 of the downlink packet. An SDAP header has a length of 1 byte and may be configured of QoS flow ID (7 bits) and RQI (1 bit).

While the aforementioned procedure is performed, when the base station includes a QoS flow ID in all data packet and transfers all data packet, the UE keeps performing an operation of updating a mapping rule according to the QoS flow ID received by the UE. That is, when an RQI bit of 1 bit is set as 1, the UE assumes that mapping rules of an NAS and an AS have been all updated, and then updates mapping rules of the NAS and the AS and transmits an uplink data packet according to the mapping rules. Basically, a reflective QoS of the NAS is triggered when a mapping rule between IP flow and QoS flow is updated in an NR core network, and a reflective QoS of the AS is triggered when a mapping rule between QoS flow and DRB is updated in a radio base station.

However, when describing with respect to signaling between the base station and the core network, the core network, when the mapping rule of the NAS is updated, sets RQI bit indicating the update in a N3 header of a data packet to be transmitted to the base station, and transmit the data packet. In this regard, the N3 header refers to an interface between the core network and the base station. When RQI bit of the N3 header received from the core network is set as 1, the base station sets RQI bit of an SDAP header as 1 and transmits it to the UE. Alternatively, even when RQI bit of the N3 header is set as 0, in a case where the mapping rule of the AS has been updated, the base station sets RQI bit of the SDAP header as 1 and transmits it to the UE. However, when the aforementioned operations are performed, the UE must keep storing a mapping information table (a TFT table) about NAS mapping and AS mapping, therefore, the amount of information that the UE must store may be increased, and when management is not properly performed, a disorder may occur due to overlapped mapping. To correct the occurrence, when the reflective QoS of the NAS is triggered, timers are executed in the UE and the NR core network, and then, when a data packet to which a corresponding rule is applied is not received while a preset timer is executed, set mapping information about the reflective QoS of the NAS is deleted. When a data packet to which a same QoS mapping rule is applied is transceived while the timer is executed, the timer is restarted.

According to an embodiment, in a new mobile communication system (i.e., the NR), a flow-based QoS is supported by a radio interface, and a change in an IP flow-QoS flow mapping rule of the NAS and a QoS flow-DRB mapping rule of the AS is correctly instructed to the UE such that the UE may correctly recognize a changed QoS and may smoothly perform operations.

Figure 30:
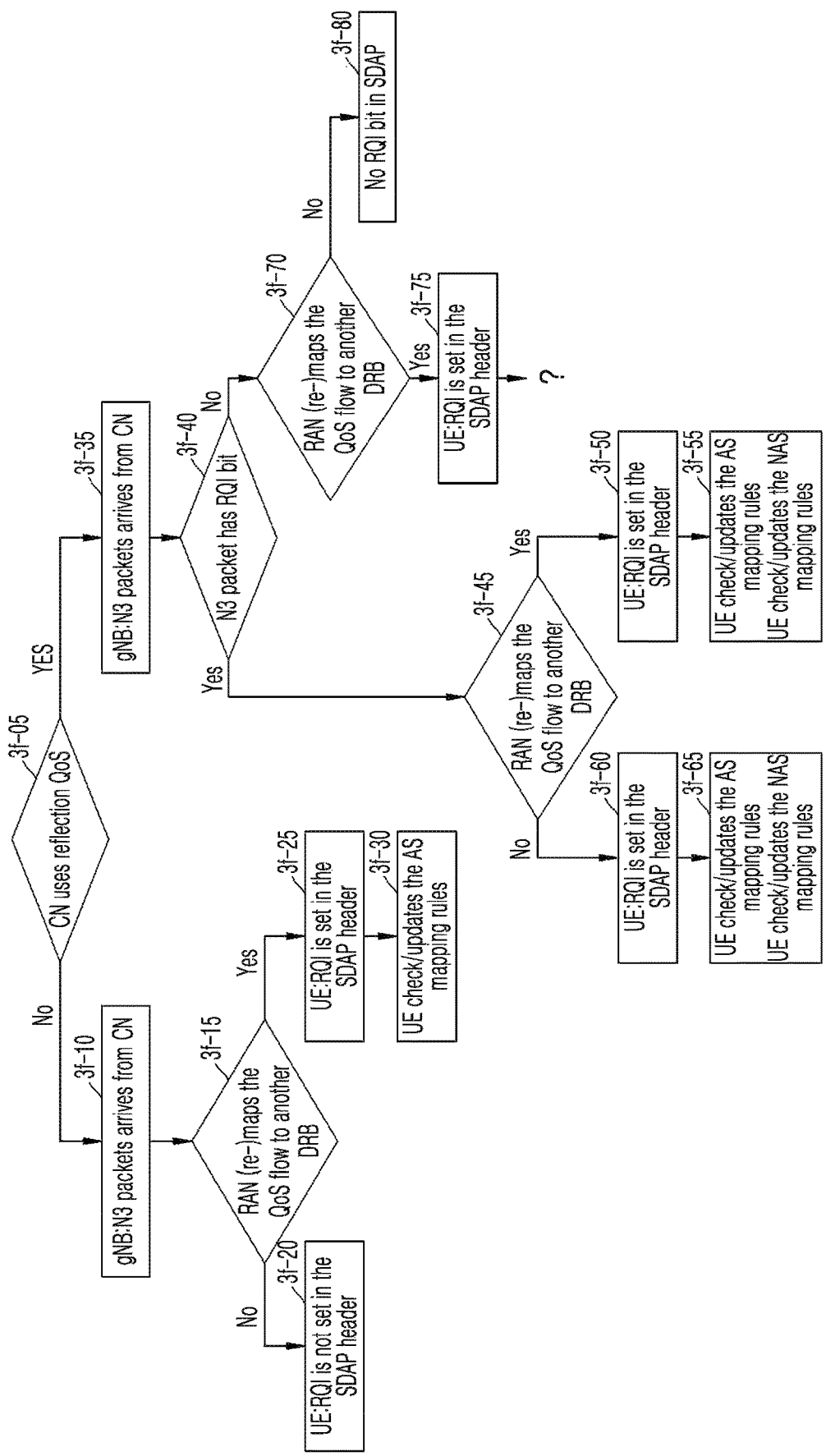
FIG. 30 is a flowchart of a method related to a QoS from a core network (CN) to a UE in an NR system using a non-access stratum (NAS) reflective QoS timer.

FIG. 30 is a flowchart of a scenario related to a QoS from a CN to a UE in an NR and an issue of using an NAS reflective QoS timer.

Referring to FIG. 30, at step 3f-05, the CN may determine a reflective QoS mechanism, and when the reflective QoS mechanism is not instructed nor supported by the CN, there is no issue. In this regard, it is assumed that the UE and a base station know whether the CN supports the reflective QoS mechanism, and information thereof may be delivered to the UE and the gNB. At step 3f-10, the gNB checks an N3 packet received from the CN but an RQI bit of the N3 packet is not set as 1. At step 3f-15, the gNB may perform an AS reflective QoS mechanism according to whether a QoS flow mapping rule has been changed. That is, when the QoS flow mapping rule has not been changed, an RQI bit of an SDAP header is set as 0 and is transferred to the UE at step 3f-20, and when the QoS flow mapping rule has been changed, the RQI bit of the SDAP header is set as 1 and is transferred to the UE at step 3f-25. At step 3f-30, the UE checks a QoS flow ID of the SDAP header of a received data packet, updates an AS mapping rule, and transmits an uplink packet to a corresponding DRB according to the AS mapping rule.

The CN may support the reflective QoS mechanism and may transfer information thereof to the UE and the gNB. At step 3f-35, the gNB checks an N3 packet received from the CN and determines whether an RQI bit of the N3 packet is set at step 3f-40. When the RQI bit of the N3 packet is set, i.e., an update of an NAS reflective QoS is instructed, at step 3f-45, the gNB checks an AS reflective QoS mechanism according to whether a QoS flow mapping rule has been changed. However, regardless whether the AS reflective QoS mechanism is updated at step 3f-50 or not at step 3f-60, the gNB sets an RQI bit of an SDAP header as 1, and the UE receives the SDAP header and then performs an update of AS/NAS mapping rules, and the reflective QoS mechanism at step 3f-55 and 3f-64. That is, the UE may perform the reflective QoS mechanism without having a certain issue.

At step 3f-40, an RQI bit of a N3 header of a packet received from the CN is not set, and at step 3f-70, the gNB checks the AS reflective QoS mechanism according to whether the QoS flow mapping rule has been changed, and as a result of the checking, when an update of an AS reflective QoS rule is required, at step 3f-75, an RQI bit of an SDAP header of a packet to be transmitted to the UE is set as 1. However, this corresponds to a case in which an NAS reflective QoS rule is not required to be updated and only the AS reflective QoS rule has been actually updated. In this case, the UE may be expected to perform AS/NSA Reflective QoS mechanisms. However, because an NAS reflective QoS timer is introduced, a logical contradiction between the CN and the UN may occur. That is, when the CN did not activate an NAS Reflective QoS, RQI of an N3 header of a previous packet is set as 1 and then a timer is executed, and when an RQI update is not required to a certain timing, a corresponding NAS mapping rule may be deleted when the timer expires. However, while the operation is being performed in the CN, when the UE receives, from the gNB, a data packet in which an RQI bit of an SDAP header is set as 1, the UE starts a new NAS reflective timer operation by resetting the timer, therefore, a difference between NAS reflective timer expiration times of the CN and the UE may occur. Due to that, NAS mapping rules of the UE and the CN may become different, and the difference thereof may lead to a result different from intended QoS mapping, such that an error may occur.

However, at step 3f-40, when the RQI bit of the N3 header of the packet received from the CN is not set, and at step 3f-70, the gNB checks the AS reflective QoS mechanism according to whether the QoS flow mapping rule has been changed, and as a result of the checking, when the update of the AS reflective QoS rule is not required, the gNB sets the RQI bit of the SDAP header as 0 and transfers the SDAP header to the UE, and the UE maintains data to be exchanged in a set DRB without changing a mapping rule.

Figure 31:
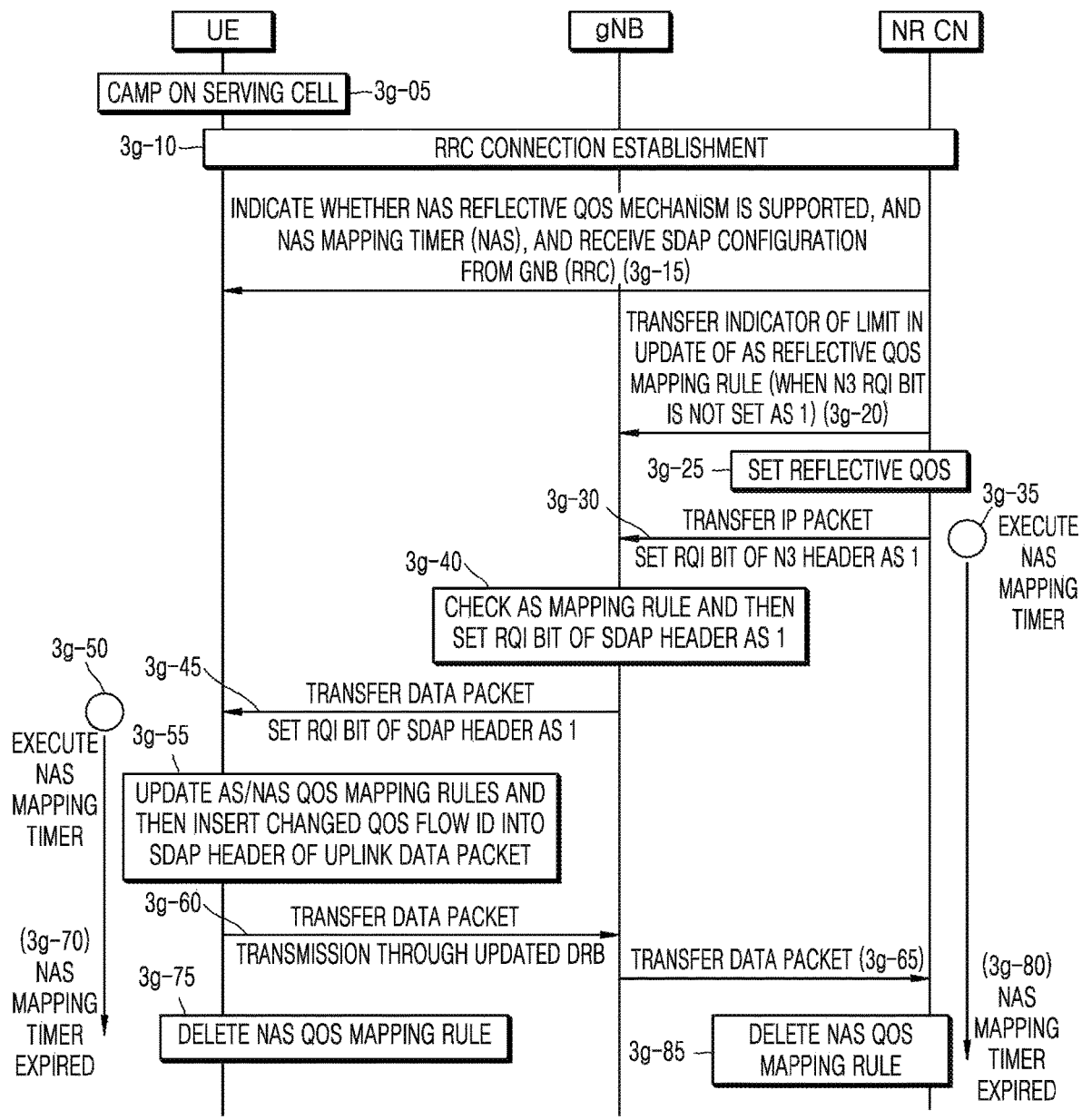
FIG. 31 is a signal flow diagram of a method, performed by a gNB, of solving a mismatch between QoS mapping rules of an NR CN and a UE.

FIG. 31 is a flow diagram of a first embodiment of a method, performed by a gNB, of resolving a mismatch between QoS mapping rules of a NR CN and UE.

Referring to FIG. 31, the NR CN sets a limit on the gNB to update an AS reflective QoS mapping rule only when an RQI bit of an N3 header of an IP packet of the NR CN is set as 1.

The UE camps on a serving cell at step 3g-05), performs RRC connection establishment on the serving cell, and then transitions to a connection mode at step 3g-10. At step 3g-15, the UE receives, from the NR CN, an indicator indicating whether the NR CN supports an NAS reflective QoS mechanism and NAS mapping timer information, and receives, from an RRC message from the gNB, whether an SDAP header (RQI, QoS flow ID) is used according to SDAP configuration. The aforementioned messages may be simultaneously provided in an RRC message, or may be respectively received via an NAS and RRC message. An NAS mapping timer refers to a timer indicating how long the NR CN and the UE have to store QoS mapping rules with respect to an NAS specific IP packet, and when the timer expires, mapping information thereof is deleted.

At step 3g-20, the NR CN instructs, to the gNB, limit information regarding an update of the AS reflective QoS mapping rule. That is, the NR CN sets a limit on the gNB to update the AS reflective QoS mapping rule only when the RQI bit of the N3 header of the IP packet of the NR CN is set as 1. At step 3g-25, the NR CN that supports the NAS reflective QoS mechanism checks whether to update reflective QoS mapping with respect to the IP packet to be transferred to the UE, and when the update is required, the NR CN sets the RQI bit of the N3 header of the IP packet as 1, and at step 3g-30, the NR CN transfers the IP packet. Simultaneously, the NR CN executes the NAS mapping timer at step 3g-35. The gNB checks the RQI bit of the N3 header of the received IP packet, and when the RQI bit is set as 1, the gNB checks whether to update an AS mapping rule at step 3g-40, and when required, the gNB sets an RQI bit of an SDAP header as 1 and transfers a data packet to the UE at step 3g-45. Then, the UE executes the NAS mapping timer at step 3g-50. In this regard, a condition of setting the RQI bit of the SDAP header as 1 corresponds to only a case in which the RQI bit of the N3 header is set and the update of the AS mapping rule is required. The UE receives the data packet from the gNB, and when the RQI bit of the SDAP header is set as 1, the UE executes the NAS mapping timer. At step 3g-55, the UE performs a reflective QoS mechanism (an update of AS/NAS mapping rules), and at step 3g-60, the UE transfers an uplink data packet according to updated information. At step 3g-65, the gNB transfers the data packet received from the UE to the NR CN. When the NAS mapping timer expires in each of the UE and the NR CN, the UE and the NR CN delete NAS QoS mapping rules with respect to the IP packet at steps 3g-70, 3g-75, 3g-80, and 3g-85.

Figure 32:
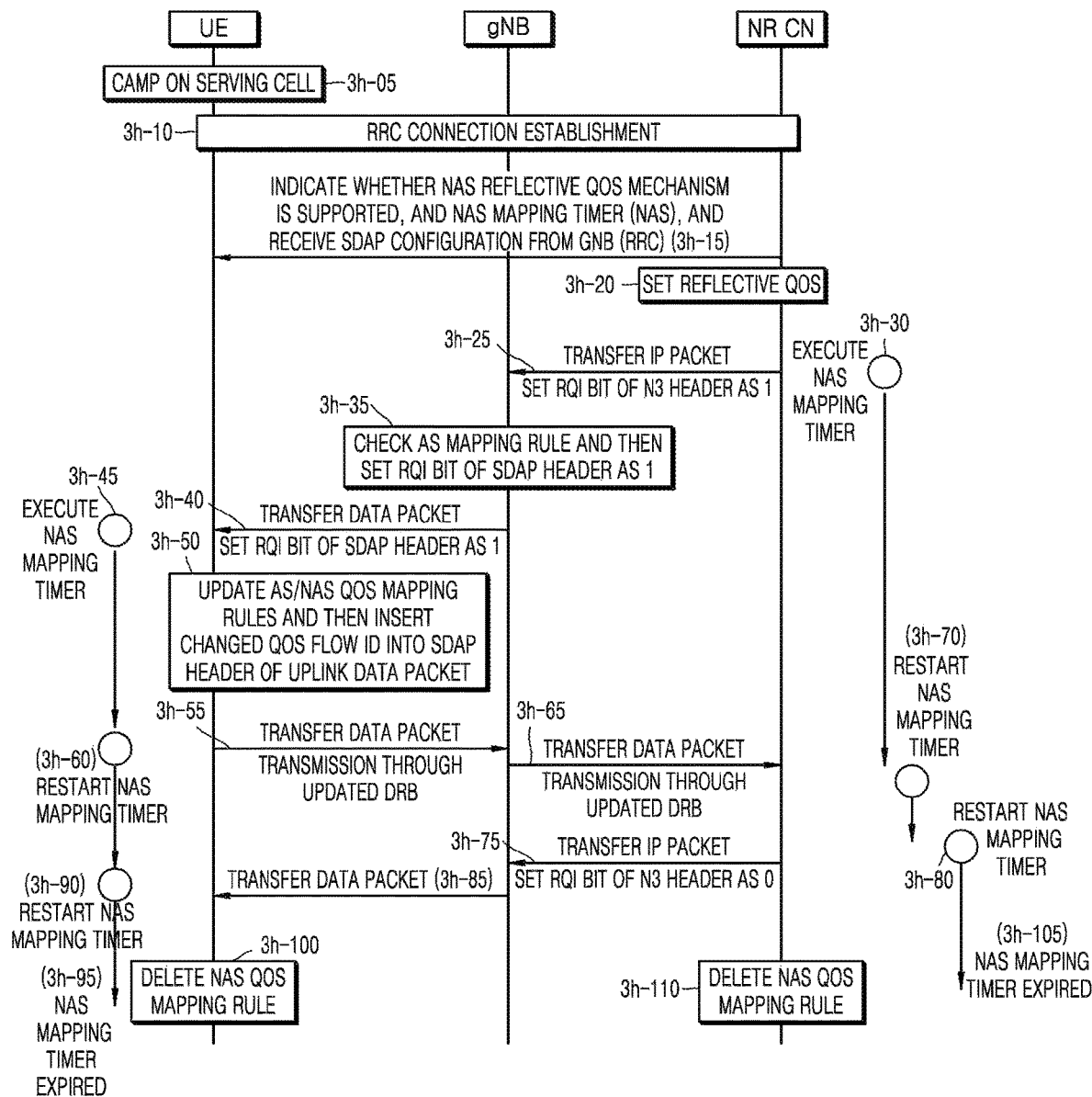
FIG. 32 is a signal flow diagram of a method, performed by a base station, of resolving a mismatch between QoS mapping rules of an NR CN and a UE.

FIG. 32 is a flow diagram of a second embodiment of a method, performed by the gNB, of resolving a mismatch between QoS mapping rules of the NR CN and UE.

Referring to FIG. 32, the NR CN and UE do not restart a timer only when an RQI bit of an N3 header is set as 1. Instead, the NR CN and UE restart the timer even when a certain packet based on reflective QoS rules is transceived, and by doing so, the mismatch between QoS mapping rules of the NR CN and UE may be solved.

The UE camps on a serving cell at step 3h-05, performs RRC connection establishment on the serving cell, and then transitions to a connection mode at step 3h-10. At step 3h-15, the UE receives, from the NR CN, an indicator indicating whether the NR CN supports an NAS reflective QoS mechanism and NAS mapping timer information, and receives, from an RRC message from the gNB, whether an SDAP header (RQI, QoS flow ID) is used according to SDAP configuration. The aforementioned messages may be simultaneously provided in an RRC message, or may be respectively received via an NAS and RRC message. An NAS mapping timer refers to a timer indicating how long the NR CN and the UE have to store QoS mapping rules with respect to an NAS specific IP packet, and when the timer expires, mapping information thereof is deleted.

At step 3h-20, the NR CN that supports the NAS reflective QoS mechanism checks whether to update reflective QoS mapping with respect to the IP packet to be transferred to the UE, and at step 3h-25, when the update is required, the NR CN sets the RQI bit of the N3 header of the IP packet as 1, and transfers the IP packet. Simultaneously, the NR CN executes the NAS mapping timer at step 3h-30. The gNB checks the RQI bit of the N3 header of the received IP packet, and when the RQI bit is set as 1, the gNB checks whether to update an AS mapping rule at step 3h-35, and when required, the gNB sets an RQI bit of an SDAP header as 1 and transfers a data packet to the UE at step 3h-40. In this regard, a condition of setting the RQI bit of the SDAP header as 1 corresponds to only a case in which the RQI bit of the N3 header is set and the update of the AS mapping rule is required. The UE receives the data packet from the gNB, and when the RQI bit of the SDAP header is set as 1, the UE executes the NAS mapping timer at step 3h-45. At step 3h-50, the UE performs a reflective QoS mechanism (an update of AS/NAS mapping rules), and at step 3h-55, the UE transfers an uplink data packet according to updated information. The UE transfers the data packet and simultaneously restarts the timer at step 3h-60. At step 3h-65, the gNB transfers the data packet received from the UE to the NR CN, and at step 3h-70, the NR CN receives the data packet and restarts the timer. At step 3h-75, even when the NR CN transfers, to the gNB, the IP packet to be transferred to the UE, without configuring the RQI bit of the N3 header, the NR CN restarts the timer at step 3h-80. At step 3h-85, the gNB transfers the received data packet to the UE, and equally, when the UE receives the data packet, the UE restarts the timer at step 3h-90. When the timers expire in the UE and the NR CN, the UE and the NR CN delete NAS QoS mapping rules with respect to the IP packet at steps 3h-95, 3h-100, 3h-105, and 3h-110.

Figure 33:
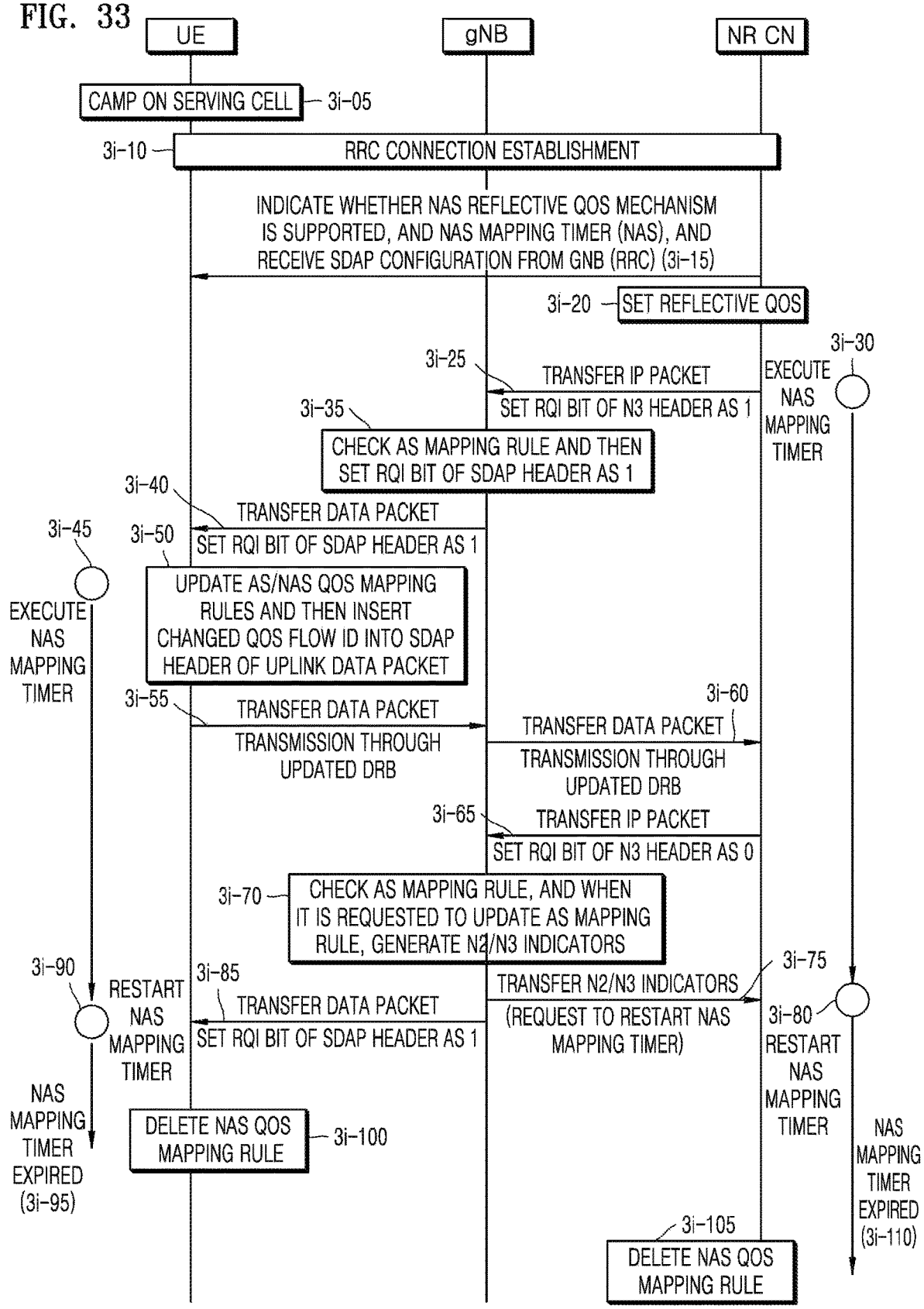
FIG. 33 is a signal flow diagram of a method of resolving a mismatch between QoS mapping rules of an NR CN and a UE, performed by a base station based on signaling between a gNB and the NR CN.

FIG. 33 is a flow diagram of a third embodiment of a method of resolving a mismatch between QoS mapping rules of the NR CN and UE, the method being performed by the gNB based on signaling between the gNB and the NR CN.

Referring to FIG. 33, when the gNB performs an AS QoS update even when an RQI bit of an N3 header is not set, the gNB may instruct the NR CN to do so. That is, the gNB may request the NR CN to restart an NAS mapping timer 33 of the NR CN.

The UE camps on a serving cell at step 3i-05, performs RRC connection establishment on the serving cell, and then transitions to a connection mode at step 3i-10. At step 3i-15, the UE receives, from the NR CN, an indicator indicating whether the NR CN supports an NAS reflective QoS mechanism and NAS mapping timer information, and receives, from an RRC message of the gNB, whether an SDAP header (RQI, QoS flow ID) is used according to SDAP configuration. The aforementioned messages may be simultaneously provided in an RRC message, or may be respectively received via an NAS and RRC message. The NAS mapping timer refers to a timer indicating how long the NR CN and the UE have to store QoS mapping rules with respect to an NAS specific IP packet, and when the NAS mapping timer expires, mapping information thereof is deleted.

At step 3i-20, the NR CN that supports the NAS reflective QoS mechanism checks whether to update reflective QoS mapping with respect to the IP packet to be transferred to the UE, and at step 3i-25, when the update is required, the NR CN sets the RQI bit of the N3 header of the IP packet as 1, and transfers the IP packet. Simultaneously, the NR CN executes the NAS mapping timer at step 3i-30. The gNB checks the RQI bit of the N3 header of the received IP packet, and when the RQI bit is set as 1, the gNB checks whether to update an AS mapping rule at step 3i-35, and when required, the gNB sets an RQI bit of an SDAP header as 1 and transfers a data packet to the UE at step 3i-40. In this regard, a condition of setting the RQI bit of the SDAP header as 1 corresponds to only a case in which the RQI bit of the N3 header is set and the update of the AS mapping rule is required. The UE receives the data packet from the gNB, and when the RQI bit of the SDAP header is set as 1, the UE executes the NAS mapping timer at step 3i-45. At step 3i-50, the UE performs a reflective QoS mechanism (an update of AS/NAS mapping rules), and at step 3i-55, the UE transfers an uplink data packet according to updated information. At step 3i-60, the gNB transfers the data packet received from the UE to the NR CN. At step 3i-65, when the NR CN transfers, to the gNB, the IP packet to be transferred to the UE, without configuring the RQI bit of the N3 header, and in step 3i-70, the gNB checks whether to update an AS mapping rule, and when it is requested to update the AS mapping rule, the gNB notifies the NR CN of the request by using N2/N3 indicators. That is, the gNB requests the NR CN to restart the NAS mapping timer at step 3i-75. The NR CN restarts the NAS mapping timer, in response to the received request at step 3i-80. At step 3i-85, the gNB sets the RQI bit of the SDAP header as 1, and transfers the data packet to the UE. When the UE receives the data packet, the UE restarts the NAS mapping timer at step 3i-90. When the NAS mapping timers expire in the UE and the NR CN, the UE and the NR CN delete NAS QoS mapping rules with respect to the IP packet at steps 3i-95, 3i-100, and 3i-105.

Figure 34:
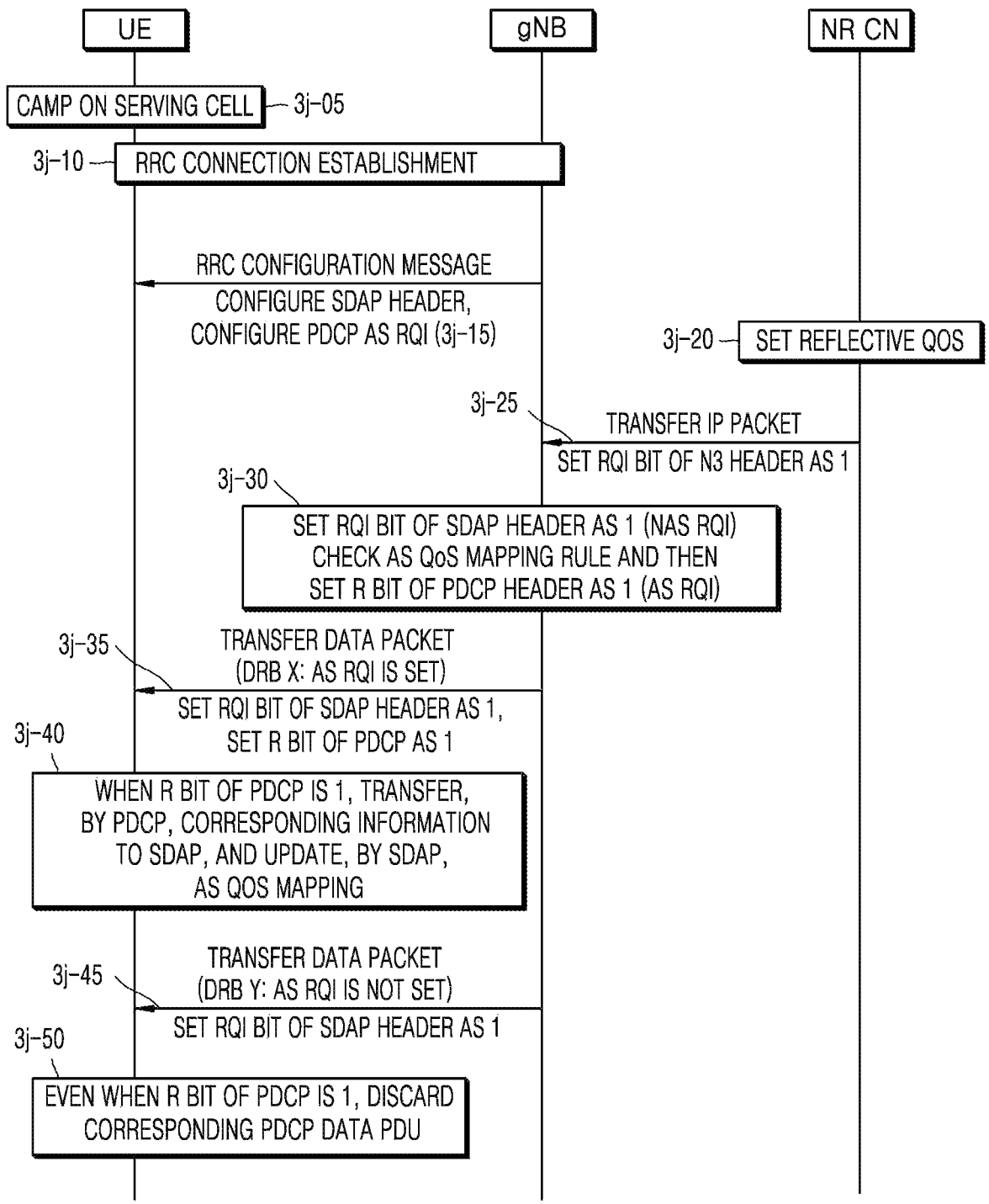
FIG. 34 is a signal flow diagram of a method of resolving a mismatch between QoS mapping rules of an NR CN and a UE, according to a protocol of a RAN.

FIG. 34 is a flow diagram of a method of resolving a mismatch between QoS mapping rules of the NR CN and UE, according to a protocol of a radio access network.

Referring to FIG. 34, in an embodiment, a radio protocol architecture is changed. An existing SDAP instructs an update of an NAS mapping rule, and an R bit of a PDCP is used in an update of an AS mapping rule.

The UE camps on a serving cell at step 3j-05, performs RRC connection establishment on the serving cell, and then transitions to a connection mode at step 3j-10. At step 3j-15, the UE receives, from the gNB via an RRC message, an indicator indicating whether an SDAP header (RQI, QoS flow ID) for an NAS reflective QoS mechanism is used, and PDCP AS RQI configuration information for instructing an AS reflective QoS mechanism. Such configuration is performed by configuring the SDAP and the PDCP. Unlike to that, the UE may receive, from the NR CN, an indicator indicating whether the NR CN supports an NAS reflective QoS mechanism and NAS mapping timer information. The aforementioned messages may be simultaneously provided in an RRC message, or may be respectively received via an NAS and RRC message. The NAS mapping timer refers to a timer indicating how long the NR CN and the UE have to store QoS mapping rules with respect to an NAS specific IP packet, and when the NAS mapping timer expires, mapping information thereof is deleted.

At step 3j-20, the NR CN that supports the NAS reflective QoS mechanism checks whether to update reflective QoS mapping with respect to the IP packet to be transferred to the UE, and at step 3j-25, when the update is required, the NR CN sets the RQI bit of the N3 header of the IP packet as 1, and transfers the IP packet. Simultaneously, the NR CN executes the NAS mapping timer. The gNB checks the RQI bit of the N3 header of the received IP packet, and when the RQI bit is set as 1, the gNB sets an RQI bit of an SDAP header as 1. In addition, the gNB checks whether to update an AS mapping rule, and when required, the gNB sets an R bit of a PDCP header as 1, instructs AS reflective QoS, and transfers a corresponding data packet to the UE at step 3j-30. At step 3j-35, the UE receives the data packet from the gNB, and when the RQI bit of the SDAP header is set as 1, the UE executes the NAS mapping timer.

In this regard, data is received via a DRB(DRB x) to which AS RQI configuration is applied, and when the RQI bits of the SDAP and the PDCP are all set, the UE performs the NAS/AS reflective QoS mechanisms. That is, the UE updates NAS/AS mapping rules and transfers uplink data according to the updated rules at step 3j-40. When data is received via a DRB (DRB y) to which AS RQI configuration is not applied, and the RQI bit of the PDCP is set at step 3j-45, the UE does not perform the NAS/AS reflective QoS mechanisms and discards a corresponding PDCP data PDU at step 3j-50.

According to an embodiment, one from among reserved bits of the PDCP header may be used as an indicator of AS reflective QoS.

Figure 35:
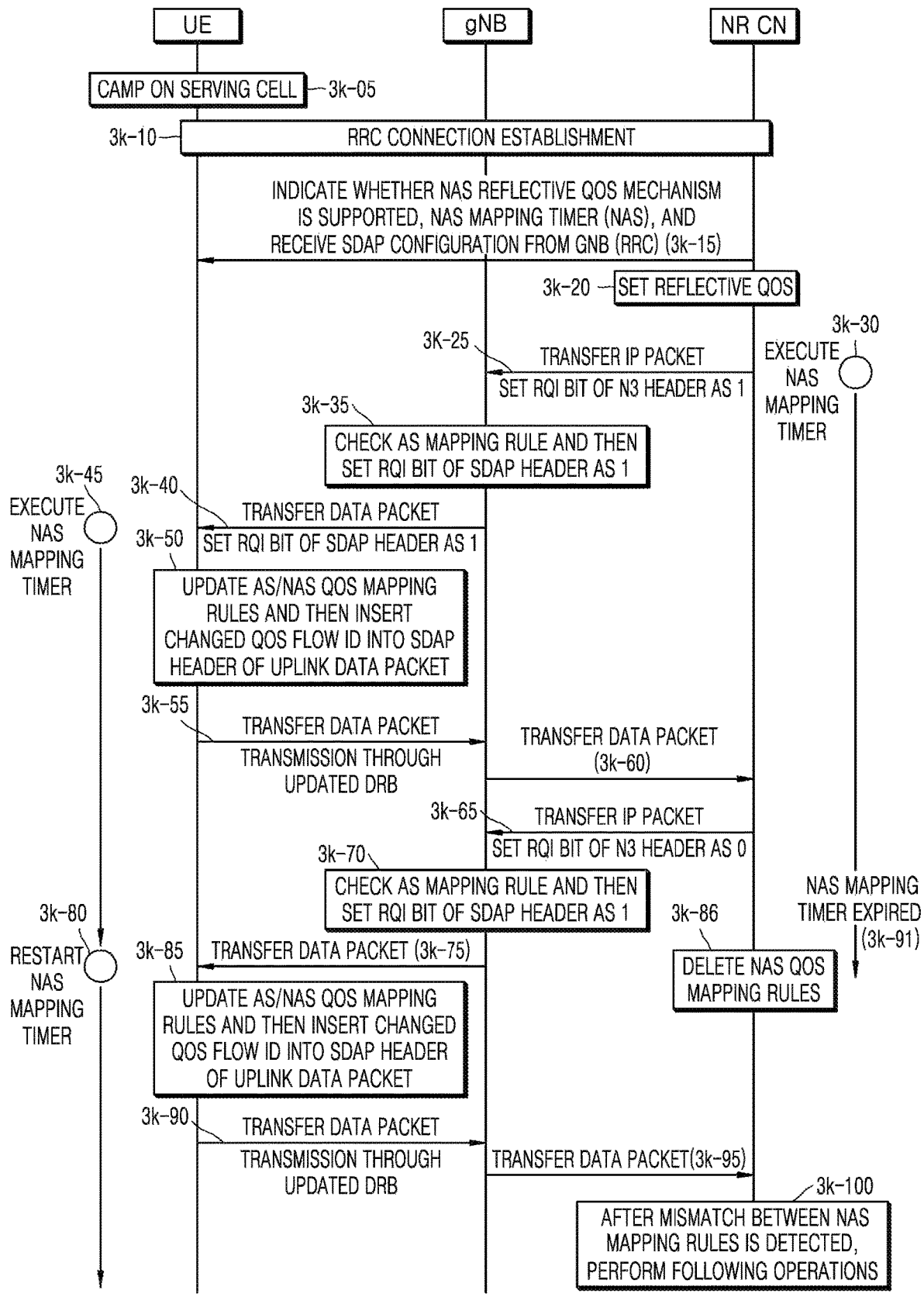
FIG. 35 is a flow diagram of a method, performed by an NR CN, of detecting and resolving a mismatch between QoS mapping rules.

FIG. 35 is a flow diagram of a fifth embodiment of a method, performed by the NR CN, of detecting and solving a mismatch between QoS mapping rules.

Referring to FIG. 35, as described above, because a timer is applied to an NAS reflective QoS mechanism, a mismatch between timer expiration times of the UE and the CN may occur. According to an embodiment, the NR CN may detect a mismatch between mapping rules of the NR CN and an RAN, and may newly perform a reflective QoS mechanism to correct the mismatch. The aforementioned issue may also occur due to transmission failure in the RAN, and thus, the NR CN may resolve an issue when the NR CN detects the issue.

The UE camps on a serving cell at step 3k-05, performs RRC connection establishment on the serving cell, and then transitions to a connection mode at step 3k-10. At step 3k-15, the UE receives, from the NR CN, an indicator indicating whether the NR CN supports an NAS reflective QoS mechanism and NAS mapping timer information, and receives, from an RRC message of the gNB, whether an SDAP header (RQI, QoS flow ID) is used according to SDAP configuration. The aforementioned messages may be simultaneously provided in an RRC message, or may be respectively received via an NAS and RRC message. The NAS mapping timer refers to a timer indicating how long the NR CN and the UE have to store QoS mapping rules with respect to an NAS specific IP packet, and when the NAS mapping timer expires, mapping information thereof is deleted.

At step 3k-20, the NR CN that supports the NAS reflective QoS mechanism checks whether to update reflective QoS mapping with respect to the IP packet to be transferred to the UE, and at step 3k-25, when the update is required, the NR CN sets the RQI bit of the N3 header of the IP packet as 1, and transfers the IP packet. Simultaneously, the NR CN executes the NAS mapping timer at step 3k-30. The gNB checks the RQI bit of the N3 header of the received IP packet, and when the RQI bit is set as 1, the gNB checks whether to update an AS mapping rule at step 3k-35, and when required, the gNB sets an RQI bit of an SDAP header as 1 and transfers a data packet to the UE at step 3k-40. In this regard, a condition of setting the RQI bit of the SDAP header as 1 corresponds to only a case in which the RQI bit of the N3 header is set and the update of the AS mapping rule is required. The UE receives the data packet from the gNB, and when the RQI bit of the SDAP header is set as 1, the UE executes the NAS mapping timer at step 3k-45. At step 3k-50, the UE performs a reflective QoS mechanism (an update of AS/NAS mapping rules), and at step 3k-55, the UE transfers an uplink data packet according to updated information. At step 3k-60, the gNB transfers the data packet received from the UE to the NR CN. At step 3k-65, when the NR CN transfers, to the gNB, the IP packet to be transferred to the UE, without configuring the RQI bit of the N3 header, and at step 3k-70, the gNB checks whether to update the AS mapping rule and when it is required to update the AS mapping rule, the gNB sets the RQI bit of the SDAP header as 1, and transfers a data packet to the UE at step 3k-75. When the UE receives the data packet, the UE restarts the NAS mapping timer at step 3k-80.

At step 3k-85, the UE updates AS/NAS QoS mapping rules, insert a changed QoS flow ID into the SDAP header of the uplink data packet, and transfers the packet to the gNB through an updated DRB at step 3k-90. The gNB receives the packet and then transfers the packet to the NR CN at step 3k-95, and at step 3k-95 the NR CN may detect a mismatch between NAS mapping rules of the UE and the NR CN. At step 3k-100, the NR CN may perform one of methods below to resolve the mismatch between the NAS mapping rules.

1. Reassign the same QoS flow ID
2. Use the reflective QoS mechanism to update/reassign the QoS flow ID)
3. Use explicit NAS signaling to fix the QoS flow ID at the UE side)

Figure 36:
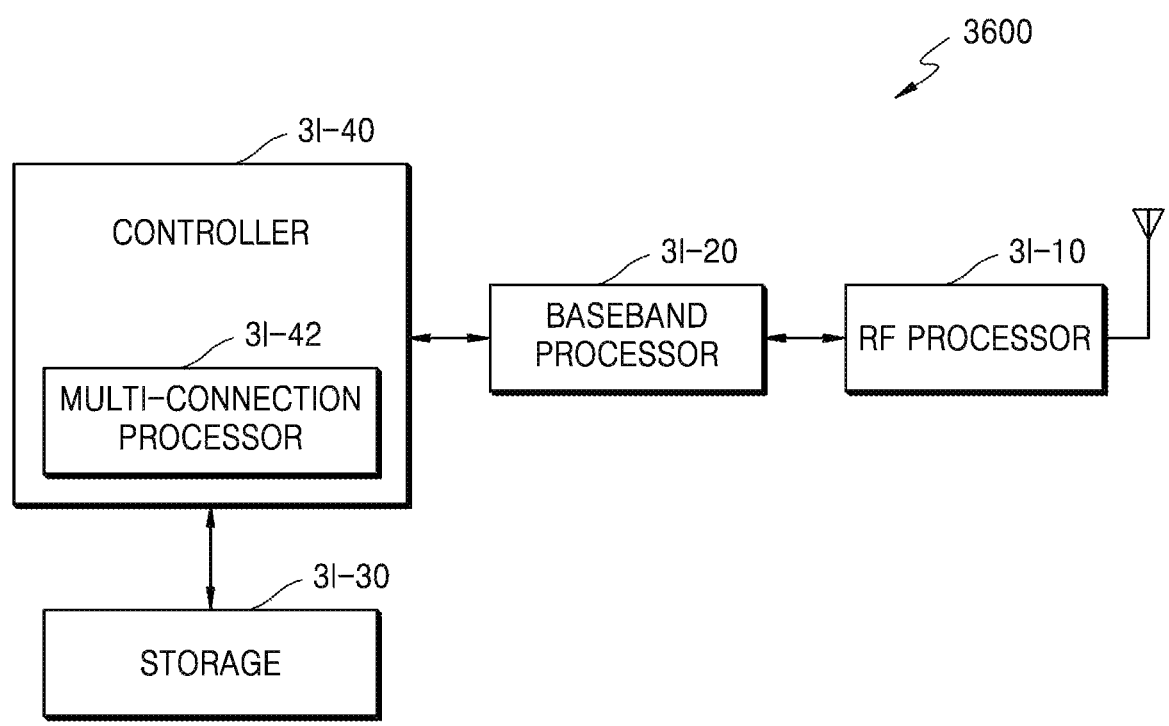
FIG. 36 is a block diagram of a UE, according to an embodiment.

FIG. 36 is a block diagram of a UE 3600 according to an embodiment.

Referring to FIG. 36, the UE 3600 includes an RF processor 3*l*-10, a baseband processor 3I-20, a storage 3I-30, and a controller 3I-40.

The RF processor 3*l*-10 performs functions including conversion, amplification, or the like of a band of a signal so as to transceive the signal through a wireless channel. That is, the RF processor 3*l*-10 up-converts a baseband signal provided from the baseband processor 3*l*-20 to an RF band signal and receives the RF band signal via an antenna, and down-converts an RF band signal received via the antenna to a baseband signal. For example, the RF processor 3*l*-10 may include a transmission filter, a reception filter, an amplifier, a mixer, an oscillator, a DAC, an ADC, or the like. Although FIG. 36 illustrates only one antenna, the UE 3600 may include a plurality of antennas. In addition, the RF processor 3*l*-10 may include a plurality of RF chains. Furthermore, the RF processor 3*l*-10 may perform beamforming. For beamforming, the RF processor 3*l*-10 may adjust phases and magnitudes of respective signals transceived via the plurality of antennas or antenna elements. Furthermore, the RF processor 3*l*-10 may perform MIMO, and may receive a plurality of layers while performing a MIMO operation.

The baseband processor 3*l*-20 performs a function of conversion between the baseband signal and a bit string according to a physical layer specification of a system. For example, in data transmission, the baseband processor 3*l*-20 generates complex symbols by encoding and modulating a transmitted bit string. In addition, in data reception, the baseband processor 3*l*-20 reconstructs a received bit string by demodulating and decoding a baseband signal provided from the RF processor 3*l*-10. For example, when data is transmitted according to an OFDM scheme, the baseband processor 3*l*-20 generates complex symbols by encoding and modulating a transmitted bit string, maps the complex symbols to subcarriers, and configures OFDM symbols by performing an IFFT operation and inserting a CP. Furthermore, in data reception, the baseband processor 3*l*-20 may divide the baseband signal provided from the RF processor 3*l*-10 into OFDM symbol units and restore the signals mapped to the subcarriers by performing an FFT operation and then reconstruct the received bit string by demodulating and decoding the signals.

The baseband processor 3*l*-20 and the RF processor 3*l*-10 transmit and receive signals as described above. Accordingly, the baseband processor 3*l*-20 and the RF processor 3*l*-10 may be referred to as a transmitter, a receiver, a transceiver, or a communicator. Furthermore, at least one of the baseband processor 3*l*-20 and the RF processor 3*l*-10 may include a plurality of communication modules to support different wireless access technologies. Also, at least one of the baseband processor 3*l*-20 and the RF processor 3*l*-10 may include different communication modules configured to support a plurality of different wireless access technologies. In addition, at least one of the baseband processor 3*l*-20 and the RF processor 3*l*-10 may include different communication modules configured to process signals of different frequency bands. For example, the different wireless access technologies may include a WLAN (e.g., IEEE IEEE 802.11), a cellular network (e.g., an LTE network), or the like. Examples of the different frequency bands may include an SHF band (e.g., 2 NRHz or 1 NRHz), and a mmWave band (e.g., 60 GHz).

The storage 3*l*-30 may store data such as a default program, an application program, and configuration information for the operations of the UE 3600. In particular, the storage 3*l*-30 may store information about a second access node configured to perform wireless communication by using a second wireless access technology. In addition, the storage 3*l*-30 provides stored data, in response to a request by the controller 3*l*-40.

The controller 3*l*-40 controls overall operations of the UE 3600. For example, the controller 3*l*-40 transmits and receives signals through the baseband processor 3*l*-20 and the RF processor 3*l*-10. In addition, the controller 3*l*-40 records and reads the data stored in the storage 3*l*-30. To do so, the controller 3*l*-40 may include at least one processor. For example, the controller 3*l*-40 may include a communication processor configured to perform communication control and an AP configured to control an upper layer such as an application program.

Figure 37:
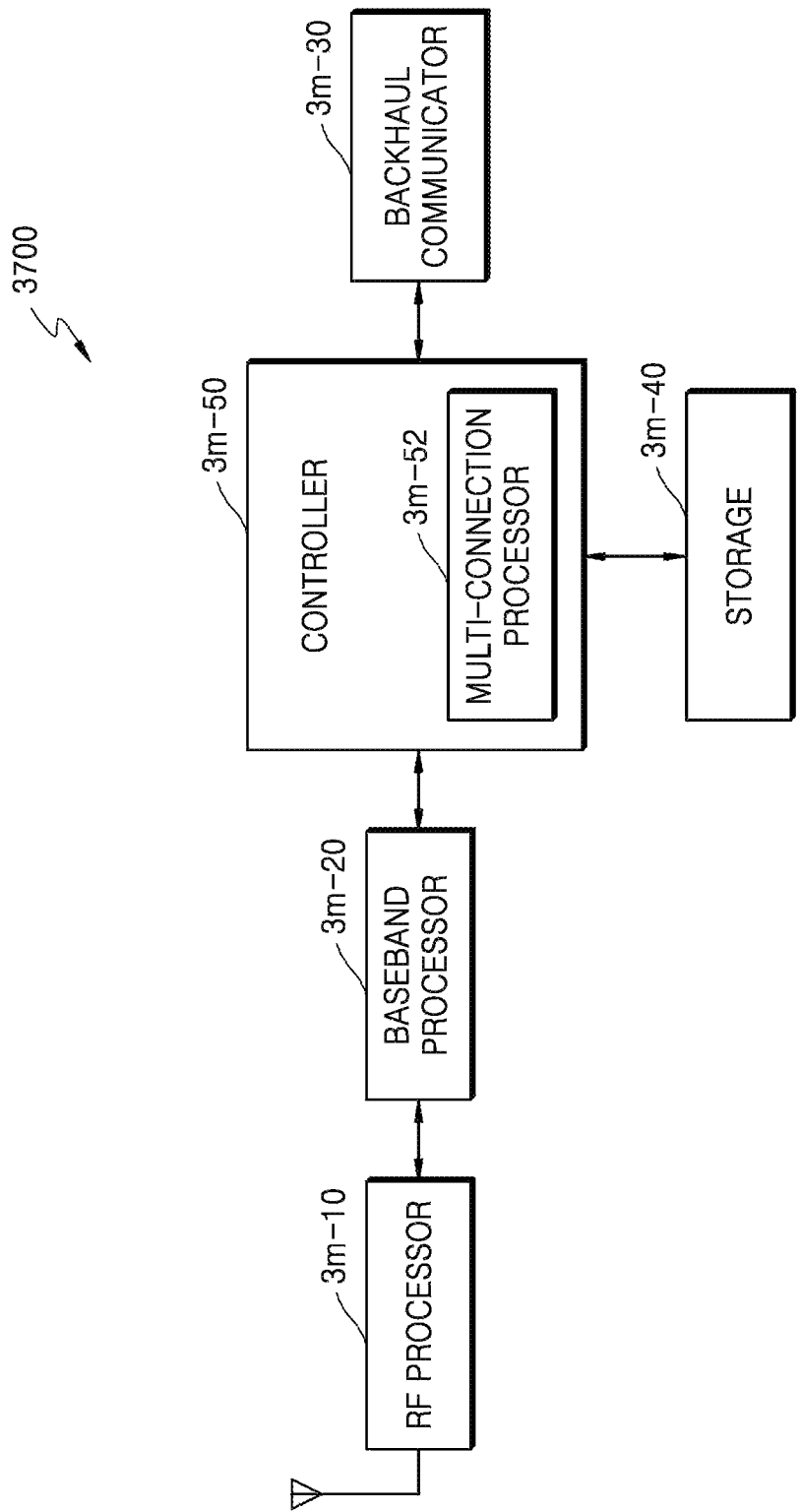
FIG. 37 is a block diagram of an NR base station, according to an embodiment.

FIG. 37 is a block diagram of a base station 3700 according to an embodiment.

Referring to FIG. 37, the base station 3700 includes an RF processor 3*m*-10, a baseband processor 3*m*-20, a backhaul communicator 3*m*-30, a storage 3*m*-40, and a controller 3*m*-50.

The RF processor 3*m*-10 performs functions including conversion, amplification, or the like of a band of a signal so as to transceive the signal through a wireless channel. That is, the RF processor 3*m*-10 up-converts a baseband signal provided from the baseband processor 3*m*-20 to an RF band signal and receives the RF band signal via an antenna, and down-converts an RF band signal received via the antenna to a baseband signal. For example, the RF processor 3*m*-10 may include a transmission filter, a reception filter, an amplifier, a mixer, an oscillator, a DAC, an ADC, or the like. Although FIG. 37 illustrates only one antenna, a base station 3700 may include a plurality of antennas. In addition, the RF processor 3*m*-10 may include a plurality of RF chains. Furthermore, the RF processor 3*m*-10 may perform beamforming. For beamforming, the RF processor 3*m*-10 may adjust phases and magnitudes of respective signals transceived via the plurality of antennas or antenna elements. Furthermore, the RF processor 3*m*-10 may perform a down-MIMO operation by transmitting one or more layers.

The baseband processor 3*m*-20 performs a function of conversion between the baseband signal and a bit string according to a physical layer specification of a first wireless access technology. For example, in data transmission, the baseband processor 3*m*-20 generates complex symbols by encoding and modulating a transmitted bit string. In addition, in data reception, the baseband processor 3*m*-20 reconstructs a received bit string by demodulating and decoding a baseband signal provided from the RF processor 3*m*-10. For example, when data is transmitted according to an OFDM scheme, the baseband processor 3*m*-20 generates complex symbols by encoding and modulating a transmitted bit string, maps the complex symbols to subcarriers, and configures OFDM symbols by performing an IFFT operation and inserting a CP. Furthermore, in data reception, the baseband processor 3*m*-20 may divide the baseband signal provided from the RF processor 3*m*-10 into OFDM symbol units and restore the signals mapped to the subcarriers by performing an FFT operation and then reconstruct the received bit string by demodulating and decoding the signals. Accordingly, the baseband processor 3*m*-20 and the RF processor 3*m*-10 may be referred to as a transmitter, a receiver, a transceiver, a communicator, or a wireless communicator.

The backhaul communicator 3*m*-30 provides an interface for performing communication with other nodes in a network. That is, the backhaul communicator 3*m*-30 converts a bit string to a physical signal, the bitstream being transmitted from the base station 3700 to other nodes including an auxiliary base station 3700, a core network, or the like, and converts a physical signal received from other nodes to a bit string.

The storage 3*m*-40 stores data such as a default program, an application program, and configuration information for operations of the base station 3700. In particular, the storage 3*m*-40 may store information about a bearer allocated to a connected UE, a measurement result reported by the connected UE, or the like. In addition, the storage 3*m*-40 may store information that is a criterion of determining whether to provide or stop multi-connection to the UE. Furthermore, the storage 3m-40 may provide stored data, in response to a request by the controller 3m-50.

The controller 3m-50 controls all operations of the base station 3700. For example, the controller 3m-50 transceives signals via the baseband processor 3m-20 and the RF processor 3m-10, or via the backhaul communicator 3m-30. In addition, the controller 3m-50 may record/read data to/from the storage 3m-40. To do so, the controller 3m-50 may include at least one processor.

Figure 38:
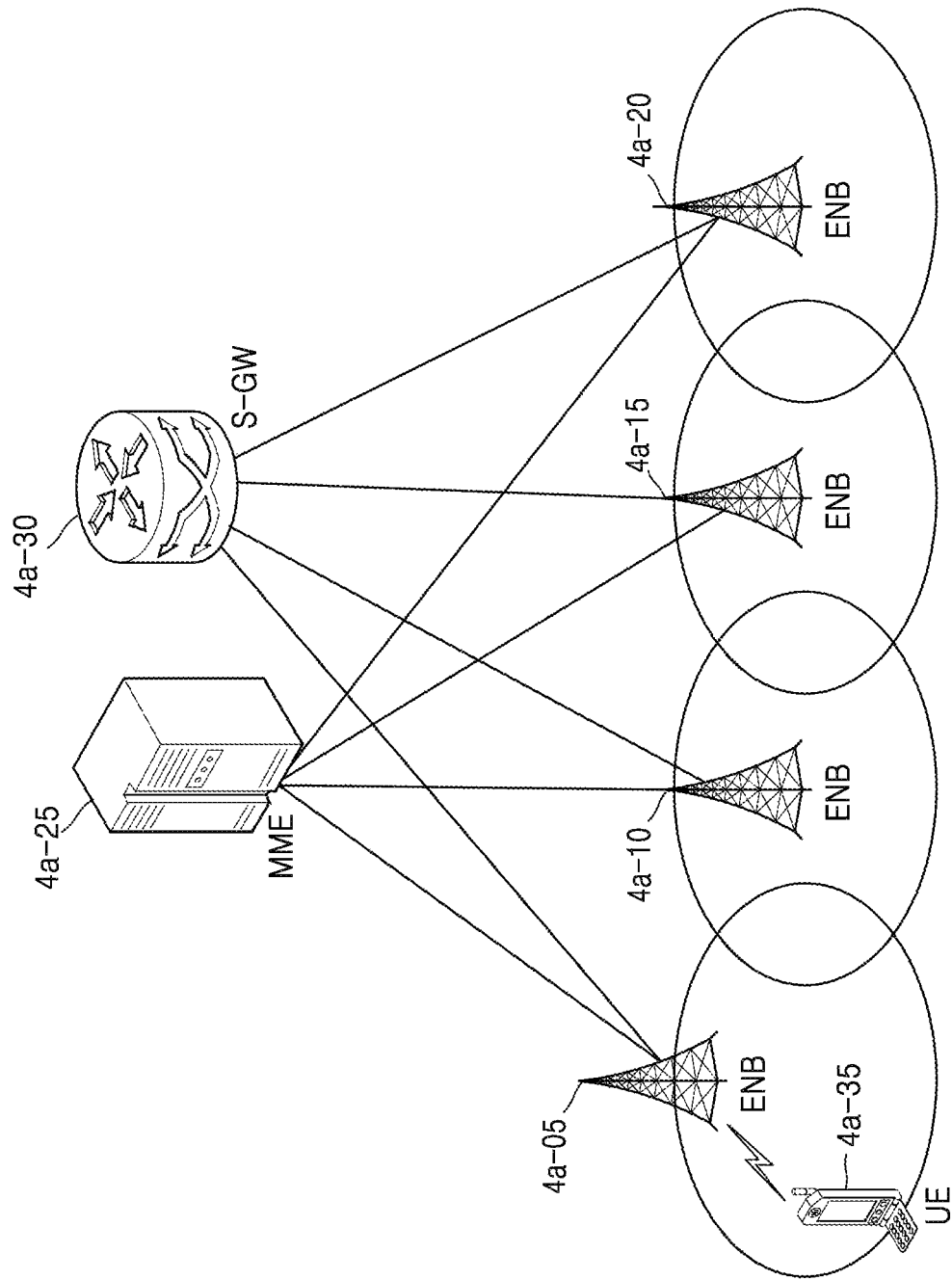
FIG. 38 is a diagram of an LTE system, according to an embodiment.

FIG. 38 is a diagram of an LTE system, according to an embodiment.

Referring to FIG. 38, a wireless communication system is configured of a plurality of eNBs 4a-05, 4a-10, 4a-15, and 4a-20, an MME 4a-25, and an S-GW 4a-30. A UE or (or a terminal) 4a-35 accesses an external network via the eNBs 4a-05, 4a-10, 4a-15, and 4a-20 and the S-GW 4a-30.

The eNBs 4a-05, 4a-10, 4a-15, and 4a-20, as access nodes of a cellular network, provide radio access to UEs that access a network. That is, to service traffic of users, the eNBs 4a-05, 4a-10, 4a-15, and 4a-20 collect and schedule a plurality of pieces of state information including buffer states, available transmit power states, channel states, or the like of the UEs, and then support connection between the UEs and a CN. The MME 4a-25 is a device configured to perform not only a mobility management function but also various control functions with respect to the UEs, and is connected to a plurality of eNBs. The S-GW 4a-30 is a device configured to provide a data bearer. In addition, the MME 4a-25 and the S-GW 4a-30 may be further configured to perform authentication, bearer management, or the like with respect to UE that accesses the network, and to process a packet received from the eNBs 4a-05, 4a-10, 4a-15, and 4a-20 or a packet to be transmitted to the eNBs 4a-05, 4a-10, 4a-15, and 4a-20.

Figure 39:
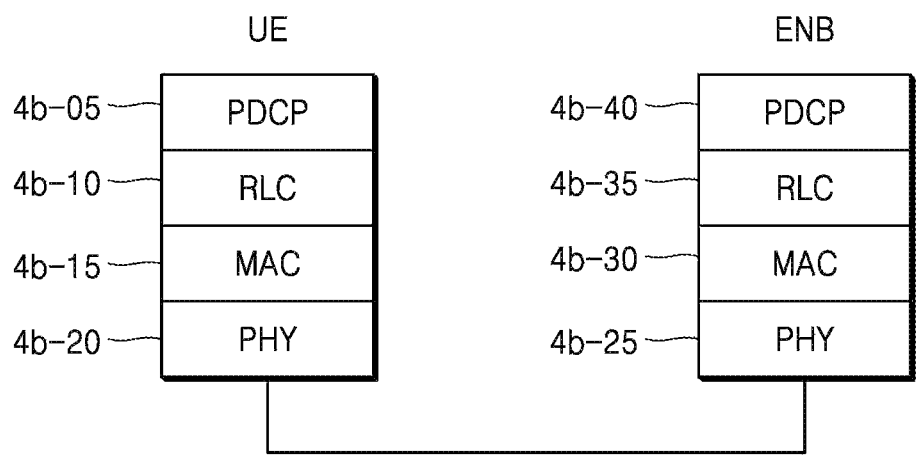
FIG. 39 is a block diagram of a radio protocol architecture in an LTE system, according to an embodiment.

FIG. 39 is a block diagram of a radio protocol architecture in an LTE system, according to an embodiment.

Referring to FIG. 39, a radio protocol in the LTE system is configured of PDCPs 4b-05 and 4b-40, RLCs 4b-10 and 4b-35, MACs 4b-15 and 4b-30, and PHYs 4b-20 and 4b-25 in respective UE and eNB. The PDCPs 4b-05 and 4b-40 perform operations including IP header compression/decompression, and the RLCs 4b-10 and 4b-35 reconfigure a PDCP PDU to have an appropriate size.

The MACs 4b-15 and 4b-30 are connected to a plurality of RLC layers configured in one UE, and may perform operations of multiplexing RLC PDUs into MAC PDUs and demultiplexing RLC PDUs from MAC PDUs. The PHYs 4b-20 and 4b-25 perform operations of channel-encoding and modulating upper layer data and transmitting OFDM symbols through a wireless channel by converting the upper layer data to the OFDM symbols, or operations of demodulating and channel-decoding OFDM symbols received through the wireless channel, and transmitting decoded data to an upper layer. To perform additional error correction, the PHYs 4b-20 and 4b-25 use HARQ, and a receiving end transmits 1 bit indicating acknowledge (ACK) or negative acknowledge (NACK) about a packet transmitted from a transmitting end. This is called HARQ ACK/NACK information. Downlink HARQ ACK/NACK information with respect to uplink transmission may be transmitted via a physical HARQ indicator channel (PHICH) physical channel, and uplink HARQ ACK/NACK information with respect to downlink transmission may be transmitted via a PUCCH or a PUSCH.

A HARQ transmission scheme includes asynchronous HARQ and synchronous HARQ. The asynchronous HARQ refers to a scheme in which, when transmission (or retransmission) is failed, occurrence of a timing for retransmission with respect to the fail is not fixed, and the synchronous HARQ refers to a scheme in which, when transmission (or retransmission) has failed, occurrence of a timing for retransmission with respect to the fail is fixed (e.g., 8 ms). In addition, a plurality of transmissions and receptions may be simultaneously performed in a parallel manner with respect to a downlink and an uplink for one UE, and respective transmissions are distinguished by HARQ process identifiers.

Because a retransmission timing is not fixed in the asynchronous HARQ, for each retransmission, the eNB provides, via a physical downlink control channel (PDCCH) physical channel information about to which HARQ process current transmission belongs and information indicating whether the current transmission is initial transmission or retransmission. In detail, the information about to which HARQ process current transmission belongs is transmitted via a HARQ process identification (ID) field in the PDCCH, and the information indicating whether the current transmission is initial transmission or retransmission means, via a new data indicator (NDI) bit in the PDCCH, retransmission when the bit is not changed compared to a previous value and new transmission when the bit is changed to a different value. Accordingly, the UE recognizes details about corresponding transmission by receiving resource application information in the PDCCH which is transmitted by the eNB, and then, for a downlink, receives actual data via a physical downlink shared channel (PDSCH) physical channel, and for an uplink, transmits actual data via a PUSCH.

Although not illustrated in FIG. 39, respective RRC layers are present as upper layers of the PDCP layers 4b-05 and 4b-40 of the UE and the eNB, and the RRC layers may exchange a setting control message related to access and measurement for controlling wireless resources.

Figure 40:
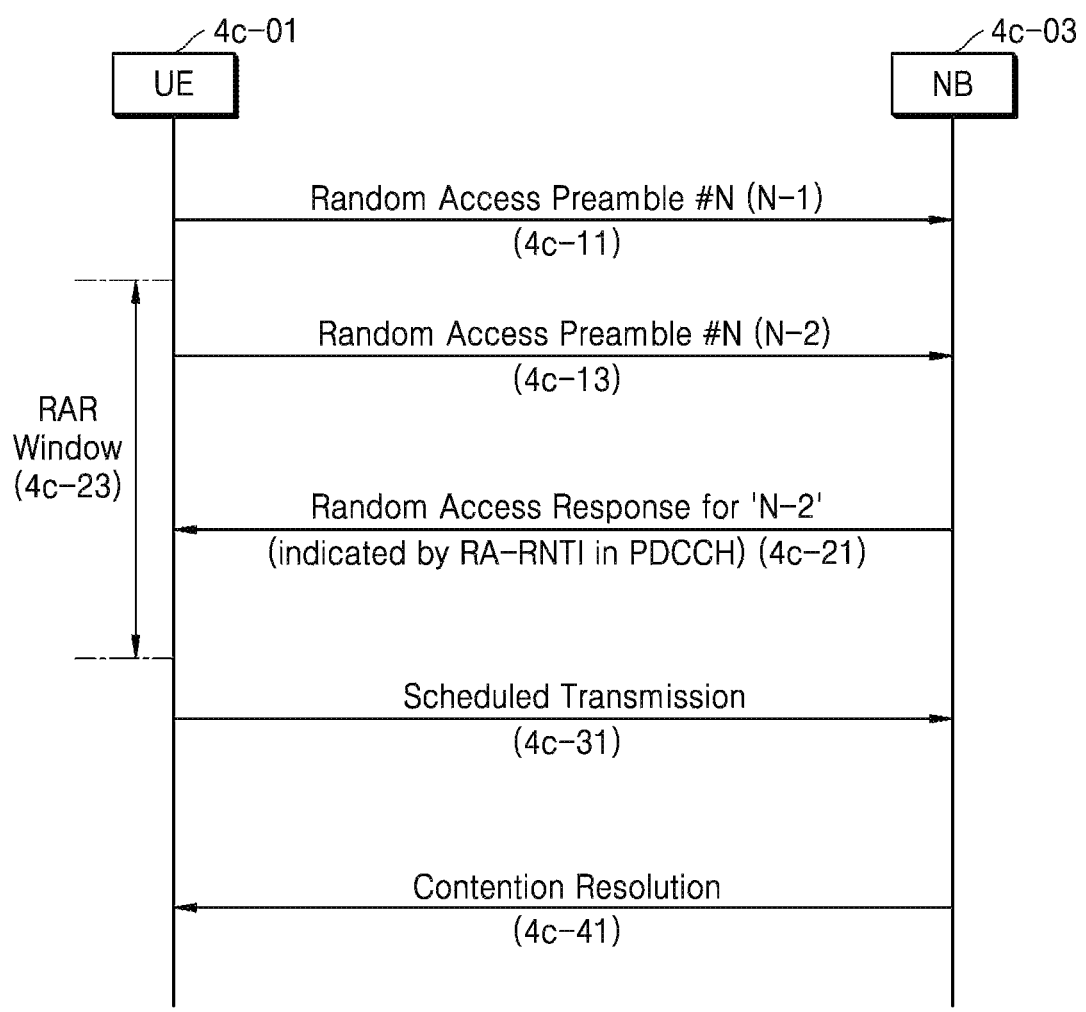
FIG. 40 is a flow diagram of a random access procedure, according to an embodiment.

FIG. 40 is a flow diagram of a random access procedure, according to an embodiment.

Referring to FIG. 40, for an initial access, a re-access, handover, and various other cases where a random access is required, UE 4c-01 performs a random access by performing a procedure below.

First, the UE 4c-01 transmits a random access preamble (also referred to as a preamble) to a physical channel for a random access so as to access a NB 4c-03 at step 4c-11. The physical channel is called a PRACH resource, and one or more UEs may simultaneously transmit random access preambles to the PRACH resource. The PRACH resource may cover one subframe, or only some symbols in one subframe may be used. Information about the PRACH resource may be included in system information broadcast by the NB 4c-03, such that it is possible to check to which time frequency resource a preamble has to be transmitted. In addition, the random access preamble is a sequence particularly designed to be receivable by the NB 4c-03 even when the random access preamble is transmitted before the UE 4c-01 is completely synchronized with the NB 4c-03. According to a standard, a plurality of preamble indexes may be present. When there are a plurality of preamble indexes, a preamble transmitted by the UE 4c-01 may have been randomly selected by the UE 4c-01 or may be a specific preamble designated by the NB 4c-03. In addition, the preamble may be transmitted several times by using beams in different directions at step 4c-13.

When the NB 4c-03 receives the preamble, the NB 4c-03 transmits a random access response (RAR) message with respect to the reception to the UE 4c-01 at step 4c-21. The RAR includes identifier information of the preamble used at step 4c-11 or 4c-13, uplink transmission timing correction information, uplink resource allocation information to be used in step 4c-31, temporary UE identifier information, or the like. The identifier information of the preamble is transmitted to inform which preamble corresponds to the RAR, when a plurality of UEs attempt a random access by transmitting different preambles in step 4c-11 or 4c-13. The uplink resource allocation information is detail information about a resource to be used by the UE 4c-01 in step 4c-31, and includes a physical position and size of the resource, a modulation and coding scheme to be used in transmission, power adjustment information for transmission, or the like. In a case where the UE 4c-01 that transmitted the preamble attempts an initial access, the UE 4c-01 does not have an identifier allocated by the NB 4c-03 for communication with the NB 4c-03, and in that case, the temporary UE identifier information is transmitted to be used as an identifier.

The RAR must be transmitted within a preset time after a preset elapse of time after the preamble is transmitted, and the preset time is called an RAR window. When a plurality of preambles are transmitted, the RAR window is started after a preset time is elapsed after a first preamble is transmitted. The preset time may have a fixed value less than or equal to a subframe unit 1 ms. A length of the RAR window may be a preset value that the NB 4c-03 sets for each PRACH resource or each PRACH resource set in a system information message broadcast by the NB 4c-03. When a plurality of the same preambles are transmitted, respective RAR windows with respect to the transmitted preambles may not be managed but, as described above, the UE 4c-01 may attempt to receive an RAR within one RAR window with respect to the first-transmitted preamble.

When the RAR is transmitted, the NB 4c-03 schedules the RAR through the PDCCH, and scheduling information is scrambled using a random access radio network temporary identifier (RA-RNTI). The RA-RNTI is mapped with the PRACH resource used in transmitting a message of operation 4c-11 or 4c-13, and the UE 4c-01 that transmitted a preamble through a certain PRACH resource attempts to receive a PDCCH based on a corresponding RA-RNTI and determines whether there is an RAR corresponding thereto. That is, when the RAR is a response to the preamble transmitted at step 4c-13, the RA-RNTI used in the scheduling information of the RAR includes information about transmission at step 4c-13. To do so, the RA-RNTI may be computed by using Equation (3) below.

$$RA\text{-}RNTI = 1 + t\_id + \max\_t\_id * f\_id + \text{cell\_offset} \quad \text{Equation (3)}$$

In this regard, t_id indicates an index corresponding to a first OFDM symbol at which the PRACH resource starts, and has a value of 0≤t_id≤max_t_id. In addition, max_t_id indicates a value that varies according to cells (or according to uplinks), and may be signalled in the system information message broadcast by the NB 4c-03 or may be determined by the UE 4c-01 according to a size of the RAR window and spacing of subcarriers. For example, in a case where a wireless communication system is a system using an OFDM scheme, when spacing of subcarriers of a corresponding NB is 15 kHz, the UE may include approximately 14 OFDM symbols in 1 ms (referred to as a subframe). However, when the spacing of subcarriers is 30 KHz, 28 OFDM symbols may be included in 1 ms, when the spacing of subcarriers is 60 KHz, 56 OFDM symbols may be included in 1 ms, when the spacing of subcarriers is 120 KHz, 112 OFDM symbols may be included in 1 ms, when the spacing of subcarriers is 240 KHz, 224 OFDM symbols may be included in 1 ms, and when the spacing of subcarriers is 480 KHz, 448 OFDM symbols may be included in 1 ms. Accordingly, assuming that the size of the RAR window has a length of 10 ms, when it is distinguished by OFDM symbols, too many RA-RNTIs are required, and thus, max_t_id that limits a maximum value is introduced to reduce the number of RA-RNTIs. When the NB 4c-03 separately signals max_t_id, the NB 4c-03 may control a total number of RA-RNTIs. In addition, fid is 1 in a case of frequency division duplex (FDD), and for TDD, a preset number X that is defined in the standard may be used. Cell_offset indicates a value that is signalled in the system information message broadcast by the NB 4c-03, and 0 is used when cell_offset is not transmitted. Cell_offset indicates the value for supporting supplementary uplink, and for example, when the NB 4c-03 uses two uplinks with respect to one downlink, cell_offset is used to identify which uplink among the two uplinks is used. Because the RAR is received through one downlink, it is required to identify through which uplink the preamble has been transmitted.

For example, the RA-RNTI may be computed by using Equation (4) below.

$$RA\text{-}RNTI = 1 + (\text{slot\_id} * \text{num\_symbol\_per\_slot} + \text{symbol\_id}) + \text{num\_of} \\ \text{slot\_per\_RAR} * \text{num\_symbol\_per\_slot} * \\ fid + \text{cell\_offset} \quad (4)$$

In Equation (4) above, slot_id indicates an index of a first slot where transmission of the preamble occurs. Here, a slot refers to a set of 14 OFDM symbols, and as described above, 1 slot may be present in one subframe (1 ms) according to spacing of subcarriers, or 2, 4, 8, or 16 slots may be present. Accordingly, num_symbol_per_slot has a value of 14. In addition, symbol_id refers to an index indicating in which symbol in the slot the preamble has been transmitted. Symbol_id has a value of 0 when transmission occurs in a first symbol, and has a value of 1 when transmission occurs in a second symbol.

The UE 4c-01 that received the RAR transmits, to a resource allocated to the RAR, different messages according to the aforementioned various objectives at step 4c-31. A message that is thirdly transmitted is called Msg3 (that is, the preamble at step 4c-11 or 4c-13 is Msg1 and the RAR at step 4c-21 is Msg2. Examples of Msg3 transmitted by the UE 4c-01 include an RRCConnectionRequest message that is a message of an RRC layer is transmitted in an initial access, an RRCConnectionReestablishmentRequest message transmitted in a re-access, and an RRCConnectionReconfigurationComplete message transmitted in a handover. Alternatively, a buffer status report (BSR) message may be transmitted to request a resource.

Afterward, for an initial transmission (e.g., Msg3 does not include NB identifier information that is previously allocated to the UE 4c-01, or the like), the UE 4c-01 receives a contention resolution message from the NB 4c-03 at step 4c-41, and the contention resolution message includes content in Msg3 that UE 4c-01 has transmitted, therefore, even when there are a plurality of UEs that the same at steps 4c-11 or 4c-13, it is possible to notify which UE corresponds to a response.

Figure 41:
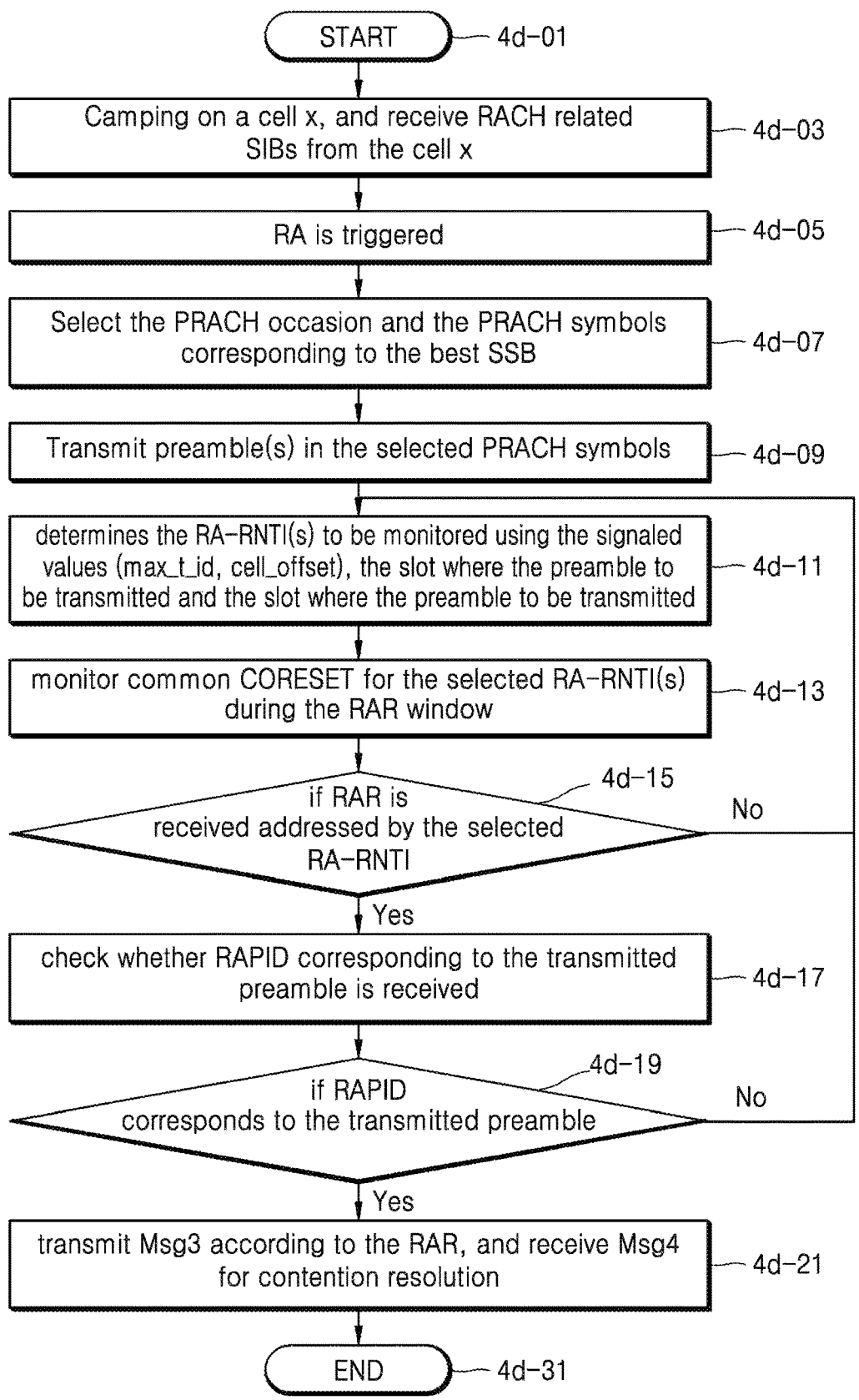
FIG. 41 is a flowchart of UE operations, according to an embodiment.

FIG. 41 is a flowchart of UE operations, according to an embodiment.

Referring to FIG. 41, the UE in an idle mode RRC_IDLE camps on the UE by measuring a downlink signal transmitted from each of NBs and selects a best NB that satisfies a preset condition. Then, the UE receives parameters related to performing a random access to the selected NB by receiving system information broadcast by the selected NB at step 4d-03. Here, "camp-on" indicates that the UE selects the NB and stays at the selected NB, and when the UE determines camping and registers at a network that the UE stays at the selected NB (or a group of NBs), the UE may monitor a paging message from the selected NB (or the group of NBs). When there is data (including a call) to be transmitted from the network to the UE, the paging message is used to inform the UE of the data.

Afterward, the UE may be triggered to perform a random access at step 4d-05. A triggering condition may include a case where the UE attempts to transmit a control message so as to register its location, or a case where the UE attempts to receive data because the UE receives a paging message from a downlink and then recognizes that the UE has data to be received.

Accordingly, the UE selects a PRACH resource for transmitting a random access preamble to the NB at which the UE currently camps at step 4d-07. When the NB is a beam-based NB, the UE may transmit synchronization signal (SS) blocks according to respective beams (or respective groups of beams), and respective PRACH resources may be set according to the SS blocks. For example, in a scenario in which, when four beams of the NB are set in east, west, south, and north directions, the UE is located to the north of the NB and receives only an SS block transmitted to the north (or the SS block that is transmitted to the north has a best signal strength), when the NB allocates different PRACH resources to respective four SS blocks, the UE transmits a preamble through a PRACH resource corresponding to the SS block transmitted to the north. As described above with reference to FIG. 40, the PRACH resource may start at a certain OFDM symbol.

According to the procedure, the UE selects the PRACH resource corresponding to the SS block, and transmits the selected preamble through the PRACH resource at step 4d-09. In this regard, the UE may transmit one preamble or may transmit a plurality of preambles. The UE may compute RA-RNTIs corresponding to respective preambles, and the computation may be performed using Equation (5) below as described above with reference to FIG. 40

$$RA\text{-}RNTI = 1 + t\_id + max\_t\_id * fid + cell\_offset \quad (5)$$

In this regard, t_id indicates an index corresponding to a first OFDM symbol at which the PRACH resource starts, and has a value of 0≤t_id<max_t_id. In addition, max_t_id indicates a value that varies according to cells (or according to uplinks), and may be signalled in the system information message broadcast by the NB or may be determined by the UE according to a size of an RAR window and spacing of subcarriers. For example, in a case where a wireless communication system is a system using an OFDM scheme, when spacing of subcarriers of a corresponding NB is 15 kHz, the UE may include approximately 14 OFDM symbols in 1 ms (referred to as a subframe). However, when the spacing of subcarriers is 30 KHz, 28 OFDM symbols may be included in 1 ms, when the spacing of subcarriers is 60 KHz, 56 OFDM symbols may be included in 1 ms, when the spacing of subcarriers is 120 KHz, 112 OFDM symbols may be included in 1 ms, when the spacing of subcarriers is 240 KHz, 224 OFDM symbols may be included in 1 ms, and when the spacing of subcarriers is 480 KHz, 448 OFDM symbols may be included in 1 ms. Accordingly, assuming that the size of the RAR window has a length of 10 ms, when it is distinguished by OFDM symbols, too many RA-RNTIs are required, and thus, max_t_id that limits a maximum value is introduced to reduce the number of RA-RNTIs. When the NB separately signals max_t_id, the NB may control a total number of RA-RNTIs. In addition, fid is 1 in a case of FDD, and for TDD, a preset number X that is defined in the standard may be used. Cell_offset indicates a value that is signalled in the system information message broadcast by the NB, and 0 is used when cell_offset is not transmitted. Cell_offset indicates the value for supporting supplementary uplink, and for example, when the NB uses two uplinks with respect to one downlink, cell_offset is used to identify which uplink among the two uplinks is used. Because the RAR is received through one downlink, it is required to identify through which uplink the preamble has been transmitted.

For example, the may be computed by using Equation (6) below.

$$RA\text{-}RNTI = 1 + (slot\_id * num\_symbol\_per\_slot + symbol\_id) + num\_of\ slot\_per\_RAR * num\_symbol\_per\_slot * fid + cell\_offset \quad (6)$$

In Equation (6) above, slot_id indicates an index of a first slot where transmission of the preamble occurs. Here, a slot refers to a set of 14 OFDM symbols, and as described above, 1 slot may be present in one subframe (1 ms) according to spacing of subcarriers, or 2, 4, 8, or 16 slots may be present. Accordingly, num_symbol_per_slot has a value of 14. Also, symbol_id refers to an index indicating in which symbol in the slot the preamble has been transmitted. Symbol_id has a value of 0 when transmission occurs in a first symbol, and has a value of 1 when transmission occurs in a second symbol.

Afterward, the UE monitors RA-RNTIs corresponding to respective preambles that have been transmitted during a time of the RAR window that corresponds to a time after a preset offset after a first preamble has been transmitted at step 4d-13. In this regard, the UE monitors a PDCCH that is a subset that is allocated to the UE and is from among all PDCCH resources that the NB transmit, and the subset is called "CORESET."

When the UE successfully receives an RAR according to the selected RA-RNTI at step 4d-15, the UE determines whether the RAR includes a random access preamble identifier (RAPID) transmitted by the UE at step 4d-17. When the RAPID corresponds to a transmitted preamble identifier, the UE transmits Msg3 to the NB, based on uplink resource information included in the RAR, and then determines whether the Msg3 has been successfully transmitted, by attempting to receive Msg4 from the NB at step 4d-21. Accordingly, the UE may successfully perform the random access to the NB.

Figure 42:
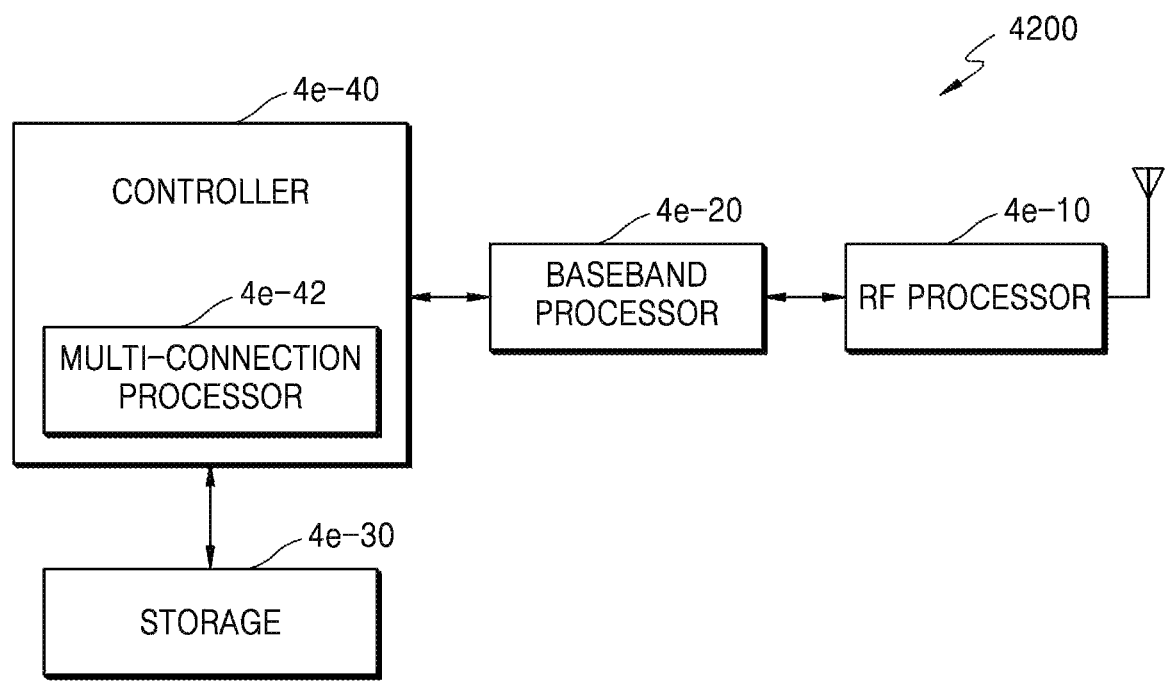
FIG. 42 is a block diagram of a UE, according to an embodiment.

FIG. 42 is a diagram illustrating a configuration of UE according to an embodiment.

Referring to FIG. 42, the UE 4200 includes an RF processor 4e-10, a baseband processor 4e-20, a storage 4e-30, and a controller 4e-40.

The RF processor 4e-10 performs functions including conversion, amplification, or the like of a band of a signal so as to transceive the signal through a wireless channel. That is, the RF processor 4e-10 up-converts a baseband signal provided from the baseband processor 4e-20 to an RF band signal and receives the RF band signal via an antenna, and down-converts an RF band signal received via the antenna to a baseband signal. For example, the RF processor 4e-10 may include a transmission filter, a reception filter, an amplifier, a mixer, an oscillator, a DAC, an ADC, or the like. Although FIG. 42 illustrates only one antenna, the UE 4200 may include a plurality of antennas. In addition, the RF processor 4e-10 may include a plurality of RF chains. Furthermore, the RF processor 4e-10 may perform beamforming. For beamforming, the RF processor 4e-10 may adjust phases and magnitudes of respective signals transceived via the plurality of antennas or antenna elements.

The baseband processor 4e-20 performs a function of conversion between the baseband signal and a bitstream according to a physical layer specification of a system. For example, in data transmission, the baseband processor 4e-20 generates complex symbols by encoding and modulating a transmitted bitstream. In addition, in data reception, the baseband processor 4e-20 reconstructs a received bitstream by demodulating and decoding a baseband signal provided from the RF processor 4e-10. For example, when data is transmitted according to an OFDM scheme, the baseband processor 4e-20 generates complex symbols by encoding and modulating a transmitted bitstream, maps the complex symbols to subcarriers, and configures OFDM symbols by performing an IFFT operation and inserting a CP. In addition, in data reception, the baseband processor 4e-20 may divide the baseband signal provided from the RF processor 4e-10 into OFDM symbol units and restore the signals mapped to the subcarriers by performing an FFT operation and then reconstruct the received bitstream by demodulating and decoding the signals.

The baseband processor 4e-20 and the RF processor 4e-10 transmit and receive signals as described above. Accordingly, the baseband processor 4e-20 and the RF processor 4e-10 may be referred to as a transmitter, a receiver, a transceiver, or a communicator. Furthermore, at least one of the baseband processor 4e-20 and the RF processor 4e-10 may include different communication modules to process signals of different frequency bands. Examples of the different frequency bands may include an SHF band (e.g., 2.5 GHz, 5 GHz, or the like), and a mmWave (e.g., 60 GHz) band.

The storage 4e-30 may store data such as a default program, an application program, and configuration information for the operations of the UE 4200.

The controller 4e-40 controls overall operations of the UE 4200. For example, the controller 4e-40 transmits and receives signals through the baseband processor 4e-20 and the RF processor 4e-10. In addition, the controller 4e-40 records and reads the data stored in the storage 4e-30. To do so, the controller 4e-40 may include at least one processor. For example, the controller 4e-40 may include a communication processor configured to perform communication control and an AP configured to control an upper layer such as an application program. According to an embodiment, the controller 4e-40 includes a multi-connection processor 4e-42 configured to perform processing to operate in a multi-connection mode. For example, the controller 4e-40 may control the UE 4200 to perform a procedure of operations of the UE 4200.

According to an embodiment, the controller 4e-40 of the UE 4200 controls the baseband processor 4e-20 and the RF processor 4e-10 to transmit a certain preamble through a selected PRACH resource, computes an RA-RNTI corresponding to the transmitted preamble, and determines whether an RAR or RARs are received based on the RA-RNTI in a defined period.

Methods according to embodiments described in the appended claims or the description of the present disclosure may be implemented as hardware, software, or a combination of hardware and software.

When implemented as software, a non-transitory computer-readable storage medium storing at least one program (software module) may be provided. The at least one program stored in the non-transitory computer-readable storage medium is configured to be executable by one or more processors in an electronic device. The one or more processors include instructions causing the electronic device to execute the methods according to embodiments described in the appended claims or the description of the present disclosure.

The at least one program (the software module, the software) may be stored in a non-volatile storage including a random-access memory (RAM) and a flash memory, a read-only memory (ROM), an electrically erasable programmable read-only memory (EEPROM), a magnetic disc storage device, a compact disc ROM (CD-ROM), digital versatile discs (DVDs), other optical storage devices, a magnetic cassette, or the like, or a memory configured of any or all combinations thereof. In addition, each of the memories may be provided in a multiple number.

The at least one program may be stored in an attachable storage device that can be accessed via a communication network including the Internet, the Intranet, a local area network (LAN), a wide LAN (WLAN), a storage area network (SAN), or a combination thereof. The storage device may access, via an external port, an apparatus for performing embodiments of the present disclosure. In addition, a separate storage device on a communication network may access the apparatus for performing embodiments of the present disclosure.

While one or more embodiments have been described above with reference to the accompanying drawings, the embodiments are for the purpose of promoting an understanding of the present disclosure only and are not intended to be limiting of the present disclosure. When required, the embodiments may be combined. For example, parts of an embodiment and parts of another embodiment of the present disclosure may be combined with one another, in such a manner that a base station and a UE may be operated. While the embodiments are provided based on an FDD LTE system, modified embodiments based on the technical concept of the embodiments may be executable in another system such as a TDD LTE system, a 5G system or an NR system. That is, it will be understood by those of ordinary skill in the art that various changes in form and details may be made therein without departing from the scope of the present disclosure as defined by the appended claims and their equivalents.

What is claimed is:

1. A method performed by a terminal in a wireless communication system, the method comprising:
   receiving, from a base station, packet data convergence protocol (PDCP) configuration information that configures a PDCP entity of the terminal to use an uplink data compression (UDC);
   generating, by the PDCP entity, a UDC header and a UDC data block, based on the PDCP configuration information;
   ciphering, by the PDCP entity, the UDC header and the UDC data block;
   generating, by the PDCP entity, a PDCP data comprising a PDCP header, the ciphered UDC header, and the ciphered UDC data block; and
   transmitting the generated PDCP data to the base station,
   wherein a header compression is not configured in case that the UDC is configured.

2. The method of claim 1, further comprising:
   receiving, from the base station, PDCP control information including checksum error information indicating a checksum error; and
   resetting a UDC buffer, based on the checksum error information.

3. The method of claim 2, further comprising:
generating a UDC packet based on the UDC buffer which has been reset,
wherein the UDC packet includes information indicating that the UDC buffer has been reset.

4. The method of claim 2, wherein the PDCP control information further includes type information, and
wherein the type information indicates that the PDCP control information includes the checksum error information.

5. The method of claim 1, wherein the PDCP configuration information includes at least one of information indicating a predefined dictionary used for the UDC, buffer size information, UDC setup information, or UDC release information, which are used in compressing uplink data.

6. The method of claim 1, wherein the UDC header includes at least one of an indicator or a checksum field,
wherein the indicator indicates that uplink data has been compressed and the checksum field includes validity bits for a UDC buffer content, and
wherein the UDC is configured for a radio link control (RLC) acknowledge mode (AM) bearer.

7. A method performed by a base station in a wireless communication system, the method comprising:
transmitting, to a terminal, packet data convergence protocol (PDCP) configuration information that configures a PDCP entity of the terminal to use an uplink data compression (UDC); and
receiving, from the terminal, a PDCP data comprising a PDCP header, a ciphered UDC header, and a ciphered UDC data block,
wherein a UDC header and a UDC data block are generated by the PDCP entity of the terminal, based on the PDCP configuration information,
wherein the UDC header and the UDC data block are ciphered by the PDCP entity of the terminal,
wherein the PDCP data comprising the PDCP header, the ciphered UDC header, and the ciphered UDC data block is generated by the PDCP entity of the terminal, and
wherein a header compression is not configured in case that the UDC is configured.

8. The method of claim 7, further comprising:
detecting a checksum error based on the received PDCP data; and
transmitting, to the terminal, PDCP control information including checksum error information indicating the checksum error.

9. The method of claim 8, wherein the PDCP control information further includes information indicating the terminal to reset a UDC buffer of the terminal.

10. The method of claim 9, further comprising:
receiving, from the terminal, a UDC packet generated based on the UDC buffer which has been reset.

11. The method of claim 7, wherein the PDCP configuration information includes at least one of information indicating a predefined dictionary used for the UDC, buffer size information, UDC setup information, or UDC release information, which are used in compressing uplink data.

12. The method of claim 7, wherein the UDC header includes at least one of an indicator or a checksum field,
wherein the indicator indicates that uplink data has been compressed and the checksum field includes validity bits for a UDC buffer content, and
wherein the UDC is configured for a radio link control (RLC) acknowledge mode (AM) bearer.

13. A terminal configured to operate in a wireless communication system, the terminal comprising:
a transceiver; and
a controller coupled with the transceiver and configured to:
receive, from a base station, packet data convergence protocol (PDCP) configuration information that configures a PDCP entity of the terminal to use an uplink data compression (UDC),
generate, by the PDCP entity, a UDC header and a UDC data block, based on the PDCP configuration information,
cipher, by the PDCP entity, the UDC header and the UDC data block,
generate, by the PDCP entity, a PDCP data comprising a PDCP header, the ciphered UDC header, and the ciphered UDC data block, and
transmit the generated PDCP data to the base station,
wherein a header compression is not configured in case that the UDC is configured.

14. The terminal of claim 13, wherein the controller is further configured to:
receive, from the base station, PDCP control information including checksum error information indicating a checksum error, and
reset a UDC buffer, based on the checksum error information.

15. The terminal of claim 14, wherein the controller is further configured to:
generate a UDC packet based on the UDC buffer which has been reset, and
wherein the UDC packet includes information indicating that the UDC buffer has been reset.

16. The terminal of claim 14, wherein the PDCP control information further includes type information, and
wherein the type information indicates that the PDCP control information includes the checksum error information.

17. The terminal of claim 13, wherein the PDCP configuration information includes at least one of information indicating a predefined dictionary used for the UDC, buffer size information, UDC setup information, or UDC release information, which are used in compressing uplink data.

18. The terminal of claim 13, wherein the UDC header includes at least one of an indicator or a checksum field,
wherein the indicator indicates that uplink data has been compressed and the checksum field includes validity bits for a UDC buffer content, and
wherein the UDC is configured for a radio link control (RLC) acknowledge mode (AM) bearer.

19. A base station configured to operate in a wireless communication system, the base station comprising:
a transceiver; and
a controller coupled with the transceiver and configured to:
transmit, to a terminal, packet data convergence protocol (PDCP) configuration information that configures a PDCP entity of the terminal to use an uplink data compression (UDC), and
receive, from the terminal, a PDCP data comprising a PDCP header, a ciphered UDC header, and a ciphered UDC data block,
wherein a UDC header and a UDC data block are generated by the PDCP entity of the terminal, based on the PDCP configuration information,
wherein the UDC header and the UDC data block are ciphered by the PDCP entity of the terminal, wherein the PDCP data comprising the PDCP header, the ciphered UDC header, and the ciphered UDC data block is generated by the PDCP entity of the terminal, and wherein a header compression is not configured in case that the UDC is configured.

20. The base station of claim 19, wherein the controller is further configured to:

detect a checksum error based on the received PDCP data, and transmit, to the terminal, PDCP control information including checksum error information indicating the checksum error.

* * * * *